(12) United States Patent
Schoenberger et al.

(10) Patent No.: US 9,921,561 B2
(45) Date of Patent: Mar. 20, 2018

(54) REAL TIME CONTROL OF A REMOTE DEVICE

(71) Applicant: Secure Cloud Systems, LLC, Marco Island, FL (US)

(72) Inventors: David Schoenberger, Marco Island, FL (US); Timothy Reynolds, Marco Island, FL (US)

(73) Assignee: Secure Cloud Systems, Inc., Marco Island, FL (US)

( * ) Notice: Subject to any disclaimer, the term of this patent is extended or adjusted under 35 U.S.C. 154(b) by 50 days.

(21) Appl. No.: 15/073,114

(22) Filed: Mar. 17, 2016

(65) Prior Publication Data

US 2016/0274912 A1    Sep. 22, 2016

Related U.S. Application Data

(60) Provisional application No. 62/134,182, filed on Mar. 17, 2015, provisional application No. 62/237,487, filed on Oct. 5, 2015.

(51) Int. Cl.
 *G05B 19/042*  (2006.01)
(52) U.S. Cl.
 CPC ................. *G05B 19/042* (2013.01)
(58) Field of Classification Search
 CPC .. G06F 9/30021; G06F 9/3802; G05B 19/042
 See application file for complete search history.

(56) References Cited

U.S. PATENT DOCUMENTS

| | | | |
|---|---|---|---|
| 6,148,342 A | * | 11/2000 | Ho ................... G06F 21/6245 709/223 |
| 7,720,864 B1 | | 5/2010 | Muth et al. |
| 7,937,579 B2 | | 5/2011 | Peckover |
| 7,941,376 B2 | | 5/2011 | Peckover |
| 8,261,058 B2 | | 9/2012 | Peckover |
| 8,359,271 B2 | | 1/2013 | Peckover |
| 8,543,806 B2 | | 9/2013 | Peckover |
| 8,613,107 B2 | | 12/2013 | Peckover |

(Continued)

OTHER PUBLICATIONS

International Search Report issued in connection with PCT/US16/22897.

(Continued)

*Primary Examiner* — Behrang Badii
*Assistant Examiner* — Daniel L Greene
(74) *Attorney, Agent, or Firm* — Akerman LLP

(57) ABSTRACT

According to one embodiment, a system includes one or more processors configured to determine an instruction to be performed by a remote device. The remote device includes a plurality of preloaded instructions, and the plurality of preloaded instructions includes a preloaded instruction that matches the instruction. The processors are further configured to determine a token associated with the instruction. The remote device further includes a plurality of preloaded tokens associated with the plurality of preloaded instructions. The plurality of preloaded tokens includes a preloaded token that matches the token, and the preloaded token is associated with the preloaded instruction. The processors are further configured to transmit the token to the remote device. The remote device is configured to match the token to the preloaded token. Based on the match, the remote device is further configured to determine the preloaded instruction and perform the preloaded instruction.

13 Claims, 25 Drawing Sheets

(56) References Cited

U.S. PATENT DOCUMENTS

| | | | |
|---|---|---|---|
| 8,826,448 B2 | 9/2014 | Peckover | |
| 8,965,066 B1* | 2/2015 | Derakhshani | H04L 9/14 |
| | | | 382/117 |
| 9,009,829 B2* | 4/2015 | Stolfo | G06F 21/554 |
| | | | 726/23 |
| 9,037,858 B1* | 5/2015 | Juels | H04L 9/085 |
| | | | 713/168 |
| 2002/0112178 A1* | 8/2002 | Scherr | G06F 21/80 |
| | | | 726/4 |
| 2005/0256822 A1 | 11/2005 | Hollingsworth | |
| 2007/0250930 A1 | 10/2007 | Aziz et al. | |
| 2008/0222734 A1* | 9/2008 | Redlich | G06F 21/577 |
| | | | 726/26 |
| 2009/0106154 A1* | 4/2009 | Reynolds | G06Q 10/109 |
| | | | 705/45 |
| 2009/0254572 A1* | 10/2009 | Redlich | G06Q 10/06 |
| 2010/0250497 A1* | 9/2010 | Redlich | F41H 13/00 |
| | | | 707/661 |
| 2012/0042162 A1* | 2/2012 | Anglin | G06F 21/57 |
| | | | 713/165 |
| 2013/0097085 A1 | 4/2013 | Peckover | |
| 2013/0340099 A1 | 12/2013 | Peckover | |
| 2014/0023193 A1* | 1/2014 | Landheer | H04L 63/0428 |
| | | | 380/268 |
| 2014/0279553 A1 | 9/2014 | Kassemi et al. | |

OTHER PUBLICATIONS

Written Opinion of the International Searching Authority issued in connection with PCT/US16/22897.

* cited by examiner

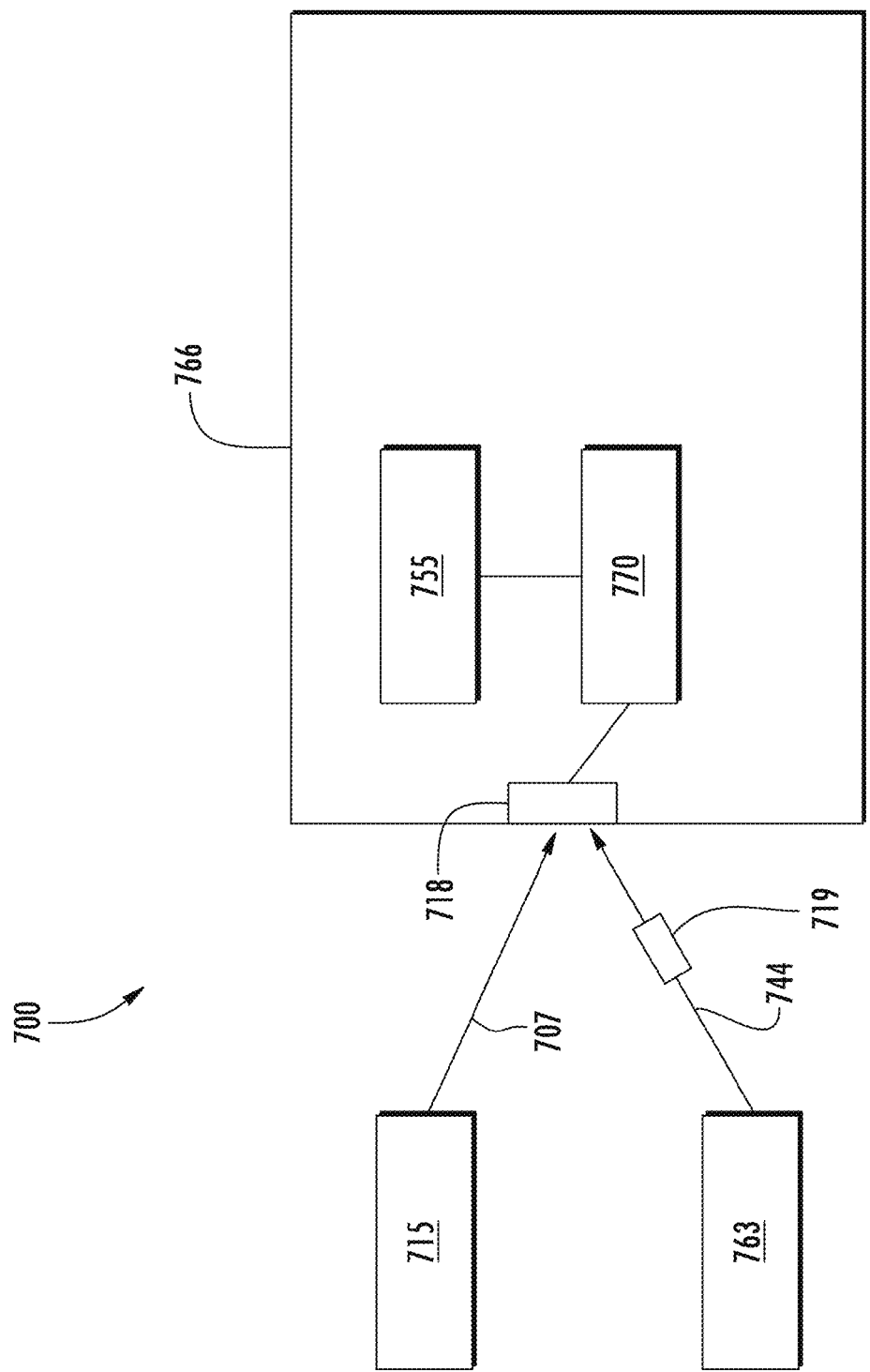

REAL TIME CONTROL OF A REMOTE DEVICE

CROSS-REFERENCE TO RELATED APPLICATIONS

This application claims priority to U.S. Provisional Patent Application No. 62/134,182, filed Mar. 17, 2015, and U.S. Provisional Patent Application No. 62/237,487, filed Oct. 5, 2015, the entirety of both of which are incorporated herein.

TECHNICAL FIELD

This disclosure relates generally to the field of remote devices, and more specifically to real time control of a remote device.

BACKGROUND

Typically, in order to control a device (such as an unmanned vehicle that operates remotely from a controller system), instructions are transmitted to the device, and the device will then perform the instructions that it has received. For example, an unmanned vehicle (such as an unmanned truck) may be in wireless communication with a controller system that may be operated by an operator (such as a human driver). In such an example, the operator may utilize a controller system (such as a steering wheel or joystick) to instruct the unmanned truck to "turn left." This "turn left" instruction may be transmitted to the unmanned vehicle, and the unmanned vehicle will perform the instruction by turning left. Such a typical procedure for controlling a device, however, may be deficient.

SUMMARY

In a first aspect, a system includes a controller including one or more first memory units configured to store one or more first instructions, and one or more first processors coupled to the first memory units. The first processors are further configured, upon executing the one or more first instructions, to determine an instruction to be performed by a remote device. The first processors are further configured to determine a token associated with the instruction, and transmit the token to the remote device. The system further includes a remote device including one or more second memory units configured to store one or more second instructions, a plurality of preloaded instructions, and a plurality of preloaded tokens associated with the plurality of preloaded instructions. The remote device further includes one or more second processors coupled to the second memory units and configured, upon executing the one or more second instructions, to receive the token and match the token to a preloaded token of the plurality of preloaded tokens. The preloaded token is associated with a preloaded instruction of the plurality of preloaded instructions that matches the instruction. The second processors are further configured to determine, based on the match, the preloaded instruction, and perform the preloaded instruction.

In a second aspect, a system includes one or more memory units configured to store one or more instructions, and one or more processors coupled to the memory units. The processors are configured, upon executing the one or more instructions, to determine an instruction to be performed by a remote device. The remote device includes a plurality of preloaded instructions. The plurality of preloaded instructions includes a preloaded instruction that matches the instruction. The processors are further configured to determine a token associated with the instruction. The remote device further includes a plurality of preloaded tokens associated with the plurality of preloaded instructions. The plurality of preloaded tokens includes a preloaded token that matches the token, and the preloaded token is associated with the preloaded instruction. The processors are further configured to transmit the token to the remote device. The remote device is configured to match the token to the preloaded token. Based on the match, the remote device is further configured to determine the preloaded instruction and perform the preloaded instruction.

The processors are further configured to, prior to transmitting the token, add the token to a packet that further includes one or more chaff tokens. The processors are further configured to
transmit the packet to the remote device in order to transmit the token to the remote device. The remote device is further configured to identify the token among the one or more chaff tokens.

The processors are further configured to, following transmission of the token, generate a new token for association with the instruction. The new token is generated based on the one or more chaff tokens added to the packet. The remote device is further configured to, following receipt of the token, generate a new preloaded token for association with the preloaded instruction. The new preloaded token is generated based on the one or more chaff tokens added to the packet. The processors are further configured to determine the instruction to be performed again by the remote device, determine the new token associated with the instruction, and transmit the new token to the remote device. The remote device is configured to match the new token to the new preloaded token. Based on the match, the remote device is further configured to determine the preloaded instruction again and perform the preloaded instruction again.

The processors are further configured to, following transmission of the token, generate a new token for association with the instruction. The remote device is further configured to, following receipt of the token, generate a new preloaded token for association with the preloaded instruction. The processors are further configured to determine the instruction to be performed again by the remote device, determine the new token associated with the instruction, and transmit the new token to the remote device. The remote device is configured to match the new token to the new preloaded token. Based on the match, the remote device is further configured to determine the preloaded instruction again and perform the preloaded instruction again. The generation of the new token causes the token to be obsolete, and the generation of the new preloaded token causes the preloaded token to be obsolete.

The instruction to be performed by the remote device is determined based on a user input, and/or the instruction to be performed by the remote device is determined automatically. The remote device is selected from a group comprising an unmanned vehicle, an unmanned aircraft, ordnance, a probe, and a satellite.

In a third aspect, a method includes determining, by one or more processors, an instruction to be performed by a remote device. The remote device includes a plurality of preloaded instructions, and the plurality of preloaded instructions includes a preloaded instruction that matches the instruction. The method further includes determining, by the one or more processors, a token associated with the instruction. The remote device further includes a plurality of preloaded tokens associated with the plurality of preloaded instructions. The plurality of preloaded tokens includes a preloaded token that matches the token, and the preloaded token is associated with the preloaded instruction. The method further includes transmitting, by the one or more processors, the token to the remote device. The remote device is configured to match the token to the preloaded token. Based on the match, the remote device is further configured to determine the preloaded instruction and perform the preloaded instruction.

The method further includes, prior to transmitting the token, adding, by the one or more processors, the token to a packet that further includes one or more chaff tokens. The method also includes transmitting, by the one or more processors, the packet to the remote device in order to transmit the token to the remote device. The remote device is further configured to identify the token among the one or more chaff tokens.

The method further includes, following transmission of the token, generating, by the one or more processors, a new token for association with the instruction. The remote device is further configured to, following receipt of the token, generate a new preloaded token for association with the preloaded instruction. The method also includes determining, by the one or more processors, the instruction to be performed again by the remote device, determining, by the one or more processors, the new token associated with the instruction, and transmitting, by the one or more processors, the new token to the remote device. The remote device is configured to match the new token to the new preloaded token. Based on the match, the remote device is further configured to determine the preloaded instruction again and perform the preloaded instruction again.

Generation of the new token causes the token to be obsolete, and generation of the new preloaded token causes the preloaded token to be obsolete. Also, the remote device is selected from a group comprising an unmanned vehicle, an unmanned aircraft, ordnance, a probe, and a satellite.

In a fourth aspect, a tangible computer readable medium comprising logic is configured, when executed by one or more processors, to determine an instruction to be performed by a remote device. The remote device includes a plurality of preloaded instructions, and the plurality of preloaded instructions includes a preloaded instruction that matches the instruction. The logic is further configured to determine a token associated with the instruction. The remote device further includes a plurality of preloaded tokens associated with the plurality of preloaded instructions. The plurality of preloaded tokens includes a preloaded token that matches the token, and the preloaded token is associated with the preloaded instruction. The logic is further configured to transmit the token to the remote device. The remote device is configured to match the token to the preloaded token. Based on the match, the remote device is further configured to determine the preloaded instruction and perform the preloaded instruction.

The logic is further configured to, prior to transmitting the token, add the token to a packet that further includes one or more chaff tokens. The logic is also configured to transmit the packet to the remote device in order to transmit the token to the remote device. The remote device is further configured to identify the token among the one or more chaff tokens.

The logic is further configured to, following transmission of the token, generate a new token for association with the instruction. The remote device is further configured to, following receipt of the token, generate a new preloaded token for association with the preloaded instruction. The logic is also configured to determine the instruction to be performed again by the remote device, determine the new token associated with the instruction, and transmit the new token to the remote device. The remote device is configured to match the new token to the new preloaded token. Based on the match, the remote device is further configured to determine the preloaded instruction again and perform the preloaded instruction again.

Generation of the new token causes the token to be obsolete, and generation of the new preloaded token causes the preloaded token to be obsolete. Also, the remote device is selected from a group comprising an unmanned vehicle, an unmanned aircraft, ordnance, a probe, and a satellite.

In a fifth aspect, a remote device includes one or more memory units configured to store one or more instructions, a plurality of preloaded instructions, and a plurality of preloaded tokens associated with the plurality of preloaded instructions. The remote device further includes one or more processors coupled to the memory units and configured, upon executing the one or more instructions, to receive a token from a controller. The token was determined by the controller based on a determination of an instruction to be performed by the remote device. The processors are further configured to match the token to a preloaded token of the plurality of preloaded tokens. The preloaded token is associated with a preloaded instruction of the plurality of preloaded instructions that matches the instruction. The processors are further configured to determine, based on the match, the preloaded instruction, and perform the preloaded instruction.

BRIEF DESCRIPTION OF THE FIGURES

For a more complete understanding of the present disclosure and its features and advantages, reference is now made to the following description, taken in conjunction with the accompanying drawings, in which:

FIG. 7B schematically illustrates various features of a system for controlling a device according to various embodiments described herein;

DETAILED DESCRIPTION

Embodiments of the present disclosure are best understood by referring to FIGS. 1-8K of the drawings, like numerals being used for like and corresponding parts of the various drawings.

Figure 1:
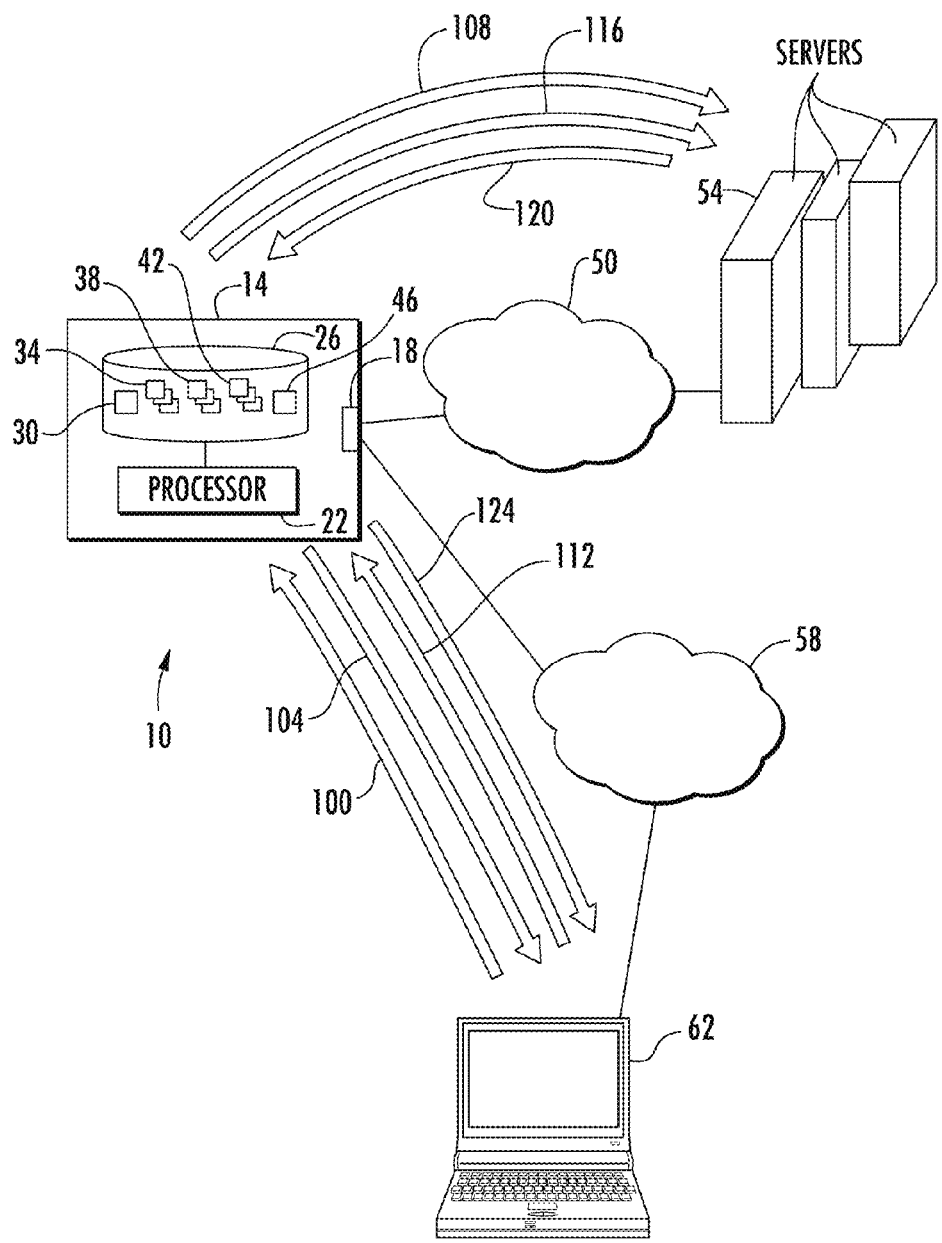
FIG. 1 illustrates an example system that allows data elements to be stored and/or retrieved.

FIG. 1 illustrates an example system 10 that allows data elements to be stored and/or retrieved. System 10 includes a data management device 14 that receives a data element, individually encrypts the data element, breaks the encrypted data element into encrypted data portions, and transmits each encrypted data portion for storage in a separate data storage device 54. Additionally, data management device 14 may also generate a token for the data element, and transmit the token to the data user device 62 from which the data element was received. System 10 further includes data storage devices 54 that store the encrypted data portions, and further allow the encrypted data portions to be retrieved for re-assembly and decryption. In particular embodiments, by (1) encrypting a data element, (2) breaking the encrypted data element into encrypted data portions, and (3) storing each encrypted data portion in a separate data storage device 54, the system 10 may provide multiple levels of security for each data element.

A data element represents any type of information. For example, a data element may be personal information (e.g., a social security number, membership identifier, name, address), business information (e.g., a document, spreadsheet, or other information created, used, and/or received by a business), medical information (e.g., a medical report or diagnosis), financial information (e.g., information regarding investments, credit card information, bank information, account number), security information (e.g., a password, personal access number), any other type of information, or any combination of the preceding. A data element further represents any portion of information. For example, a data element may be an entire spreadsheet (or other document, such as a word document), or it may include a portion of an entire spreadsheet (or other document), such as only social security numbers or other personal information included in the spreadsheet (or other document). As another example, a data element may be an entire medical report, or it may include a portion of the medical report, such as only personal information included in the medical report and/or the diagnosis in the medical report.

Traditionally, data (or a data element) may be stored in a local storage device (such as a computer owned by a business that created or received the data element) or in a networked storage device (such as servers that may be accessed over a communication network). These typical storage devices, however, may be susceptible to unauthorized access. For example, a person may hack into these typical storage devices, gaining access to the data. In order to prevent such unauthorized access, a storage device may traditionally be protected by security (such as a firewall or a password-based security system) or the entire storage device may be encrypted. Such traditional manners of protection, however, may be deficient as an unauthorized user may merely need to bypass the security (such as by guessing or stealing the password) or may merely need to gain access to a single encryption key to decrypt the entire storage device (or a large portion of the storage device). As such, in particular embodiments, system 10 of FIG. 1 may provide various advantages. For example, system 10 may (1) encrypt a data element, (2) break the encrypted data element into encrypted data portions, and (3) store each encrypted data portion in a separate data storage device 54, thereby providing multiple levels of security for each data element. As such, in particular embodiments, even if an unauthorized entity (such as a hacker) was able to access a data storage device 54, the unauthorized entity would be unable to understand (or even decipher) any of the data elements because the unauthorized entity would not have access to all of the encrypted data portions (e.g., at least one other encrypted data portion may be stored in a different data storage device 54 than is being accessed by the unauthorized entity), the encrypted data element would not be assembled (e.g., it would still be broken up into encrypted data portions), and the data element would also be encrypted. As such, system 10 may prevent data elements (such as, for example, important and valuable pieces of information) from being stolen (or otherwise accessed) by an unauthorized entity (such as a hacker). Therefore, in particular embodiments, system 10 may be more hack resistant than traditional data storage systems.

As another example, system 10 may individually encrypt each data element. Therefore, if the data management device 14 receives 50,000 data elements, each of the 50,000 data elements may be encrypted individually, creating 50,000 encrypted data elements. In particular embodiments, the individual encryption of the data element may provide additional security to the data element and/or increase the speed of system 10. For example, traditionally, an entire set of data elements (such as an entire database of data elements, an entire column of data elements, or an entire row of data elements) is encrypted together. In such an example, in order to access any one of the data elements, the entire set of data elements must be decrypted first. This, however, may be problematic because it may cause unrequested data elements to also be decrypted (which may open up the unrequested data elements to unauthorized hackers), and/or it may force the system to perform a large decryption of the entire set of data elements (as opposed to just decrypting the requested data element) which may require additional time. Contrary to these traditional techniques, the individual encryption (and individual decryption) of a data element may provide additional security because other data elements may not need to be decrypted in order to retrieve the requested data element. Furthermore, the individual encryption (and individual decryption) of a data element may increase the speed of system 10 because system 10 may only have to encrypt and/or decrypt a single data element (as opposed to an entire set of data elements). As such, system 10 may be more hack resistant than traditional data storage systems, and may also store and retrieve data elements faster than traditional data storage systems.

As a further example, system 10 may allow a device (such as a data user device 62) to transmit a token to the data management device 14 in order to request that the data element uniquely identified (or otherwise represented by) the token be retrieved and transmitted to the device. In particular embodiments, this may allow the requesting device (such as a data user device 62) to only store the token for a particular data element. As such, in particular embodiments, the data user device 62 may be able to access an entire data element (such as an entire spreadsheet), without having to use up much data storage space on the data user device 62.

As illustrated, system 10 includes data management device 14. Data management device 14 represents any suitable components that receive data elements and manage the storage of the data elements. Data management device 14 may include a network server, any suitable remote server, a mainframe, a host computer, a workstation, a web server, a personal computer, a laptop, a mobile telephone (such as a Smartphone), an electronic notebook, a personal digital assistant, a file server, any other suitable device for receiving data elements and managing the storage of the data elements, or any combination of the preceding. Data management device 14 may manage the storage of a data element in any manner. As an example, the data management device 14 may encrypt a data element, break the encrypted data element into encrypted data portions, and transmit each encrypted data portion for storage. As another example, the data management device 14 may encrypt a data element and transmit the entire encrypted data element for storage (e.g., the encrypted data element may not be broken up for storage). Data management device 14 may also retrieve a data element that is being stored. For example, the data management device 14 may retrieve each encrypted data portion from storage, re-assemble the encrypted data element using the retrieved encrypted data portions, decrypt the encrypted data element, and then transmit the data element to another device, such as to data user device 62. As another example, the data management device 14 may retrieve the entire encrypted data element from storage, decrypt the encrypted data element, and then transmit the data element to another device, such as to data user device 62. Data management device 14 may also generate a token for each received data element, and transmit the token to the device from which the data element was received, such as the data user device 62. In particular embodiments, the token may allow the device (such as the data user device 62 or another device) to request retrieval of the stored data element.

The functions of data management device 14 may be performed by any suitable combination of one or more servers or other components at one or more locations. In an embodiment where the data management device 14 is a server, the server may be a private server, and the server may be a virtual or physical server. The server may include one or more servers at the same or remote locations. Also, data management device 14 may include any suitable component that functions as a server. As illustrated, data management device 14 includes a network interface 18, a processor 22, and a memory unit 26.

Network interface 18 represents any suitable device operable to receive information from network 50 (and/or network 58), transmit information through network 50 (and/or network 58), perform processing of information, communicate to other devices, or any combination of the preceding. For example, network interface 18 may receive data elements from data user device 62 over network 58. As another example, network interface 18 may communicate an encrypted data portion to data storage device 54 over network 50. Network interface 18 represents any port or connection, real or virtual, including any suitable hardware and/or software, including protocol conversion and data processing capabilities, to communicate through a local area network (LAN), a metropolitan area network (MAN), a wide area network (WAN), or other communication system that allows data management device 14 to exchange information with network 50, data storage device 54, network 58, data user device 62, or other components of system 10.

Processor 22 communicatively couples to network interface 18 and memory unit 26, and controls the operation and administration of data management device 14 by processing information received from network interface 18 and memory unit 26. Processor 22 includes any hardware and/or software that operates to control and process information. For example, processor 22 executes management application 30 to control the operation of data management device 14. Processor 22 may be a programmable logic device, a microcontroller, a microprocessor, any suitable processing device, or any combination of the preceding.

Memory unit 26 stores, either permanently or temporarily, data, operational software, or other information for processor 22. Memory unit 26 includes any one or a combination of volatile or non-volatile local or remote devices suitable for storing information. For example, memory unit 26 may include random access memory (RAM), read only memory (ROM), magnetic storage devices, optical storage devices, any other suitable information storage device, or any combination of the preceding. Additionally, memory unit 26 may be an encrypted data storage device (or a data storage device secured in any manner), providing protection against unauthorized attempts to access the information stored in memory unit 26. While illustrated as including particular information modules, memory unit 26 may include any suitable information for use in the operation of data management device 14.

As illustrated, memory unit 26 includes management application 30, encryption methods 34, encryption keys 38, token generation methods 42, and location database 46. Management application 30 represents any suitable set of instructions, logic, or code embodied in a computer-readable storage medium and operable to facilitate the operation of data management device 14. Encryption methods 34 represent any type of encryption method that may be utilized to encrypt a data element and/or decrypt an encrypted data element. For example, an encryption method 34 may be RSA, Data Encryption Standard (DES), triple DES (DES3), Advanced Encryption Standard (AES), AES-256, Cryptographic hash functions, Message authentication codes (MACs), symmetric encryption methods, any other method of encryption, or any combination of the preceding. In particular embodiments, encryption methods 34 may further represent any type of method that may be used to generate one or more encryption keys 38, such as one or more data user keys, data keys, master keys, any other keys, or any combination of the preceding. In particular embodiments, one or more encryption keys 38 may be required in order to utilize one or more encryption methods 34 to encrypt a data element and/or decrypt an encrypted data element. Memory unit 26 may include any number of encryption methods 34. For example, memory unit 26 may include one encryption method 34, two encryption methods 34, three encryption methods 34, four encryption methods 34, five encryption methods 34, or any other number of encryption methods 34.

Encryption keys 38 represent any type of key that may be used with one or more encryption methods 34 to encrypt a data element and/or decrypt an encrypted data element. For example, encryption keys 38 may include one or more data user keys (discussed below with regard to FIG. 2A), data keys (discussed below with regard to FIG. 2A), master keys (discussed below with regard to FIG. 2A), any other key for an encryption method 34, or any combination of the preceding. Memory unit 26 may include any number of encryption keys 38. For example, memory unit 26 may include one or more data user keys for each user of system 10 (e.g., each business or user that stores data elements with the data management device 14 may have its own data user key(s)), one or more data keys for each data element stored by data management device 14 (e.g., a first social security number may have its own data key, a second social security number may also have its own data key, etc.), any number of master keys, and/or any number of any other encryption keys 38. In particular embodiments, although encryption keys 38 are illustrated as being stored in memory unit 26 of system 10, one or more of the encryption keys 38 may be stored in any other location accessible to the data management device 14. For example, the master keys may be stored in a separate memory unit from memory unit 26. As another example, the data keys may be stored in the location database 46.

Token generation methods 42 represent any method that may be used to generate one or more tokens for data elements. For example, token generation methods 42 may include a method of randomly generating a token, a method of generating a token using a data stamp, time stamp, and/or an identifier of a data management device 14, any other method, or any combination of the preceding. Further examples of token generation methods 42 are discussed below with regard to FIG. 2A. Memory unit 26 may include any number of token generation methods 42. For example, memory unit 26 may include one token generation method 42, two token generation methods 42, three token generation methods 42, four token generation methods 42, five token generation methods 42, or any other number of token generation methods 42.

Location database 46 represents a storage unit that stores, either permanently or temporarily, indicators of the locations of stored encrypted data elements (or of stored encrypted data portions). The location database 46 may be a database, a table, a graph, any other storage unit, or any combination of the preceding. In particular embodiments, in addition to storing indicators of the locations of stored encrypted data elements (or of stored encrypted data portions), location database 46 may store any other information. For example, for each data element that is stored by data management device 14, location database 46 may store a token for the data element, an indicator of the location of the encrypted data element (or of one of the encrypted data portions of the encrypted data element), a data key used to encrypt the data element and/or decrypt the encrypted data element, metadata (or other information) associated with the data element (such as the name of the data element, a time stamp for when the data element was received by the data management device 14, a time stamp for when the data element was last accessed, an identifier associated with the owner or user of the data element, an indication (or identifier) of a format type of the data element), any other information, or any combination of the preceding. In particular embodiments, the location database 46 may be utilized by the device management device 14 to retrieve a requested data element, as is discussed below with regard to FIG. 3.

Network 50 represents any suitable network operable to facilitate communication between the components of system 10, such as data management device 14 and data storage device 54. Network 50 may include any interconnecting system capable of transmitting audio, video, signals, data, messages, or any combination of the preceding. Network 50 may include all or a portion of a public switched telephone network (PSTN), a public or private data network, a LAN, a MAN, a WAN, a local, regional, or global communication or computer network, such as the Internet, a wireline or wireless network, an enterprise intranet, or any other suitable communication link, including combinations thereof, operable to facilitate communication between the components. In particular embodiments, network 50 may be a network that operates using Hypertext Transfer Protocol (HTTP) POST methods, HTTP GET methods, application programming interface (API) protocols, Extensible Markup Language (XML) formats, any other communication methods, communication protocols, or communication formats, or any combination of the preceding. Furthermore, in particular embodiments, one or more of the communications (such as all of the communications) between data management device 14 and data storage device 54 may be encrypted (or otherwise secured in any suitable manner), providing protection against unauthorized attempts to access the information included in the communications.

Data storage device 54 represents any suitable components that store all or a portion of one or more encrypted data elements. Data storage device 54 may include a network server, any suitable remote server, a mainframe, a host computer, a workstation, a web server, a personal computer, a file server, any other suitable device for storing data elements, or any combination of the preceding. The functions of data storage device 54 may be performed by any suitable combination of one or more servers or other components at one or more locations. In an embodiment where the data storage device 54 is a server, the server may be a private server, and the server may be a virtual or physical server. The server may include one or more servers at the same or remote locations. Also, data storage device 54 may include any suitable component that functions as a server. In particular embodiments, data storage device 54 may be (or may include) one or more databases for storing the data elements. Furthermore, a data storage device 54 may be (or may include) more than one database, such as two databases, three databases, five databases, or any other number of databases. System 10 may include any number of data storage devices 54. For example, system 10 may include one data storage device 54, two data storage devices 54, three data storage devices 54, five data storage devices 54, ten data storage devices 54, twenty data storage devices 54, or any other number of data storage devices 54.

Each encrypted data element stored by the data storage device 54 may be stored in any one of the data storage devices 54. For example, if system 10 includes three data storage devices 54, the encrypted data element may be stored in any of the three data storage devices 54. In particular embodiments, when an encrypted data element is broken up into encrypted data portions, each encrypted data portion (of that encrypted data element) may be stored in a different data storage device 54. For example, if system 10 includes three data storage devices 54 and an encrypted data element is broken up into three encrypted data portions, the first encrypted data portion may be stored in the first data storage device 54, the second encrypted data portion may be stored in the second data storage device 54, and the third encrypted data portion may be stored in the third data storage device 54. This may prevent an unauthorized entity from gaining access to all of the encrypted data portions of an encrypted data element if the unauthorized entity gains access to a single data storage device 54, in particular embodiments. Alternatively (or additionally), in particular embodiments, when a data storage device 54 includes two or more databases, encrypted data portions of the same encrypted data element may be stored in different databases of the same data storage device 54. This may prevent an unauthorized entity from gaining access to all of the encrypted data portions of an encrypted data element if the unauthorized entity gains access to a single database of a data storage device 54, in particular embodiments. Alternatively (or additionally), when an encrypted data element is broken up into encrypted data portions, each encrypted data portion (of that encrypted data element) may be stored in different unrelated locations of the same data storage device 54, in particular embodiments. For example, if an encrypted data element is broken into three encrypted data portions, the first encrypted data portion may be stored in a first location in the first data storage device 54 (e.g., the location at Column 1, Row 1 of a database), the second encrypted data portion may be stored in a second unrelated location in the first data storage device 54 (e.g., the location at Column 10, Row 15 of the database), and the third encrypted data portion may be stored in a third unrelated location in the first data storage device 54 (e.g., the location at Column 89, Row 115 of the database). In such an example, if an unauthorized entity gains access to the first data storage device 54, each of the encrypted data portions of an encrypted data element may be stored in unrelated locations in the first data storage device, which may prevent the unauthorized entity from deciphering the entire encrypted data element.

Network 58 represents any suitable network operable to facilitate communication between the components of system 10, such as data management device 14 and data user device 62. Network 58 may include any interconnecting system capable of transmitting audio, video, signals, data, messages, or any combination of the preceding. Network 58 may include all or a portion of a PSTN, a public or private data network, a LAN, a MAN, a WAN, a local, regional, or global communication or computer network, such as the Internet, a wireline or wireless network, an enterprise intranet, or any other suitable communication link, including combinations thereof, operable to facilitate communication between the components. In particular embodiments, network 58 may be a network that operates using Hypertext Transfer Protocol (HTTP) POST methods, HTTP GET methods, application programming interface (API) protocols, Extensible Markup Language (XML) formats, any other communication methods, communication protocols, or communication formats, or any combination of the preceding. Furthermore, in particular embodiments, one or more of the communications (such as all of the communications) between data management device 14 and data user device 62 may be encrypted (or otherwise secured in any suitable manner), providing protection against unauthorized attempts to access the information included in the communications. Additionally, although network 58 and network 50 are illustrated as separate networks, network 58 and network 50 may be the same network. In such an example, a single network may communicate data to and/or from data user device 62, and may also communicate encrypted data elements (or encrypted data portions) to and/or from data storage device 54.

Data user device 62 represents any suitable components that allow data elements to be transmitted to data management device 14. For example, data user device 62 may include a personal computer, a workstation, a laptop, a mobile telephone (such as a Smartphone, or any other wireless, cellular, cordless, or satellite telephone), an electronic notebook, a personal digital assistant, a data entry kiosk, a scanner, any other device (wireless, wireline, or otherwise) that allows data elements to be transmitted to data management device 14, or any combination of the preceding. Data user device 62 may be associated with a business. For example, a business (such as a merchant of goods, or a doctor's office) may have information (e.g., personal information about customers, important information about the business or its customers, trade secret information, or any other information) that the business would like securely stored in a location separate from the data user device 62. Data user device 62 may also (or alternatively) be associated with a person. For example, a person may have information (e.g., important documents, photographs, passwords, or any other information) that the person would like securely stored in a location separate from the data user device 62. In particular embodiments, this information may be data elements that are transmitted to data management device 14.

In addition to transmitting data elements to data management device 14, data user device 62 may further allow the stored data elements to be retrieved from the data management device 14. For example, when a business wants to access a person's social security number or bank account number that was transmitted to the data management device 14 for secure storage, the data user device 62 may retrieve the person's social security number or bank account number for viewing by the business (or for use by the business). In particular embodiments, data user device 62 may retrieve the data element by sending a request (with a token) to data management device 14, which may retrieve the encrypted data portions, re-assemble the encrypted data element using the encrypted data portions, decrypt the encrypted data element, and transmit the data element to the data user device 62.

In an exemplary embodiment of operation, a first user of system 10 (such as a business) may desire to have some of its information securely stored in a location separate from the business, such as stored by data management device 14. For example, the business may have the social security numbers of 50,000 of its customers, and may desire to have those 50,000 social security numbers stored by data management device 14, instead of storing the social security numbers on the business' systems. In order to do so, the business may use the data user device 62 to transmit the 50,000 social security numbers to the data management device 14 (via one or more data transmissions 100). The 50,000 social security numbers may be transmitted to the data management device 14 as 50,000 data elements (e.g., one data element for each social security number), as a single data element (e.g., one data element for all of the social security numbers), or as any other number of data elements. Furthermore, the 50,000 data elements may be transmitted to the data management device 14 via 50,000 different data transmissions 100, a single data transmission 100, or any other number of data transmissions 100.

The data management device 14 may receive the data element(s) from the data user device 62. Following the receipt of the data element(s), data management device 14 may generate a token for each data element, and may transmit the token(s) back to the data user device 62 (via token transmission 104). All of the tokens may be transmitted back to the data user device 62 as different token transmissions 104 (e.g., 50,000 token transmissions 104 for 50,000 tokens), as the same token transmission 104 (e.g., a single token transmission 104 for 50,000 tokens), or any other number of token transmissions 104. The token for a data element may be stored by the data user device 62, and may allow the data user device 62 to request that particular data element back from the data management device 14. An example of the generation of a token, and the transmission of the token to the data user device 62 is discussed below with regard to FIG. 2A.

Additionally, following receipt of the data element(s), data management device 14 may individually encrypt each data element. For example, if the data management device 14 received 50,000 data elements (e.g., one data element for each social security number), each of the 50,000 data elements may be encrypted individually, creating 50,000 encrypted data elements. Each encrypted data element may then be broken up into encrypted data portions. The encrypted data element may be broken up into any number of encrypted data portions, and each encrypted data portion may include any amount (or portion) of the encrypted data element. Each encrypted data portion (of an encrypted data element) may be transmitted to data storage device(s) 54 for storage (via storage transmission 108). The encrypted data portions (of an encrypted data element) may each be transmitted to a different data storage device 54. For example, if an encrypted data element is broken up into three encrypted data portions, the first encrypted data portion may be transmitted for storage in a first data storage device 54, the second encrypted data portion may be transmitted for storage in a second data storage device 54, and the third encrypted data portion may be transmitted for storage in a third data storage device 54. An example of the encrypting of a data element, the breaking up of the encrypted data element into encrypted data portions, and the transmission of the encrypted data portions for storage is discussed below with regard to FIG. 2A. Alternatively, instead of breaking up an encrypted data element, the entire encrypted data element may be transmitted to data storage device 54 for storage (via storage transmission 108). An example of the transmission of an entire encrypted data element for storage is discussed below with regard to FIG. 2A.

Following the storage of the data elements by data management device 14, the business (or a different user, such as a user that has been given temporary access rights to a data element) may desire to access one of the stored data elements. For example, the business may need a customer's social security number to conduct a transaction. In order to access the stored data element, the business may utilize the data user device 62 to transmit the token for that particular data element to the data management device 14 (via data element request 112). Based on the received token, the data management device 14 may retrieve each of the encrypted data portions (of the data element) from storage (via retrieval request 116 and retrieval transmission 120) and re-assemble the encrypted data element using the encrypted data portions (or the data management device 14 may retrieve the entire encrypted data element from storage, if it was stored in its entirety). The data management device 14 may then decrypt the encrypted data element, and transmit the data element to the data user device 62 (via data response 124). An example of receiving a token for a data element, retrieving each of the encrypted data portions (of the data element) from storage, re-assembling the encrypted data element using the encrypted data portions, decrypting the encrypted data element, and transmitting the data element to the data user device 62 is discussed below with regard to FIG. 3. Additionally, an example of receiving a token for a data element, retrieving an entire encrypted data element, decrypting the encrypted data element, and transmitting the data element to the data user device 62 is also discussed below with regard to FIG. 3. The business may then view (or otherwise access) the customer's social security number to conduct the transaction, for example.

Modifications, additions, or omissions may be made to system 10 without departing from the scope of the disclosure. For example, data management device 14 may receive and store any number of data elements, such as one data element, two data elements, three data elements, five data elements, 100 data elements, 1,000 data elements, 50,000 data elements, one million data elements, ten million data elements, 50 million data elements, or any other number of data elements. As a further example, system 10 may utilize any number of data transmissions 100, token transmissions 104, storage transmissions 108, data element requests 112, retrieval requests 116, retrieval transmissions 120, and/or data responses 124, and the data transmissions 100, token transmissions 104, storage transmissions 108, data element requests 112, retrieval requests 116, retrieval transmissions 120, and/or data responses 124 may be performed in parallel with other steps, or in any suitable order. As another example, system 10 may include any number of data management devices 14, networks 50, data storage devices 54, networks 58, and/or data user devices 62 (and/or any number of components, such as processors or memory units illustrated in the above described devices). Also, any suitable logic may perform the functions of system 10 and the components and/or devices within system 10. As a further example, system 10 may include additional devices, such as additional devices that may access a data element following its retrieval from storage. In such an example, a data user device 62 may transmit a data element (such as a social security number) for storage, but may request that the other device (such as a third party device) receive the token for the data element, or that the other device be able to access (permanently or temporarily) the data element after it is retrieved at the request of the data user device 62 or the other device.

Furthermore, one or more components of system 10 may be separated, combined, and/or eliminated. For example, although data management device 14 and data storage device 54 are illustrated as being separate devices, data management device 14 and data storage device 54 may be the same device. In such an example, the single device may encrypt the data element, break the encrypted data element into encrypted data portions, store one or more of the encrypted data portions, retrieve the encrypted data portions, re-assemble the encrypted data element, decrypt the data element, and transmit the data element to the data user device 62. As another example, although the data management device 14 is illustrated as being a single device, the data management device 14 may be one or more devices. In such an example, one or more of the functions of the data management device 14 may be performed by separate devices (e.g., a first data management device 14 may encrypt the data element, a second data management device 14 may break the encrypted data element into encrypted data portions, etc.)

Figure 2A:
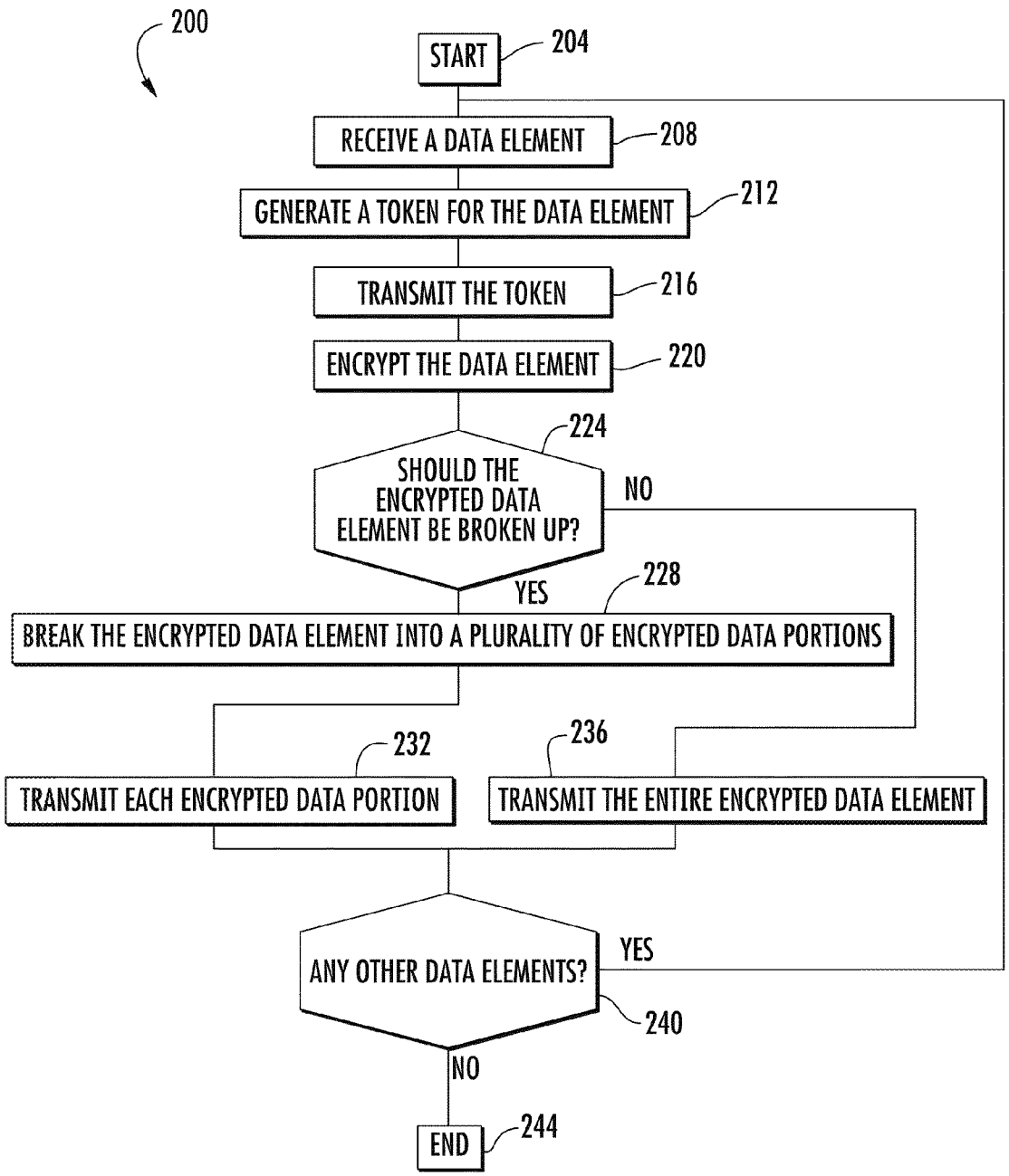
FIG. 2A illustrates an example method for storing data elements.

FIG. 2A illustrates an example method for storing data elements. In particular embodiments, one or more steps of method 200 may be performed by data management device 14 of FIG. 1. Furthermore, one or more steps of method 200 may be (or may be performed in response to) one or more of data transmissions 100, token transmissions 104, and/or storage transmissions 108 of FIG. 1.

Figure 2B:
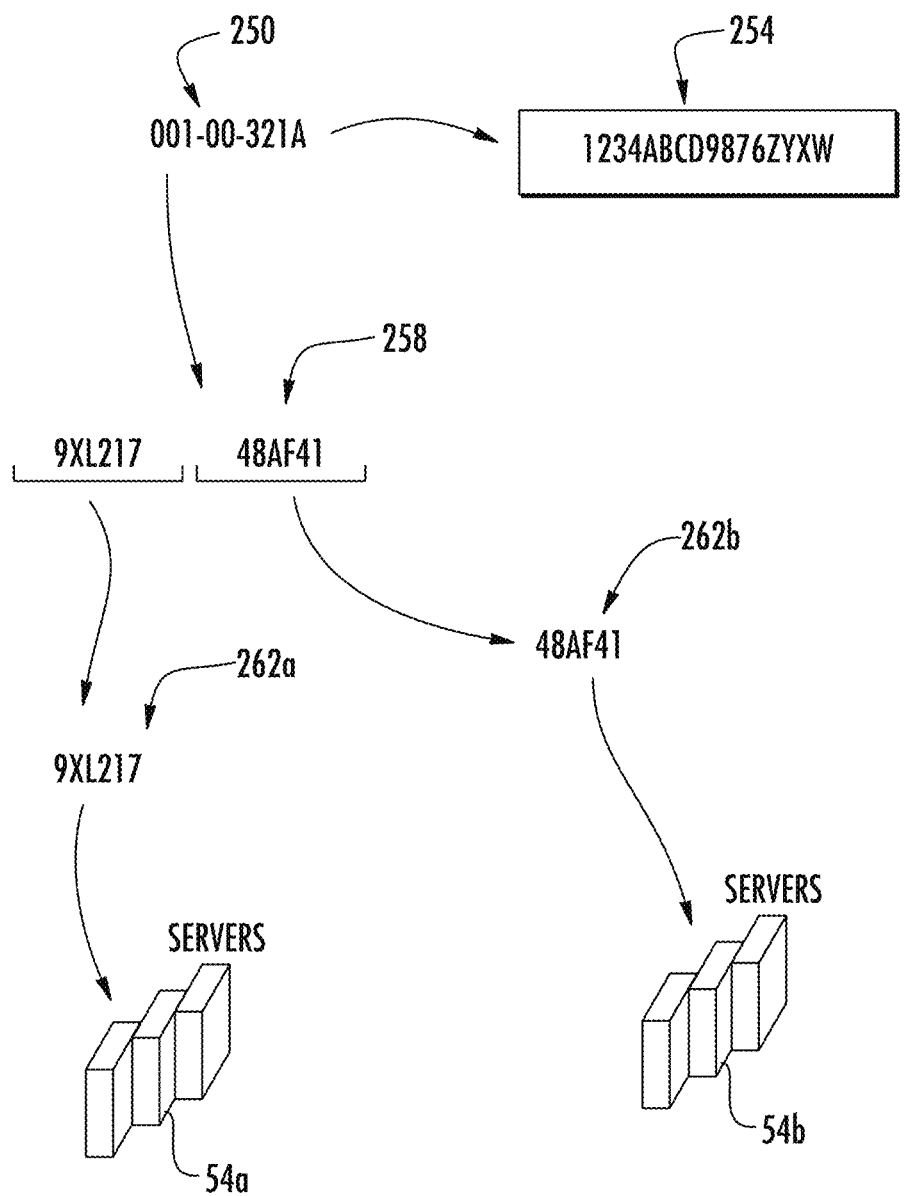
FIG. 2B illustrates an example of a data element, an encrypted data element, and encrypted data portions.

The method 200 begins at step 204. At step 208, a data element is received. The data element may represent any type of information, as is discussed above. For example, the data element may be personal information (e.g., a social security number, membership identifier, name, address), business information (e.g., a document, spreadsheet, or other information created, used, and/or received by a business), medical information (e.g., a medical report or diagnosis), financial information (e.g., information regarding investments, credit card information, bank information, account number), security information (e.g., a password, personal access number), any other type of information, or any combination of the preceding. The data element may further represent any portion of information. For example, the data element may be an entire spreadsheet (or other document, such as a word document), or it may include a portion of an entire spreadsheet (or other document), such as only social security numbers or other personal information included in the spreadsheet (or other document). As another example, the data element may be an entire medical report, or it may include a portion of the medical report, such as only personal information included in the medical report and/or the diagnosis in the medical report. An example of the data element as a social security number is illustrated in FIG. 2B as data element 250.

The data element may be received in any manner. For example, the data element may be transmitted to the data management device 14 by one or more data user devices 62 of FIG. 1, such as via one or more of data transmissions 100. Additionally, the data element may be received for any reason. For example, the data element may be received as a result of the user of a data user device 62 (such as an employee at a business) of FIG. 1 desiring to transmit the data element for secure storage by the data management device 14.

At step 212, a token is generated for the data element. A token may be a unique identifier for the data element. For example, the token may be a unique identifier that is generated for only a single data element, regardless of the size of the single data element (e.g., the data element may be a single character or it may be an entire spreadsheet). In such an example, if a first data element (e.g., a social security number for John Doe) is received, and a second data element (e.g., a word document) is received, each data element will have a different token that uniquely identifies that particular data element. In particular embodiments, as a unique identifier of the data element, the token may be used to retrieve a stored data element. For example, as is discussed below, a device may transmit the token to the data management device 14 in order to request that the data element uniquely identified (or otherwise represented) by the token be retrieved and transmitted to the device. In particular embodiments, this may allow the requesting device (such as a data user device 62) to only store the token for a particular data element. As such, the data user device 62 may be able to access an entire data element (such as an entire spreadsheet), without having to use up much data storage space on the data user device 62. Although the token may be a unique identifier for a particular data element, in particular embodiments, the token may not include any identifying information for the data element and/or an identifier of the location at which the data element may be stored. As such, even if an unauthorized user was able to gain access (or steal) a token, the unauthorized user would be unable to decode the token to determine the data element and/or the location at which the data element may be stored.

The token may be any unique identifier for a data element. For example, the token may be a set of numbers, a set of letters (e.g., A, B, C, etc.), a set of numbers and letters, a set of symbols (e.g., %, !, ?, etc.), a code, any other grouping of characters, or any combination of the preceding. The token may have any length. For example, the parent identifier may be an eight character identifier, a sixteen character identifier, a 32 character identifier, an identifier with a length between eight characters and 32 characters, or an identifier with any other length. An example of a token is illustrated in FIG. 2B as token 254.

The token may be generated in any manner. In particular embodiment, the token may be generated using one or more token generation methods 42 of FIG. 1. As an example, the token may be a random unique identifier that is generated randomly in response to receiving the data element. As another example, the token may be generated using a date stamp for when the data element was received by the data management device 14, a time stamp for when the data element was received by the data management device 14, and/or an identifier of the data management device 14 that received the data element. One example of the generation of a token may include one or more of the following steps: (1) obtain a current timestamp for the receipt of the data element and convert the timestamp to a string; (2) incorporate a tie-breaker made up of the right most six characters of the primary key of the data element and convert to a string; (3) concatenate these strings into a new string and convert to a 64 bit integer; (4) convert to a base 32 representation, except use a "digit mapper" rather than the standard base 32 digit mapper; (5) reverse the resulting string; (6) prepend the string with a base 32 representation of the current year; and (7) pad the resulting string to 16 characters by prepending the appropriate number of zeroes.

At step 216, the token is transmitted. The token may be transmitted to the device from which the data element was received. For example, if the data element was received from a business, the token may be transmitted to the business. As such, the business may store the token, and may transmit it back to the data management device 14 when the business desires to request the data element. The token may also (or alternatively) be transmitted to any other device. For example, the data element may be received from the data user device 62 associated with the business, but the token may also (or alternatively) be transmitted to a third party (such as another business or user). This may allow the third party to also (or alternatively) request the data element from the data management device 14. Following transmission of the token to a device, the receiving device may store the token in any manner. For example, the device (such as data user device 62) may have a file associated with a customer, and the data element may be a social security number of that customer. In such an example, the file stored by the data user device 62 may store the token for the customer's social security number (as opposed to storing the social security number, itself) as, for example, a link or data file. As such, when the business desires to view (or use) the customer's social security number, an employee of the business may click on the token (or activate the token in any other manner, such as uploading the token), causing the token to be transmitted to the data management device 14 to request the social security number.

At step 220, the data element is encrypted. The data element may be encrypted in any manner. In particular embodiments, the data element may be encrypted using one or more encryption methods 34. For example, the data element may be encrypted using any suitable encryption method 34, which may include for example RSA, DES, DESS, AES, Cryptographic hash functions, MACs, any other method of encryption, or any combination thereof. The encrypted data element may have any form. For example, the encrypted data element may be a set of numbers, a set of letters (e.g., A, B, C, etc.), a set of numbers and letters, a set of symbols (e.g., %, !, ?, etc.), a code, any other grouping of characters, or any combination of the preceding. The encrypted data element may have any length and/or size. An example of an encrypted data element is illustrated in FIG. 2B as encrypted data element 258.

In particular embodiments, the data element may be encrypted individually (e.g., each received data element may be individually encrypted). In such embodiments, if the data management device 14 receives 50,000 data elements, each of the 50,000 data elements may be encrypted individually, creating 50,000 encrypted data elements. In particular embodiments, the individual encryption of the data element may provide additional security to the data element and/or increase the speed of system 10. For example, traditionally, an entire set of data elements (such as an entire database of data elements, an entire column of data elements, or an entire row of data elements) is encrypted together. In such an example, in order to access any one of the data elements, the entire set of data elements must be decrypted first. This, however, may be problematic because it may cause unrequested data elements to also be decrypted (which may open up the unrequested data elements to unauthorized hackers), and/or it may force the system to perform a large decryption of the entire set of data elements (as opposed to just decrypting the requested data element) which may require additional time. Contrary to these traditional techniques, the individual encryption (and individual decryption) of a data element may provide additional security because other data elements may not need to be decrypted in order to retrieve the requested data element. Furthermore, the individual encryption (and individual decryption) of a data element may increase the speed of system 10 because system 10 may only have to encrypt and/or decrypt a single data element (as opposed to an entire set of data elements).

In particular embodiments, the data element may be encrypted using one or more encryption keys 38 that may be used with one or more encryption methods 34 of FIG. 1. For example, the data element may be encrypted using, for example, a data user key, a data key, any other key, or any combination of the preceding. A data user key may be a key that is unique to a user (such as a business) of a particular data user device 62 (or a group of data user devices 62). For example, a first business that stores data elements with the data management device 14 may have a first data user key, and a second business (or user) that stores data elements with the data management device 14 may have a second data user key that is different from the first data user key. The data user key may be generated when the user of the data user device 62 registers with the data management device 14. The data user key may be generated in any manner. For example, the data user key may be a randomly generated key, may be generated using one or more encryption methods 34, may be generated using any of the other generation methods discussed herein, or may be generated in any other manner. The data user key may be stored by the data management device (such as stored in memory 26 as encryption keys 38 of FIG. 1), and retrieved by the data management device 14 when the user of the data user device 62 has been authenticated by the data management device 14 and is communicating with the data management device 14 (such as when the user of the data user device 62 enters a password to log into an account with the data management device 14, and then begins transmitting data elements for storage).

A data key may be a key that is unique to each received data element. For example, a first data element (e.g., a social security number for John Doe) may have a first data key, and a second data element (e.g., a word document) may have a second data key that is different from the first data key. The data key may be generated when the data element associated with the data key is received by the data management device 14. The data key may be generated in any manner. For example, the data key may be a randomly generated key, may be generated using one or more encryption methods 34, may be generated using any of the other generation methods discussed herein, or may be generated in any other manner. After being generated and used to encrypt the data element, the data key may be stored by the data management device (such as stored in memory 26 as encryption keys 38 of FIG. 1, or stored in location database 46 of FIG. 1), and retrieved by the data management device 14 when decrypting the encrypted data element.

In addition to the data element being encrypted using encryption keys 38 (such as a data user key, a data key, and/or any other key), the encryption keys 38 used to encrypt the data element may also be encrypted. For example, the data management device 14 may utilize one or more master keys that may be used to encrypt and/or decrypt the encryption keys 38. As such, before an encryption key 38 (such as a data user key or a data key) can be utilized to encrypt and/or decrypt a data element, the encryption key 38 may first be decrypted using the one or master keys (such as by, for example, performing a MD5 one-way hash of the master keys). In particular embodiments, this may provide additional security to the stored data elements. For example, even if an unauthorized user was able to gain access to the encryption keys 38 (such as the data user keys and/or the data keys) used to encrypt and/or decrypt a data element, the unauthorized user would be unable to decipher the encryption keys 38, because they are also encrypted. Furthermore, in particular embodiments, if the security of the master keys were ever compromised (or if a particular amount of time has passed, or if an administrator or other user of system 10 desires to change the master keys), all of the encryption keys 38 may be re-encrypted using newly generated master keys, providing even additional security. The master keys may be generated in any manner. For example, the master keys may be a randomly generated key, may be generated using one or more encryption methods 34, may be generated using any of the other generation methods discussed herein, or may be generated in any other manner.

After the data element is encrypted (at step 220), the method 200 may move to step 224, where it is determined whether the encrypted data element should be broken up. Whether the encrypted data element should be broken up may be determined in any manner. As an example, it may be determined that the encrypted data element should be broken up when the encrypted data element is over a size threshold, such as, for example, 128 megabytes, 256 megabytes, 512 megabytes, 1 gigabyte, or any other size. As a further example, it may be determined that the encrypted data element should be broken up when the encrypted data element is over a length threshold, such as, for example, ten characters, 50 characters, 100 characters, 1,000 characters, or any other length. As another example, it may be determined that the encrypted data element should be broken up when the data user device 62 has requested that the encrypted data element be broken up. In such an example, the data user device 62 may request that the encrypted data element be broken up if the user of the data user device 62 desires that the data element be stored under further security than just encryption. The data user device 62 may make such a request in any manner, such as by selecting a particular option when transmitting the data element to the data management device 14. As a further example, it may be determined that the encrypted data element should be broken up when the data element has a particular format type, such as a file, a document, a spreadsheet, a pdf, or any other format type. As another example, it may be determined that the encrypted data element should be broken up when the data element does not have a particular format type, such as a text item, or any other format type. The encrypted data element may be determined to have a particular format type (or not have a particular format type) based on an analysis of the data element by data management device 14 and/or based on a selection made by the user of the data user device 62 (e.g., the user labelling the data element as a document). In such an example, the analysis of the data element and/or the selection made by the user of the data user device 62 may cause the data management device 14 to receive an indicator that indicates that the data element is to be broken up.

If it is determined that the encrypted data element should not be broken up, the method 200 may move to step 236, where the entire encrypted data element is transmitted. The entire encrypted data element may refer to all of the encrypted data element (e.g., the encrypted data element may not be broken up into encrypted data portions). For example, if the encrypted data element is "9XL21748AF41", the entire "9XL21748AF41" may be transmitted without being broken up. An example of an entire encrypted data element is illustrated in FIG. 2B as encrypted data element 258. The entire encrypted data element may be transmitted for storage. For example, the entire encrypted data element may be transmitted for storage in data storage device 54 of FIG. 1. The entire encrypted data element may be transmitted for storage in any of the data storage devices 54 of FIG. 1. For example, if system 10 of FIG. 1 includes three data storage devices 54, the entire encrypted data element may be stored in the first data storage device 54, the second data storage device 54, or the third data storage device 54. Furthermore, the data storage device 54 that receives the entire encrypted data element may store the entire encrypted data element without breaking it up.

The entire encrypted data element may be transmitted in any manner. For example, the entire encrypted data element may be transmitted to the data storage device 54 by the data management device 14, such as via one or more of storage transmissions 108. In particular embodiments, as a result of transmitting the entire encrypted data element for storage in the data storage device 54, the data management device 14 may receive (or otherwise know) the location where the entire encrypted data element was stored (e.g., Column 2, Row 18 of the second data storage device 54). An indicator of this location may be stored by the data management device 14 (such as in location database 46 of FIG. 1). As such, when the data management device 14 receives the token for the data element, the data management device 14 may be able to look up where the encrypted data element is stored.

On the other hand, if it is determined that the encrypted data element should be broken up, the method 200 may move to step 228, where the encrypted data element is broken up into encrypted data portions. The encrypted data element may be broken up into any number of encrypted data portions. For example, the encrypted data element may be broken up into two encrypted data portions, three encrypted data portions, four encrypted data portions, ten encrypted data portions, 100 encrypted data portions, 1,000 encrypted data portions, or any other number of encrypted data portions. Furthermore, each encrypted data portion may include any amount (or portion) of the encrypted data element. In particular embodiments, the encrypted data element may be broken up into encrypted data portions based on size. For example, each encrypted data portion may be a portion of the encrypted data element having a particular size, such as 128 megabytes, 256 megabytes, 512 megabytes, 1 gigabyte, or any other size. An example of encrypted data portions of an encrypted data element are illustrated in FIG. 2B as encrypted data portions 262A and 262B. As illustrated, the encrypted data element 258 (e.g., "9XL21748AF41") may be broken up into a first encrypted data portion 262A (e.g., "9XL217") and a second encrypted data portion 262B (e.g., "48AF41").

After the encrypted data element is broken up into encrypted data portions (at step 228), the method 200 may move to step 232, where each encrypted data portion is transmitted. Each encrypted data portion may be transmitted for storage. For example, each encrypted data portion may be transmitted for storage in data storage devices 54 of FIG. 1. In particular embodiments, each encrypted data portion (of an encrypted data element) may be stored in a different data storage device 54 of FIG. 1, in particular embodiments. For example, if system 10 of FIG. 1 includes two data storage devices 54 and an encrypted data element is broken into two encrypted data portions, the first encrypted data portion (of the encrypted data element) may be stored in the first data storage device 54 (e.g., first data storage device 54A of FIG. 2B) and the second encrypted data portion (of the encrypted data element) may be stored in the second data storage device 54 (e.g., second data storage device 54B of FIG. 2B). An example of transmitting the encrypted data portions (of an encrypted data element) into different data storage devices 54 is illustrated in FIG. 2B. Additionally (or alternatively), in particular embodiments, when a data storage device 54 includes two or more databases, encrypted data portions of the same encrypted data element may be stored in different databases of the same data storage device 54. Alternatively (or additionally), when an encrypted data element is broken up into encrypted data portions, each encrypted data portion (of that encrypted data element) may be stored in different unrelated locations of the same data storage device 54, in particular embodiments. For example, if an encrypted data element is broken into three encrypted data portions, the first encrypted data portion may be stored in a first location in the first data storage device 54 (e.g., the location at Column 1, Row 1 of a database), the second encrypted data portion may be stored in a second unrelated location in the first data storage device 54 (e.g., the location at Column 10, Row 15 of the database), and the third encrypted data portion may be stored in a third unrelated location in the first data storage device 54 (e.g., the location at Column 89, Row 115 of the database).

The encrypted data portions (of an encrypted data element) may be transmitted in any manner. For example, the encrypted data portions may be transmitted to the data storage devices 54 by the data management device 14, such as via one or more of storage transmissions 108. In particular embodiments, as a result of transmitting the encrypted data portions (of an encrypted data element) for storage in the data storage devices 54, the data management device 14 may receive (or otherwise know) the location where each encrypted data portion was stored (e.g., the first encrypted data portion may be stored at Column 2, Row 18 of the first data storage device 54 and the second encrypted data portion may be stored at Column 100, Row 29 of the second data storage device 54). In particular embodiments, indicators of the locations of the encrypted data portions may be stored by the data management device 14. For example, an indicator of the location of the first encrypted data portion may be stored in location database 46, and an indicator of the location of the second encrypted data portion may be transmitted for storage with, for example, the first encrypted data element (e.g., at Column 2, Row 18 of the first data storage device 54). As such, when the data management device 14 receives the token for the data element, the data management device 14 may be able to look up where the first encrypted data portion is stored. Furthermore, when the data management device 14 retrieves the first encrypted data portion, it may also retrieve an indicator of the location of the second data portion. Using this indicator, the data management device 14 may retrieve the second encrypted data portion.

Following transmission of the encrypted data portions (at step 232) or following the transmission of the entire encrypted data element (at step 236), the method 200 may move to step 240, where it is determined whether there are any other data elements. If there are more data elements, method 200 may move back to step 208, and steps 208-236 may be repeated for each data element. As such any number of data elements may be stored by data management device 14, and the data elements may be received for storage by any number of data user devices 62. If there are not any more data elements, method 200 may move to step 244, where method 200 ends.

Modifications, additions, or omissions may be made to method 200. For example, although the steps of method 200 are described above as being performed by data management device 14, in particular embodiments, one or more of the steps of method 200 may be performed by any other device. As another example, one or more steps of method 200 may be optional, or may not be performed. In particular embodiments, the step 236 of transmitting the entire encrypted data element may not be performed, as the encrypted data element may always be broken up into encrypted data portions. In particular embodiments, the step 212 of generating a token for the data element and the step 216 of transmitting the token may not be performed. Additionally, the steps of method 200 may be performed in parallel or in any suitable order.

Figure 3:
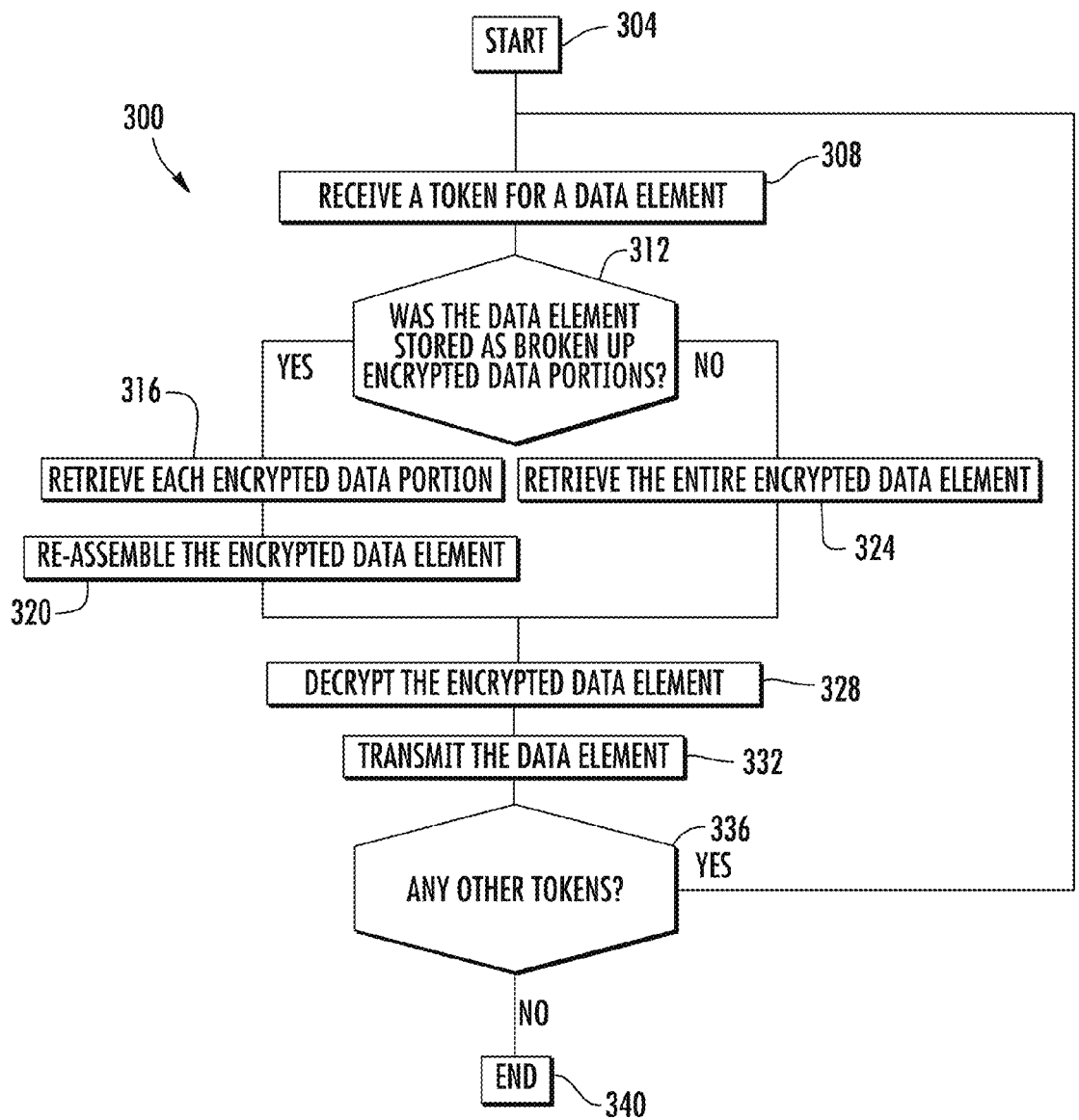
FIG. 3 illustrates an example method of retrieving a requested data element from storage.

FIG. 3 illustrates an example method of retrieving a requested data element from storage. In particular embodiments, one or more steps of method 300 may be performed by data management device 14 of FIG. 1. Furthermore, one or more steps of method 300 may be (or may be performed in response to) one or more data element requests 112, retrieval requests 116, retrieval transmissions 120, and/or data responses 124 of FIG. 1.

The method 300 begins at step 304. At step 308, a token for a data element is received. As is discussed above, a token may uniquely identify a particular data element stored by the data management device 14. The token may uniquely identify any data element discussed above with regard to FIGS. 1-2. Furthermore, the token may be received for any reason. For example, the token may be received in order to request that the data element uniquely identified by the token be retrieved and transmitted to the requestor (e.g., a business that desires to view or use the data element, such as a social security number). In such an example, a business (for example) may have stored a data element (e.g., a social security number of a customer) by transmitting the data element to the data management device 14. When the business desires to view (or use) the customer's social security number, an employee of the business may transmit the token to the data management device 14 (e.g., by clicking on the token, activating the token, or uploading the token), causing the token to be transmitted to the data management device 14 to request the social security number. The token may be received in any manner. For example, the token may be received from the data user device 62 via one or more data element requests 112.

At step 312, it is determined whether the data element was stored as broken up encrypted data portions. As is discussed above, a data element may be encrypted and then the entire encrypted data element may be transmitted (such as for storage), or the encrypted data element may be broken up into encrypted data portions and each encrypted data portion may be transmitted (such as for storage). Whether the data element was stored as broken up encrypted data portions may be determined in any manner. As an example, information regarding the data element may be stored by the data management device 14 in the location database 46 of FIG. 1. This information may include the token for the data element, an indicator of the location of the encrypted data element (or of one of the encrypted data portion of the encrypted data element), a data key used to encrypt the data element and/or decrypt the encrypted data element, metadata (or other information) associated with the data element, any other information, or any combination of the preceding. The metadata associated with the data element may include, for example, an indicator of whether or not the date element was stored as broken up encrypted data portions. In such an example, the received token may be matched to the token stored in the location database 46, and then the device management device 14 may access the metadata for the matched token to determine whether or not the data element was stored as broken up encrypted data portions.

If it is determined that the data element was not stored as broken up encrypted data portions (e.g., it was stored as an entire encrypted data element), the method 300 may move to step 324, where the entire encrypted data element is retrieved. The entire encrypted data element may be retrieved in any manner. As an example, as is discussed above, the location database 46 may include a token for the data element and an indicator of the location of the encrypted data element. In such an example, the received token may be matched to the token stored in the location database 46, and then the device management device 14 may access the indicator of the location of the encrypted data element. Furthermore, based on the indicator of the location of the encrypted data element, the data management device 14 may retrieve the entire encrypted data element. For example, if the indicator indicates that the encrypted data element is stored in a particular location (e.g., Column 2, Row 15 of the second data storage device 54 of FIG. 1), the data management device 14 may transmit a request to the second data storage device 54 (e.g., via retrieval request 116). In response to the request, the second data storage device 54, for example, may locate the requested encrypted data element and transmit the requested encrypted data element to the device management device 14. As another example, if the indicator indicates that the encrypted data element is stored in a particular location (e.g., Column 2, Row 15 of the second data storage device 54 of FIG. 1), the data management device 14 may directly access the second data storage device 54, locate the encrypted data element (e.g., at Column 2, Row 15), and retrieve the encrypted data element from storage.

On the other hand, if it is determined that the data element was stored as broken up encrypted data portions, the method 300 may move to step 316, where each encrypted data portion is retrieved. The encrypted data portions may be retrieved in any manner. As an example, as is discussed above, the location database 46 may include a token for the data element and an indicator of the location of an encrypted data portion of the data element (such as the first encrypted data portion of the data element). In such an example, the received token may be matched to the token stored in the location database 46, and then the device management device 14 may access the indicator of the location of the first encrypted data portion. Furthermore, based on this indicator of the location of the first encrypted data portion, the data management device 14 may retrieve the first encrypted data portion. Such a retrieval may be performed by requesting the first encrypted data portion from a data storage device 54, or directly accessing and retrieving the first encrypted data portion from the data storage device 54, as is discussed above with regard to step 324. In addition to retrieving the first encrypted data portion, the data management device 14 may also retrieve an indicator of the location of the second encrypted data portion of the encrypted data element (which may be stored with the first encrypted data portion, as is discussed above). Using this retrieved indicator, the data management device 14 may retrieve the second encrypted data portion for the data element. Furthermore, such a method of retrieval may continue until each encrypted data portion of the encrypted data element is retrieved.

Although the location database 46 has been described above including an indicator of the location of the first encrypted data portion of the data element, the location database 46 may include an indicator of the location of any of the encrypted data portions, such as the second encrypted data portion or the last encrypted data portion. Furthermore, although the indicator of the location of the second encrypted data portion has been described above as being stored with the first encrypted data portion, in particular embodiments, the location of the second encrypted data portion (or any other encrypted data portion) may be stored in any other location, such as with the third encrypted data portion (or any other encrypted data portion). In such embodiments, the encrypted data portions may be retrieved in any order (e.g., first encrypted data portion to last encrypted data portion, last encrypted data portion to first encrypted data portion, skipping around between encrypted data portions, etc.). Additionally, although the location database 46 has been described above as including an indicator of the location of only one encrypted data portion of the encrypted data element, in particular embodiments, the location database 46 may include an indicator of the location of any number of the encrypted data portions (such as all of the encrypted data portions, for example). Furthermore, the indicators of the locations of encrypted data elements (or encrypted data portions of encrypted data elements) may be encrypted, such as encrypted using one or more encryption methods 34, or any other method of encryption. In such embodiments, storing and retrieving the indicators may include encrypting and/or decrypting the indicators.

At step 320, the encrypted data element is re-assembled. The encrypted data element may be re-assembled in any manner. As an example, the first encrypted data portion may be combined with the second encrypted data portion (and with any other encrypted data portion of the data element) in order to re-assemble the encrypted data element. In such an example, if the first encrypted data portion is "9XL217", for example, and the second encrypted data portion is "48AF41", for example, the first encrypted data portion may be combined with the second encrypted data portion to re-assemble the encrypted data element into "9XL21748AF41", for example.

After the encrypted data element has been re-assembled (at step 320) or the entire encrypted data element has been retrieved (at step 324), the method 300 may move to step 328, where the encrypted data element is decrypted. The encrypted data element may be decrypted in any manner. In particular embodiments, the encrypted data element may be encrypted in an opposite manner of its encryption. In particular embodiments, the encrypted data element may be decrypted using one or more encryption keys 38, such as one or more data user keys, data keys, master keys, any other key, or any combination of the preceding. As one example, the data management device 14 may retrieve one or more master keys (discussed above), the data user key (discussed above) for the user of the data user device 62 that transmitted the token to the data management device 14 (or for the user of the data user device 62 that transmitted the data element to the data management device 14 for storage), and the data key (discussed above) for the data element. The master keys may be retrieved from, for example, memory 26 of FIG. 1. The data user key may be retrieved from, for example, memory 26 of FIG. 1 when the user of the data user device 62 has been authenticated by the data management device 14 and is communicating with the data management device 14 (such as when the user of the data user device 14 enters a password to log into an account with the data management device 14, and then transmits the received token). The data key may be retrieved from, for example, the location database 46 when the received token is matched to the token in the location database 46. Furthermore, the data user key and the data key may both be decrypted using the one or more master keys (such as by, for example, performing a MD5 one-way hash of the master keys). Additionally, after the data user key and the data key have been decrypted, the data user key and the data key may be used to decrypt the encrypted data element, such as using, for example, one or more encryption methods 34.

After the encrypted data element has been decrypted (at step 328), the method 300 may move to step 332, where the data element is transmitted. The data element may be transmitted to any device, such as, for example, the data user device 62 of FIG. 1. In particular embodiments, the data element may be transmitted to the device (such as data user device 62 of FIG. 1) that transmitted the token to the data management device 14. In further embodiments, the data element may be transmitted to a device (such as a third party device) that was identified by the data user device 62 that transmitted the token to the data management device 14. The data element may be transmitted in any manner. For example, the data element may be transmitted to the data user device 62 by the data management device 14, such as via one or more of data responses 124. As such, a data user device 62 associated with, for example, a business may view (or use) the data element (such as a customer's social security number).

At step 336, it is determined whether there are any other tokens. If there are more tokens, method 300 may move back to step 308, and steps 308-332 may be repeated for each token. As such any number of data elements may be retrieved by data management device 14, and the data elements may be requested by an number of data user devices 62 (or other devices). If there are not any more tokens, method 300 may move to step 340, where the method 300 ends.

Modifications, additions, or omissions may be made to method 300. For example, although the steps of method 300 are described above as being performed by data management device 14, in particular embodiments, one or more of the steps of method 300 may be performed by any other device. As another example, one or more steps of method 300 may be optional, or may not be performed. In particular embodiments, the step 308 of receiving a token may not be performed, as retrieval of a data element may be requested in a different manner. Additionally, the steps of method 300 may be performed in parallel or in any suitable order.

Also disclosed is a system and method of securely preloading data to a device and controlling operational use or access to the preloaded data by the device, which in some embodiments may be further performed remotely and in real time. Such a system may be separate or integrated with the data storage and retrieval system 10. For example, controlling access to the preloaded data may employ various operations such as tokenization methods, key generation methods, and including, but not limited to, remote transmissions to the preloaded device that identify specific preloaded data for processing by a preloaded device processor. In another example, the data management device 14 or another device and the data management device 14 may be used to categorized or define domains for data loaded into and stored in the data storage device 54. The data management device 14 or another device and the data management device 14 may retrieve the stored data, specially encrypt and tokenize the data according to a unique encryption protocol, and preload the data onto a device such that the device may be later remotely instructed as to when which portions or sets of preloaded data are to be processed and acted upon.

The remote instruction may include identifying transmissions such as payloads identifying one or more sets of preloaded data. The payloads may comprises a token corresponding to a token stored on the device that identifies particular tokenized and encrypted portions of preloaded data. For example, the identifying transmission may include a token that may be matched to a token associated with tokenized and encrypted data preloaded on the preloaded device.

Some or all of the preloaded data may be encrypted with one or more encryption keys. Processing may further include decrypting the identified preloaded tokenized data. The preloaded data may include one or more keys. One or more of the keys may also be tokenized or encrypted with another key such that it may be decrypted by the processor at a desired time, e.g., when instructed to do so by the information or instance of receiving the identifying transmission. In one embodiment, decrypting requires utilizing data within the identifying transmission. In another embodiment, decrypting may be performed without utilizing data within the identifying transmission. As described below, the processed preloaded data may instruct or define operations of the device to remotely control the operations of the device.

Figure 4A:
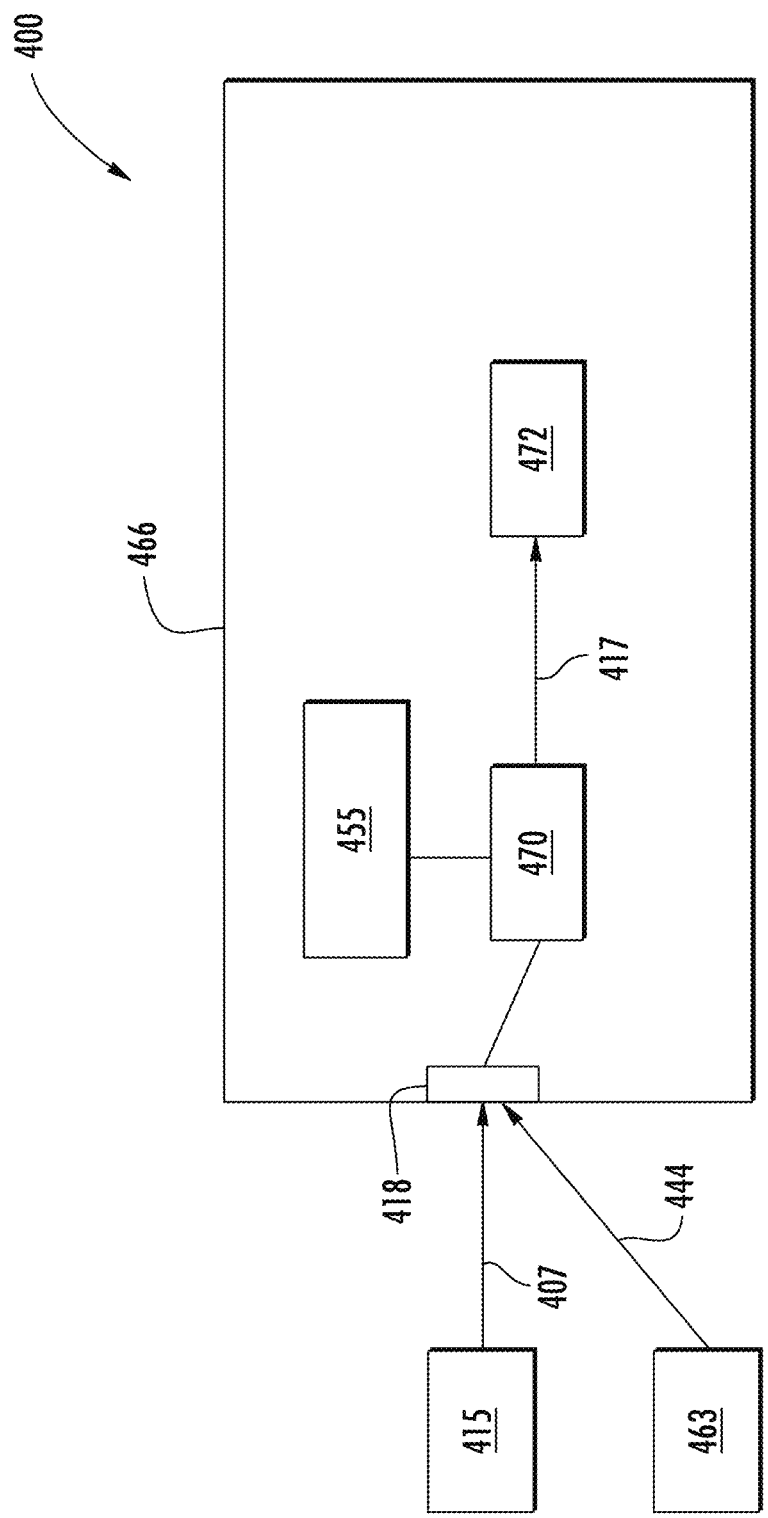
FIG. 4A schematically illustrate various features of a system providing controlled access to preloaded data according to various embodiments described herein.
Figure 4B:
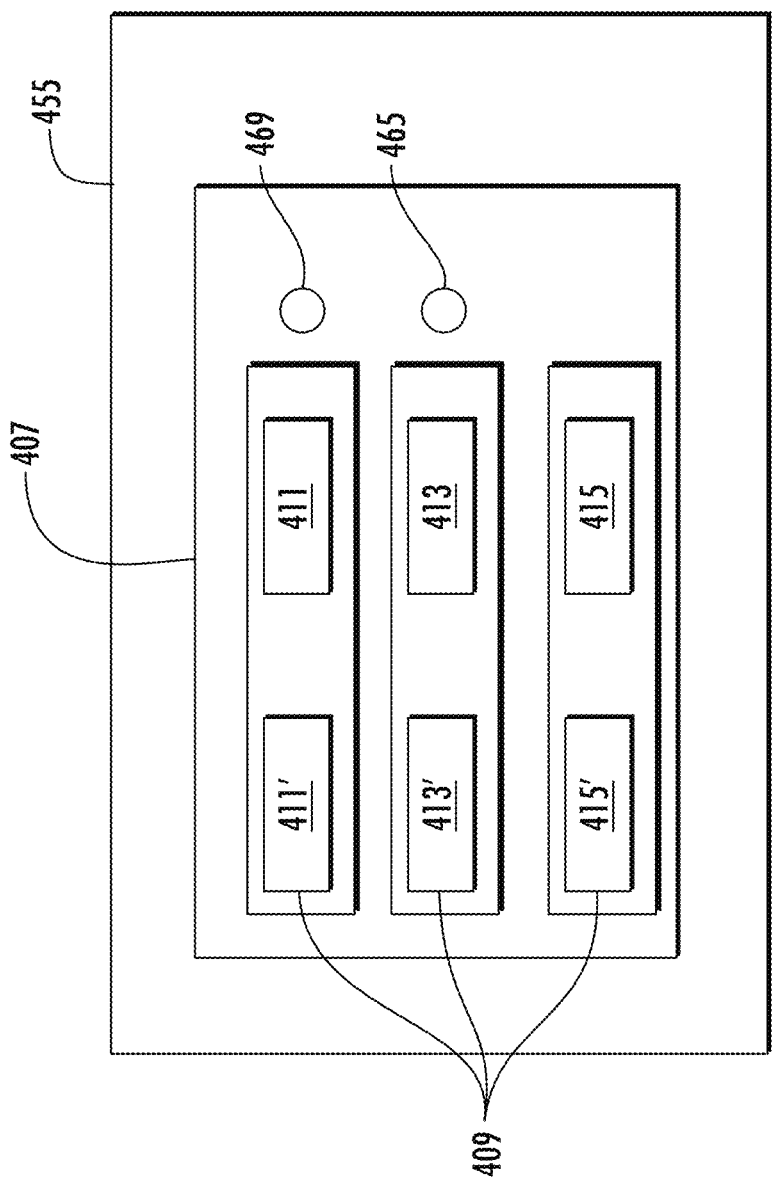
FIG. 4B schematically illustrate various features of a system providing controlled access to preloaded data according to various embodiments described herein.
Figure 4C:
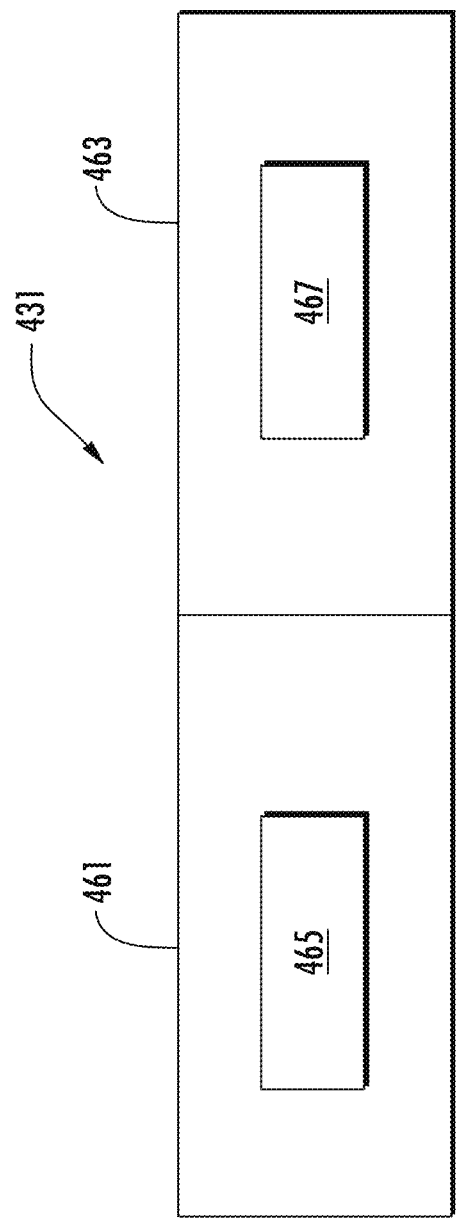
FIG. 4C schematically illustrate various features of a system providing controlled access to preloaded data according to various embodiments described herein.

FIG. 4A-4C schematically illustrate various features of a system 400 of securely preloading data 407 to a device 466 and controlling operational use or access to the preloaded data 407, which may include remotely controlling use, access, or identification, according to various embodiments. The device 466 may be referred to herein as preloaded device 466, which in at least one embodiment comprises a remote device. Those having skill in the art will appreciate that various benefits described herein may be obtained with a preloaded device 466 that may not necessarily be a remote device and may be a device local or in local communication with a communication device 463 for transmitting an operational instruction. However, to more fully describe benefits attendant to the method and system that may be realized in a remote environment, the preloaded device 466 may be referred to herein as a remote device that is remote from the communication device 463 that transmits identifying transmission 444 used to identify certain preloaded data 407 stored on the preloaded device 466, e.g., for real time processing and operational use.

The system 400 is preferably configured to randomly and securely preload data 407 on the preloaded device 466. A loading device 415, for example, may be used to initially prepare or process the preloaded data 407 and/or preload the data 407 onto the preloaded device 466. The loading device 415 may, in at least one embodiment, comprise data management device 14 and/or data storage device 54. In another embodiment, the loading device 415 also comprises user device 26. In still another embodiment, the loading device 415 comprises a device configured to specially encrypt and tokenize data and preload the data 407 on the preloaded device 466. Preferably, at least part of the data 407 preloaded onto the preloaded device 466 is encrypted with a multi-part encryption protocol. The preloaded device 466 may comprise a computer/data processor 470 and data storage medium 455 comprising instructions executable by the processor 470 to perform an operation of the preloaded device 466, e.g., a vehicle. The data storage medium 455 may comprise preloaded data 407 that may be identified in an identifying transmission 444 and processed by the processor 470 to generate processed or usable data 417. The processed data 417 may be provided to a device application 472 and used to provide an operation of the preloaded device 466. The processor 470 may however be unable to properly process, e.g., read, act upon, or sequence, some or all of the preloaded data 407 unless instructed to do so. For example, the preloaded data 407, may be encrypted and tokenized as described herein.

The preloaded data 407 may be any type of data that may be preloaded on the preloaded device 466, e.g., a computer readable data storage medium 455 associated with the preloaded device 466 or an application 472 or system providing local control of the preloaded device 466. In certain embodiments, the preloaded data 407 comprises data the preloaded device 466 uses or acts upon, e.g., incorporates into an operation, delivers to the device application 472 for operational use, or performs additional data processing defined by the processed data 417. The preloaded data 407, when processed, may define an action or manner or content of a calculation, transmission, or action to be performed, in whole or in part, e.g., with preloaded device operation software, firmware, etc. The processed data 417 may provide a coordinate, instruction, or data point, for example, that may be integrated into the operations application 472 running on the preloaded device 466 such that the integration of the processed data 417 modifies, instructs, or defines an operation of the preloaded device 466. In another example, the processed data 417 may provide an instruction or directive such as "adjust heading" to a particular coordinate.

The system 400 may further be configured to transmit identifying transmissions 444 to the preloaded device 466. For example, the preloaded device 466 may include a communication port 418, e.g., receiver or transceiver, configured to receive wireless transmissions from the communication device 463. The transmissions may include identifying transmissions 444 that identify preloaded data 407 or a set 409 thereof for processing by the preloaded device 466, e.g., remotely and in real time. Processing of the identified preloaded data 407 or set 409 may instruct a use or action defined at least in part by the processed data 417. The preloaded device 466 may therefore comprise a remote device configured to receive identifying transmissions 444 from a communication device 463 that identify one or more sets 409 of preloaded data 407 stored in the data storage medium 455 to control an operation of the preloaded device 466.

The identifying transmissions 444 may include token transmissions that may be used by the preloaded device 466 to identify elements, pieces, or portions of the preloaded data that the preloaded device 466 is to retrieve from the storage medium 455. The identifying transmissions 444 or the identified preloaded data 407 retrieved by the preloaded device 466 may further be acted on, e.g., processed by device processor 470 and/or delivered to a device application 472 to be processed and/or acted upon by the device 466, e.g., the application 472. In one embodiment, the preloaded device 466 is configured to receive and act on, in real time, identified preloaded data 407 comprising encrypted instructions retrieved and processed from the storage medium 455 and decrypted using a multi-part key. For example, data may be securely placed on the preloaded device 466 and at the time the data is needed, a identifying transmission 444 comprising a token transmission may be transmitted to the preloaded device 466. The preloaded device 466 or processor 470 may use the token transmission to process, e.g., identify and safely decrypt, the identified preloaded data 407 so that it may act as prescribed by the processed data 417.

FIG. 4B schematically illustrates data 407 preloaded in storage medium 455. The data 407 comprises one or more preloaded tokenized data sets 409, which may comprise a listing or other data structure. The tokenized data sets 409 comprise tokenized and encrypted data 411, 413, 415 and associated tokens 411', 413', 415'. It will be appreciated that tokenized data sets 409 may include various or multiple categories, domains, or types of data and the present disclosure is not intended to be limiting in this respect unless stated otherwise. The encrypted data 411, 413, 415 may be encrypted and/or tokenized by the loading device 415 or another device prior to or during loading the preloaded device 466. The encryption may be performed using a suitable encryption method, which may be an encryption method 34 as described above, and preferably includes a multi-part key 431, as generally illustrated in FIG. 4C. The multi-part key 431 includes at least a first part 461 and a second part 463. The first part 461 comprises a device key 465, which may also be referred to as a remote device key 465. The device key 465 is a key known to, e.g., operatively programmed into, stored by, and/or accessible by the preloaded device 466 to decrypt data. The second part 463 comprises a storage key 467. The storage key 467 may be encrypted and tokenized with the device key 465 and stored in the storage medium 455 as a loader key 469. FIG. 4B illustrates a single loader key 469; however, in some embodiments, multiple loader keys 469 may be used. For example, a different or same loader key 469 may be stored or associated with or applicable to (as described in more detail below) each tokenized data set 409, all tokenized data sets 409, or a pre-selected set or subset of multiple sets of tokenized data sets 409, e.g., among a subset of token listings 411', 413', 415' or associated encrypted data 411, 413, 415.

As introduced above, according to various embodiments, the identifying transmission 444 comprises a token transmission including a token 419. When the preloaded device 466 receives the identifying transmission 444, the processor 470 is configured to use the token 419 to identify a tokenized data set 409. For example, in one embodiment, the processor 470 compares the token 419 to the listing of preloaded tokens 411', 413', 415'. If the token 419 matches one or more preloaded tokens 411', 413', 415', e.g., token 411', the device processor 470 selects the encrypted data 411 associated with the matched token. The processor 470 may then attempt to decrypt stored data with the device key 465 to obtain the storage key 467 and generate the multi-part key 431. As introduced above, the device 466 may attempt to decrypt all preloaded data 407, a set 409 or subset of the data, e.g., tokens 411', 413', 415' 409 or token listing, tokenized encrypted data elements 411, 413, 415, a predefined domain, or domain within the storage medium 455 of preloaded data 407 identified by the transmission 444. Because the tokenized loader key 469 has been encrypted using the preloaded device key 465, the device processor 470 is able to decrypt the tokenized loader key 469 to identify the storage key 467. Having both the device key 465 and storage key, the device processor 470 may then generate the multi-part key 431 by assembling the first part 461 comprising the device key 465 and the second part 463 comprising the decrypted storage key 467. Using the multi-part key 431, the device processor 470 may decrypt the identified encrypted data 411, 413, 415, e.g., encrypted data 411, to receive the instruction or otherwise act on the data 417, e.g., through delivery of the data to application 472. For example, the processor 470 may perform an instruction defined by the data 417 or transmit the data 417 to a device operation application 472 for the same.

In a further embodiment, the identifying transmission 444 may include obfuscation elements configured to obfuscate relevant elements of the transmission 444. In one such embodiment, the obfuscation elements comprise fake, irrelevant, or pseudo elements of the data transmission configured to dilute the real or relevant elements. For example, in one embodiment, the identifying transmission 444 includes a chaff token transmission. The chaff token transmission may include multiple tokens, e.g., tens, hundreds, thousands, or more, chaff tokens transmitted along with the token 419. The processor 470 may compare the chaff tokens along with the token 419 to identify the data set 409 as described above. Because the chaff tokens do not match the preloaded tokens 411', 413', 415', the device processor 470 is able to disregard the chaff. However, a party intercepting the identifying transmission would be unable to separate the token 419 from the chaff tokens. Another aspect of the chaff beyond causing confusion to an intercepting party or device by complicating simplicity of a single token is that it may generally take longer to deal with the data and longer for a potential hacker to do something to that data stream even if intercepted. That is, by the time the potential hacker figures out the protocol, the real data may already be determined and acted upon by the preloaded device 466 and/or intrusion detection systems have already detected the potential hacker or even sniffed out the potential hacker's location.

In any of the above embodiments, the preloaded tokens 411', 413', 415' may be preloaded with a defined count limit. The count limit may be used to limit the number of times an identifying transmission 444 identifying that token 411', 413', 415' may be validated for decryption processing of the associated encrypted data 411, 413, 415. The count limit may be preset at the time of preloading of the data 407 to the preloaded device 466 and/or at an earlier time, such as when the underlying data was generated or loaded into the loading device 415, as described in more detail below. The usage counter may be beneficial to prevent parties or devices from intercepting the transmission 444 and then subsequently resending or mimicking the previous transmission 444 to cause the preloaded device 466 to respond/receive the instruction again. If the usage count is at one, for example, the preloaded device 466 would match the token 419 and proceed to processing the associated encrypted data, if in the first instance. However, if in a subsequent instance, the processor 470 would not match or would disregard the token 419.

Figure 5:
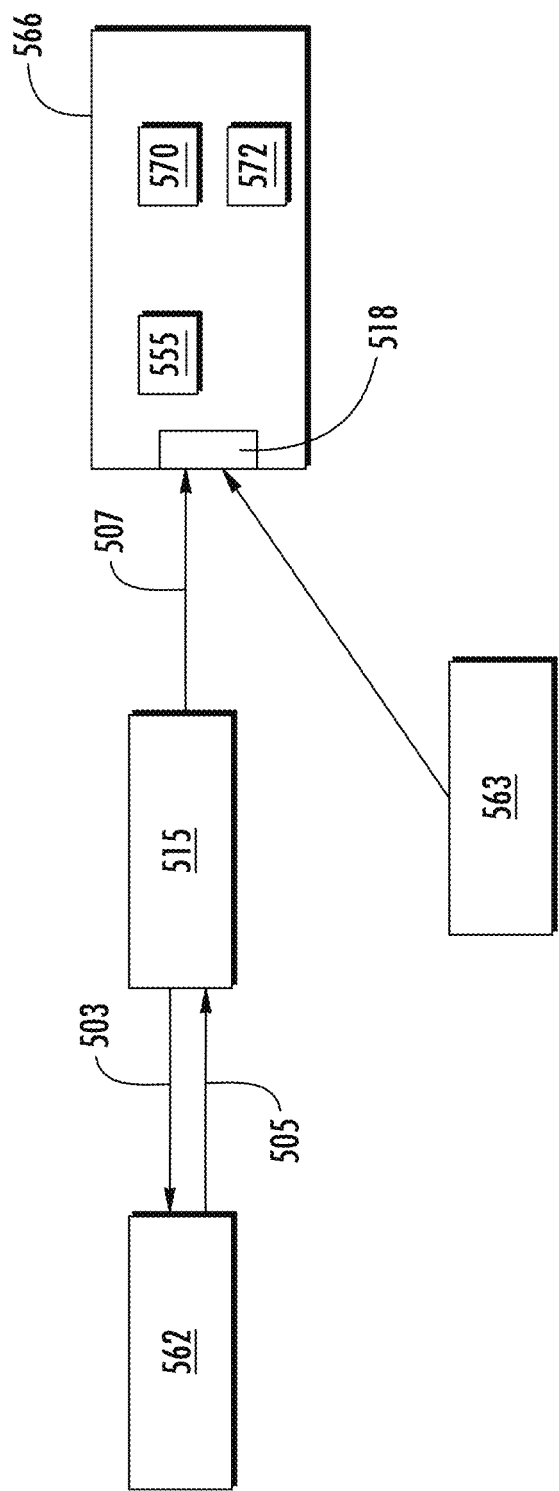
FIG. 5 schematically illustrates a system providing controlled access to preloaded data according to various embodiments described herein.

FIG. 5 illustrates additional components that may be included in a system 500 providing controlled access to preloaded data according to various embodiments. A first loading device 562, which may be similar to data user device 62, may load data onto an intermediate or second loading device 515, which may be similar to loading device 415. The second loading device 515, for example, may comprise a data management system similar to data management system 14 and, in at least one embodiment, may further comprise a data storage device, which may be similar to data storage devices 54. The first loading device 562 may load data 505 onto the second loading device 515. In one embodiment, the first loading device 562 may specify count limits for all or part of the loaded data 505 or data elements. The first loading device 562 may further assign categorization data to different domains or types of data.

The second loading device 515 may receive the data 505 from the first loading device 562, which may include the count limits and assignments. The second loading device may tokenize the data 505 for storage in a data storage medium, which may be similar to data storage medium 54, and transmit tokens 503 to the first loading device 562 referencing the tokenized data 505. The second loading device 515 may further generate storage and device keys; encrypt the data 505 with a multi-part key comprising the storage and device keys (see, e.g., FIG. 4C); tokenize the data 505; generate associated tokens; and encrypt the storage key with the device key to generate the loader key. The second loading device may further load the above data 507, including the tokenized data sets 509 onto the device 566, which may be similar to preloaded device 466. The tokenized data 509 may be preloaded to a storage medium 555 accessible by processor 570. The processor 570 may be configured to handle the data 507 in a manner similar to processor 470 for delivery to device system 572. As described in more detail below, in one embodiment, the storage key may be generated from the first loading device 562. However, it will be appreciated that in some embodiments the storage key may be generated from other sources or randomly. Identifying transmissions 544 may be transmitted to the preloaded device 566 from a controller or communication device 563, which may be similar to communication device 463. The communication device 563 may be the first loading device 562, the second loading device 515, or one or more separate or independent devices.

Figures 6A, 6B:
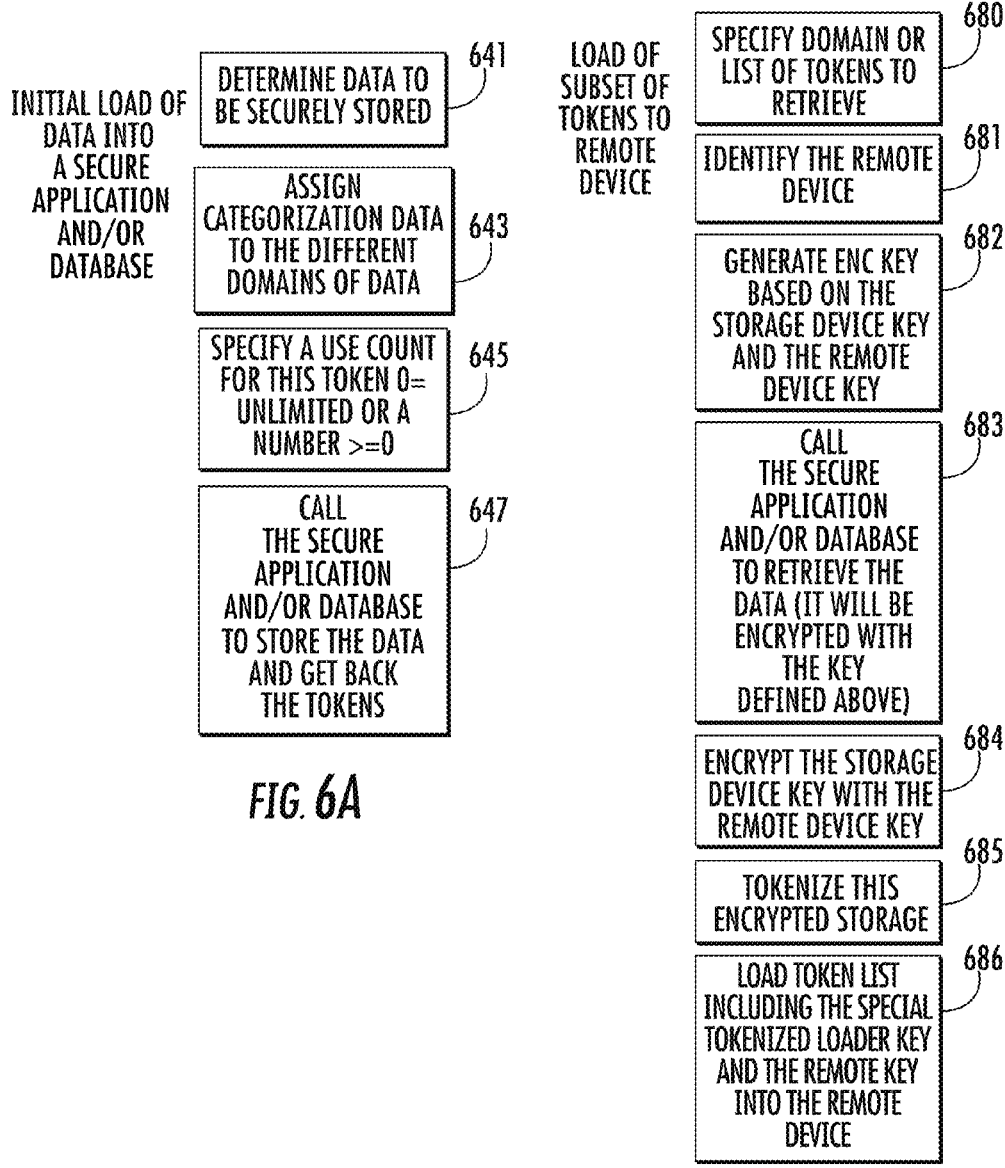
FIG. 6A is a flow diagram illustrating a method of loading data into a secure application and/or database for use with a system providing controlled access to preloaded data according to various embodiments described herein.
FIG. 6B is a flow diagram illustrating a method of loading a subset of tokens loaded into a secure application and/or database to a preloaded or remote device in a system providing controlled access to preloaded data according to various embodiments described herein.
Figure 6C:
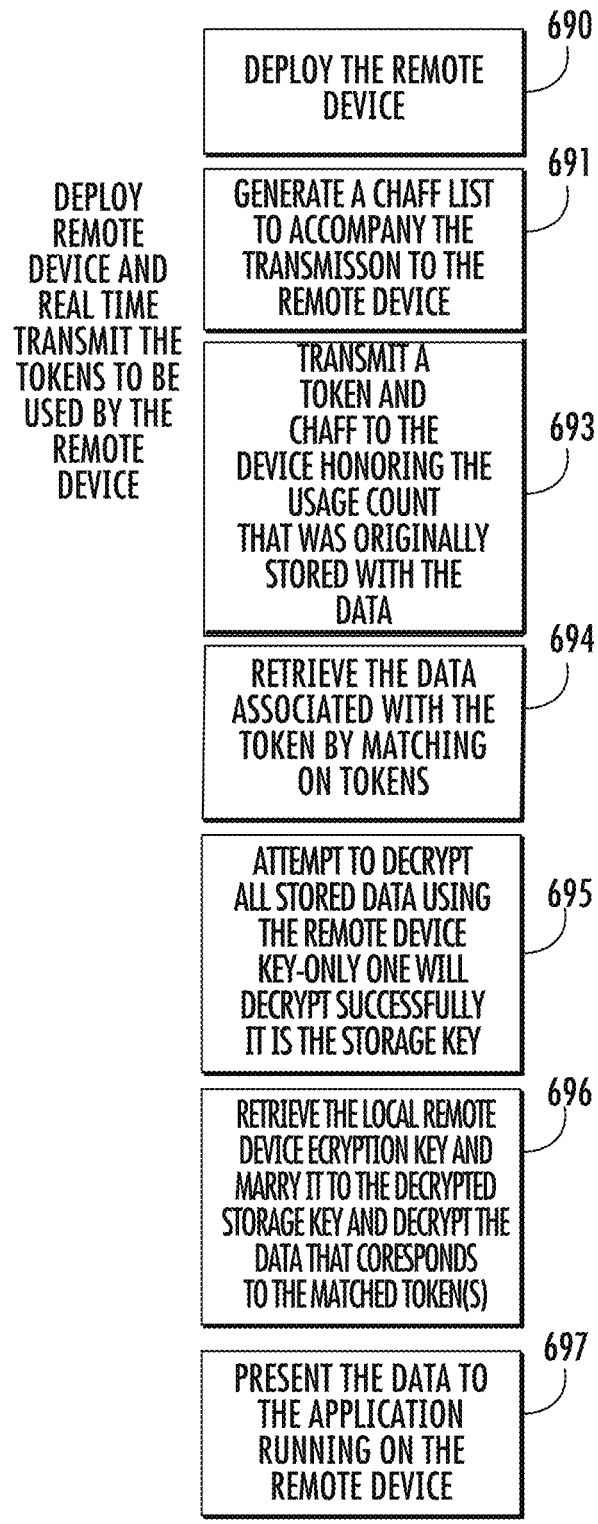
FIG. 6C is a flow diagram illustrating a method of communicating and identifying in real time tokens to be used by a deployed preloaded device in a system providing controlled access to preloaded data according to various embodiments described herein.

FIGS. 6A-6C provide a flow diagram of various operations of a method and system configured for controlled access to preloaded data. The system may be similar to systems 400 and 500 described above.

In a first operation, referring to FIG. 6A, data may be prepared for loading into a secure application and/or database, which may be performed by a device such as first loading device 562, second loading device 515, or data management system 14, in an initial loading operation. In one embodiment, the initial loading operation may be performed by a first loading device, which may be similar to first loading device 562 or data user device 62, for loading into a secure application or database, which may be similar to second loading device 515, or data management system 14. At step 641 data to be securely stored is determined. For example, data comprising confidential, sensitive, or secret information for secure storage and use at other places or by other devices may be identified and defined. The data may be any type of data. In one example, the data comprises instructions for an appliance to react in a certain way in its environment.

A user or program running on the loading device may be used to assign categorization data to the different domains of data at step 643. This step may be used to allow the user, program, or application to assign specific categorization data to the data that will assist in defining the domain of the data being put into the secure application and/or database. On an individual, separate or group item basis, a use count may be defined at step 645. For example, the use count may be set or defined to be unlimited or a fix count. In one embodiment, the use count may be set to revolve, increase, or decrease upon the occurrence of a particular event that is not a use. At step 647 the data is called to or transmitted to the secure application or database for storage and tokenization, which may be similar to transmission and tokenization processes described above with respect to FIGS. 1-3. Thus, the first loading device or a system managing the first loading device receives a token list for the data that may include thousands of tokens, for example, replacing or referencing tokenized data stored in the secure application and/or database.

In a second operation, referring to FIG. 6B, a subset of tokens may be loaded to a device (a preloaded device) that will be preloaded with the data in a secure manner such that at a later time the preloaded device may be instructed to use the data. The preloaded device may not have the ability to operationally use the preloaded data absent identification or instruction. At step 680 a domain or list of tokens to be retrieved is specified. The domain or list of tokens may be specified by a loading device or program, including a processor, which in some embodiments may be a user data device or program, configured to interface with the secure application and/or database. The loading device may be or be associated with the first loading device or may be a separate device or program having access to the domains or tokens. Next, the device to be preloaded is identified, such as with an identifier or identification number obtained or generated at step 681.

At step 682, a multi-part encryption key is generated having a first part comprising a preloaded device key that is based on the preloaded device and a second part comprising a storage key (see, e.g., FIG. 4C), which, in this embodiment, is based on the first loading device or key of the first loading device. Thus the first part of the multi-part key may belong to the preloaded device and the second part may belong to the first loading device. Accordingly, the multi-part key will be unique because half of the key belongs to the device that generated and/or loaded the data and the other half belongs to the device that stores that data and that is to be instructed to use the data.

At step 683, the loading device calls the secure application and/or database to retrieve the stored data. The loading device encrypts the data with the multi-part encryption key and encrypts the storage key with the first loading device key at step 684. At step 685, the loading device tokenizes the encrypted storage key to generate a loader key. The loader key may be the only item tokenized with a different key, e.g., the remainder may be encoded with the multi-part key. At step 686, the tokenized data comprising the token list and the associated encrypted data as well as the loader key and preloaded device key are loaded onto the preloaded device. In an alternate embodiment, the secure application and/or database performs one or more of receives and/or generates a storage key and the preloaded device key, generates the multi-part encryption key, encrypts the data with the multi-part key, and loads the tokenized data and/or keys on the preloaded device. In various embodiments, the steps of FIG. 6B may be performed once per device prior to deployment, so that each device deployed to the field includes a unique encryption key wherein half of the key belongs to the device or entity that is associated with, e.g., that owns or manages, the data, and the other half belongs to the device that is going to use the data, which has a token representing the actual key, the storage half of the key, that is stored in computer readable memory on the device.

In a third operation, referring to FIG. 6C, the preloaded device may be deployed to the field, e.g., in the wild, in step 690, where it may not be connected to the whole set of data in the first loading device but within its programmable read-only memory it may have the specified list of tokens and the tokenized data that is associated with it set up and loaded in steps 680-686 in FIG. 6B. The steps of the third operation may be similar to or correspond to those described above with respect to FIGS. 4A-5. A communication device, which may be a data user device 26, communication device 463/563, the first loading device 562, the secure application or database, the second loading device 515, the secure management system 14, or another device may be used to send an instruction in an identifying transmission to the preloaded device comprising a token or list of tokens that may be used, e.g., by matching, to identify tokens and associated tokenized data stored on the preloaded device. As introduced above with respect to FIGS. 4A-4C, the identifying transmission may also include a chaff list. In such an embodiment, the chaff list may be generated prior to the identifying transmission at step 691. A chaff list may include a list of a variable or fixed number of fake or pseudo items transmitted along with one or more real items, e.g., tokens, that are intended to be recognized by the preloaded device and acted on with some instruction. The preloaded device may determine or identify the fake or pseudo items as irrelevant or otherwise not identifying of the preloaded data to be acted upon, e.g., by attempting to match the fake or pseudo items in the chaff list to preloaded references or tokens and disregarding that portion of the transmission after failing to obtain a suitable match for the items.

The identifying transmission may be transmitted at step 693 to the preloaded device. The identifying transmission may be any manner of communication, e.g., over the internet, or over some other wireless communication protocol. The identifying transmission may further honor a usage count, e.g., that was preset during initial load of the data described above with respect to FIG. 6A. Thus, if the token to be transmitted in the identifying transmission for instructing the preloaded device was set at 1 and the token has previously been used, the token would not be effective to instruct the preloaded device.

At step 694, the preloaded device retrieves the data associated with the token or tokens transmitted by the communication device by matching the token or tokens to corresponding tokens in the token list that has been preloaded onto the preloaded device. The communication device may transmit the identifying transmission for receipt and subsequent performance or delivery of the instruction identified by the token. With the real time transmission in step 693, including the chaff list and the matching token, e.g., one good token, the preloaded device processor takes the list and compares it to all the tokens it has stored in its memory store to identify a match, which there will be a single match when only one good token is transmitted. Thereby having identified the encrypted tokenized data defining the instructions to be acted on, in step 694, the preloaded device processor is programed to attempt to decrypt all the data it has internally with the preloaded device key, in step 695.

As described above with respect to FIGS. 4A-5, in various embodiments, the preloaded device processor may attempt to decrypt all preloaded data, a set or subset of the tokenized data, e.g., tokenized data or elements thereof identified by the token, or a predefined domain within the storage medium of preloaded data. For example, in one embodiment, the preloaded device processor compares the transmitted token to the listing of preloaded tokens. If the transmitted token matches one or more preloaded tokens the processor selects the encrypted data associated with the matched token. The device processor then attempts to decrypt the preloaded data with the device key. Because the tokenized loader key has been encrypted using the preloaded device key, the processor is able to decrypt the tokenized loader key to identify the storage key. The processor then generates the multi-part key at step 696 by assembling the first part comprising the preloaded device key and the second part comprising the decrypted storage key. Using the multi-part key, the processor decrypts the encrypted data and acts on the data. For example, the device processor may perform an instruction defined by the data or transmit the data to a device application running on the preloaded device to act on the identified decrypted data, as indicated at step 697.

The method and system may beneficially allow remote communications to provide operational instructions in real time by employing identifying transmissions that need not include the operational instructions. Such remote communications, for example, may identify data or instructions that are accessible or preloaded with respect to the device to be instructed or controlled. Interception of the remote communication will not reveal the instructions through analysis of the data transmitted. In various non-limiting applications, the present systems and methods may find application in areas of remote control or instruction of devices or systems such as vehicles, including unmanned vehicles and aircraft, ordnance, probes, satellites, power plants, security systems, communication systems, financial transactions, manufacturing plants, and residential utilities management systems, for example.

Also disclosed is a system and method of securely controlling a device, such as a remote device. Typically, in order to control a device (such as an unmanned vehicle that operates remotely from a controller system), instructions are transmitted to the device, and the device will then perform the instructions that it has received. For example, an unmanned vehicle (such as an unmanned truck) may be in wireless communication with a controller system that may be operated by an operator (such as a human driver). In such an example, the operator may utilize a controller system (such as a steering wheel or joystick) to instruct the unmanned truck to "turn left." This "turn left" instruction may be transmitted to the unmanned vehicle, and the unmanned vehicle will perform the instruction by turning left. Such a typical procedure for controlling a device, however, may be deficient. For example, an unauthorized entity (such as a hacker) may be able to listen to, capture, or otherwise access the wireless transmission of the "turn left" instruction. This may allow the unauthorized entity to prevent the instruction from ever reaching the device (causing the device to not "turn left"), may allow the unauthorized entity to delay the instruction (causing the device to "turn left" at a different time than originally instructed), may allow the unauthorized entity to spoof the controller system and take control of the device (causing the device to "turn right" or "shut down"), may allow the unauthorized entity to perform any other action with regard to the device, or any combination of the preceding.

Figure 7A:
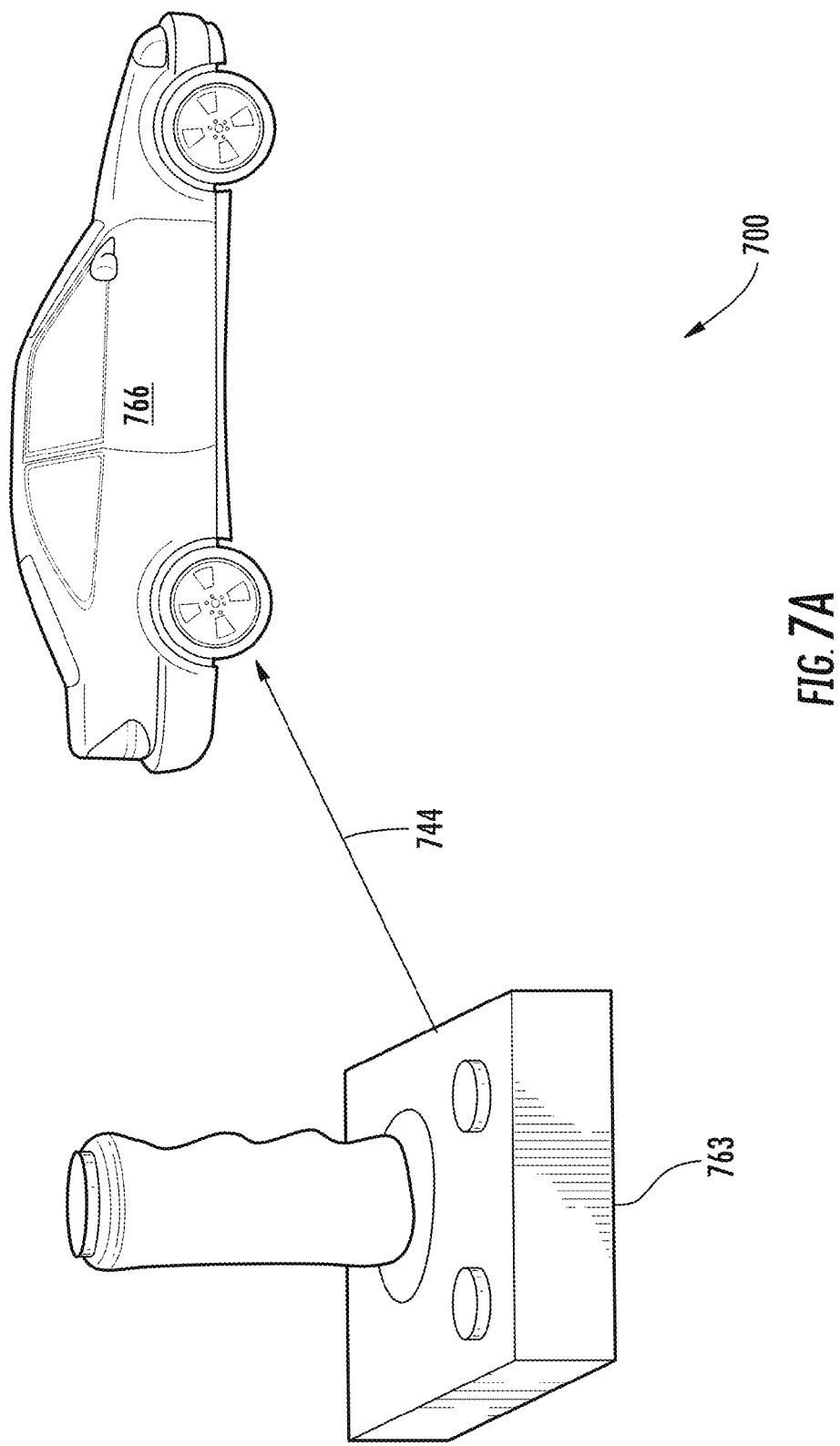
FIG. 7A schematically illustrates various features of a system for controlling a device according to various embodiments described herein.
Figure 7C:
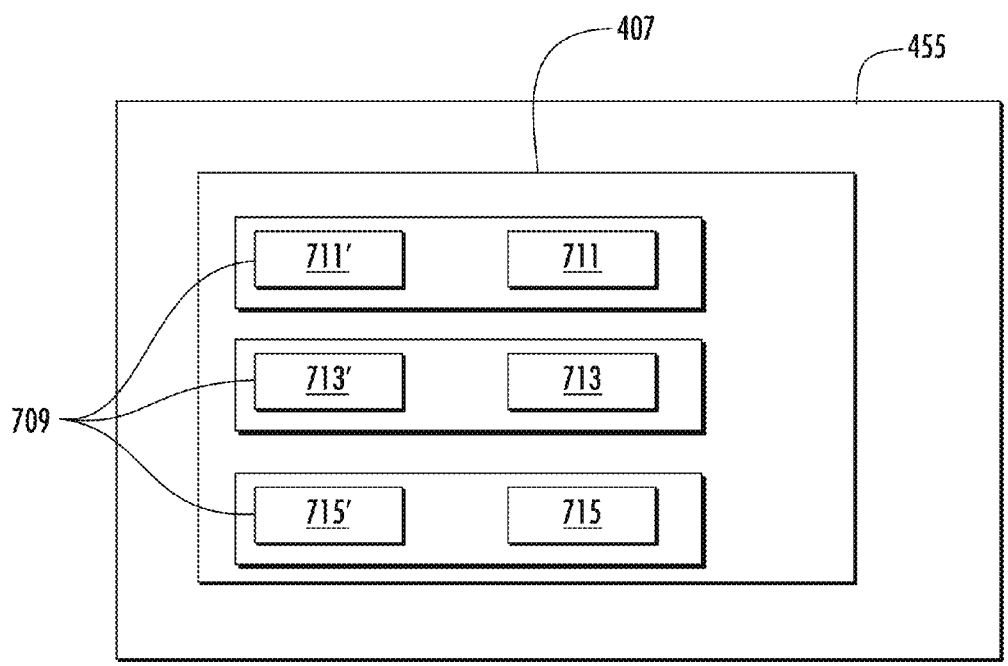
FIG. 7C schematically illustrates various features of a system for controlling a device according to various embodiments described herein.

The systems and methods of FIGS. 7A-7C, however, may control a device in a manner that provides various advantages, in particular embodiments. According to one embodiment, the system (e.g., a controller) and/or method may determine an instruction (e.g., "turn left") to be performed by a device (e.g., a remote device, such as an unmanned vehicle). The device may include preloaded instructions (e.g., "turn left", "turn right", "stop"), including a preloaded instruction (e.g., "turn left") that matches the instruction (e.g., "turn left"). The system and/or method may further determine a token (e.g., a set of characters, such as "58U48"). The remote device may further include preloaded tokens (e.g., "58U48", "09H12", "MN129") associated with the preloaded instructions (e.g., "turn left", "turn right", "stop"), including a preloaded token (e.g., "58U48") that matches the token (e.g., "58U48") and that is associated with the preloaded instruction (e.g., "turn left"). The system and/or method may further transmit the token to the device. Following reception of the token, the device may match the token to the preloaded token. Furthermore, based on the match, the device may determine the preloaded instruction and perform the preloaded instruction (e.g., "turn left"). In particular embodiments, this may allow the system and/or method to cause the device to perform one or more instructions, without transmitting the actual instruction to the device. Instead, in particular embodiments, the system and/or method may transmit a token, which may cause the device to find an instruction preloaded on the device, and may further cause the device to perform that preloaded instruction. As such, the system and/or method may not transmit an instruction at all, thereby preventing an unauthorized entity from listening, capturing, or otherwise accessing the instruction.

According to a further embodiment, the system (e.g., a controller) and/or method may generate a new token (e.g., "95Q5S") for association with the instruction (e.g., "turn left"), following transmission of the token. The device may also generate a new preloaded token (e.g., "95Q5S") for association with the preloaded instruction (e.g., "turn left"), following reception of the token. In particular embodiments, this may allow the system and/or method to cause the device to perform the same instruction again, without using the same token (which may now be obsolete). Instead, a new token may be used to cause the device to perform the instruction again. As such, even if an unauthorized entity were to listen to, capture, or otherwise access the original token, the unauthorized entity may be unable to use that original token to control the device, because that original token may now be obsolete.

FIGS. 7A-7C schematically illustrate various features of a system 700 for controlling a device 766. The device 766 may be referred to herein as preloaded device 766. The preloaded device 766 may be any device that may perform one or more instructions. For example, the preloaded device 766 may be an unmanned vehicle (e.g., an unmanned truck) that may perform one or more instructions (e.g., "turn left", "turn right", "stop", "go", "speed up" "slow down"). As another example, the preloaded device 766 may be light control system (e.g., light bulb) that may perform one or more instructions (e.g., "turn on", "turn off", "run schedule where light is turned on at 6:00 PM and turned off at 1:00 AM", "increase light" "dim light"). As a further example, the preloaded device 766 may be a motorized robot that may perform one or more instructions (e.g., "turn left", "turn right", "stop", "go", "raise left arm", "raise right arm"). As another example, the preloaded device 766 may be an unmanned flying aircraft (e.g., a drone) that may perform one or more instructions (e.g., "turn left", "turn right", "go up", "go down", "increase speed", "decrease speed", "take a picture", "release a package"). As a further example, the preloaded device 766 may be a garage door opener that may perform one or more instructions (e.g., "open", "close"). Further examples of preloaded devices 766 may include any vehicles (including unmanned vehicles and aircraft), ordnance, probes, satellites, power plants, security systems, communication systems, financial transaction systems, manufacturing plants, residential utilities management systems, any other devices that may perform one or more instructions, or any combination of the preceding. Additional examples of the preloaded device are discussed above with regard to preloaded device 466 of FIGS. 4A-6C. As illustrated in FIG. 7B, the preloaded device 766 may include a computer/data processor 770 and data storage medium 755 comprising instructions executable by the processor 770 to perform an instruction of the preloaded device 766 (e.g., the unmanned vehicle performing the "turn left" instruction). Additionally, the preloaded device 766 may include a communication port 718, e.g., receiver or transceiver, configured to receive wireless transmissions, such as from the controller system 763. In particular embodiments, the preloaded device may have a Raspberry Pi 2 Model B single board computer, and a Debian operating system.

The preloaded device 766 may be a remote device. For example, the preloaded device 766 may be separate and distinct from the communications device 763, and may be any distance from the communications device 763 (e.g., 1 foot, 1 mile, 10,000 miles, 1 million miles). On the other hand, the preloaded device 766 may not necessarily be a remote device, and may be a device local or in local communication (or in wired communication) with the controller system 763.

In order to be controlled, the preloaded device 766 may be loaded (or may otherwise include) preloaded data 707. The preloaded data 707 may be any type of data that may be loaded on the preloaded device 766. For example, the preloaded data may be any type of data that may be loaded, added, or installed on a computer readable data storage medium 755 associated with the preloaded device 766 or an application or system providing local control of the preloaded device 766. Additional examples of the preloaded data 707 are discussed above with regard to preloaded data 407 of FIGS. 4A-6C. The preloaded data 707 may include instructions, such as preloaded instructions 711, 713, and 715, as seen in FIG. 7C. A preloaded instruction may refer to any instruction or operation that may be performed by a device. Examples of such preloaded instructions include "turn on", "turn off", "turn left", "turn right", "go up", "go down", "release package", "take picture", "open", "close", "speed up", "slow down", "adjust heading" to a particular heading, any other instruction or operation that may be performed by a device, or any combination of the preceding.

Another example of a preloaded instruction may include an instruction to utilize a token (discussed above with regard to FIG. 1) to retrieve a data element from data management device 14. For example, the data element may be a GPS coordinate. In such an example, the preloaded instruction may be to "adjust heading to the GPS coordinate retrieved using a token", and the instruction may further instruct the device to utilize the token (which uniquely identifies the GPS coordinate data element) to retrieve the data element from the data management device 14 of FIG. 1. Once the data element is retrieved, the device may perform both the preloaded instruction and the data element, which may cause the device to "adjust heading to the GPS coordinate retrieved using a token".

Additional examples of the preloaded instructions are discussed above with regard to preloaded instructions 411, 413, and 415 of FIGS. 4A-6C. As illustrated in FIG. 7C, the preloaded data 707 includes preloaded instruction 711 (e.g., "turn left"), preloaded instruction 713 (e.g., "turn right"), and preloaded instruction 715 (e.g., "stop"), each of which may be performed by the preloaded device 766.

The preloaded data 707 may further include one or more preloaded tokens, such as preloaded tokens 711', 713', and 715'. A preloaded token may be associated with a preloaded instruction, as is illustrated by associations 709 in FIG. 7C. For example, a preloaded token may uniquely identify a preloaded instruction. In such an example, the preloaded device 766 may utilize a preloaded token (such as by accessing, searching for, or looking up the preloaded token) to access a preloaded instruction, thereby allowing the preloaded device 766 to perform the preloaded instruction. A preloaded token may be a unique identifier that is generated for only a single preloaded instruction. In such an example, if a first preloaded instruction 711 (e.g., "turn left") is loaded in the preloaded device 766, and a second preloaded instruction 713 (e.g., "turn right") is loaded in the preloaded device 766, each preloaded instruction will have a different preloaded token that uniquely identifies that particular instruction. Although the preloaded token may be a unique identifier for a particular preloaded instruction, in particular embodiments, the preloaded token may not include any information about the preloaded instruction (e.g., the preloaded token may not include the "turn left" instruction in the preloaded token). As such, even if an unauthorized user was able to gain access (or steal) a preloaded token, the unauthorized user would be unable to determine the preloaded instruction associated with the preloaded token.

The preloaded token may be any set of data. For example, the preloaded token may be a set of numbers, a set of letters (e.g., A, B, C, etc.), a set of numbers and letters, a set of symbols (e.g., %, !, ?, etc.), a code, any other grouping of characters, or any combination of the preceding. The preloaded token may have any length. For example, the preloaded token may be an eight character identifier, a sixteen character identifier, a 32 character identifier, an identifier with a length between eight characters and 32 characters, or a preloaded token with any other length. Additional examples of the preloaded token are discussed above with regard to preloaded tokens 411', 413', and 415' of FIGS. 4A-6C. As illustrated in FIG. 7C, the preloaded token 711' (e.g., "58U48") may uniquely identify the preloaded instruction 711 (e.g., "turn left"), the preloaded token 713' (e.g., "09H12") may uniquely identify the preloaded instruction 713 (e.g., "turn right"), and the preloaded token 715' (e.g., "MN129") may uniquely identify the preloaded instruction 715 (e.g., "stop").

The preloaded device 766 may be loaded with the preloaded data 707 by a loading device 715. The loading device 715 may be any device that may communicate data. For example, the loading device 715 may be a computer, a server, a smartphone, a telephone, any other device that may communicate data, or any combination of the preceding. As another example, the loading device 715 may be data management device 14, data storage device 54, and/or user device 26. Additional examples (and example functions) of the preloaded device 715 are discussed above with regard to preloaded device 415 of FIGS. 4A-6C. Loading device 715 may load the preloaded data 707 onto preloaded device 766 in any manner. Furthermore, the loading device 715 may load the preloaded data 707 onto the preloaded device at any time. For example, the loading device 715 may load the preloaded data 707 onto the preloaded device 766 when the preloaded device 766 is manufactured, shipped, registered with the loading device 715, registered with the controller system 763, at any other time, or any combination of the preceding. The loading device 715 may prepare and process the preloaded data 707 prior to loading the preloaded data 707.

The loading device 715 may, in particular embodiments, encrypt the preloaded data 707. For example, the loading device 415 may use a multi-part key 431 (which includes a first part 461 comprising a device key 465 and a second part 463 comprising a storage key 467) to encrypt the preloaded instructions. In such an example, the preloaded device 466 may further be loaded with (or otherwise include) the device key 465 and a loader key 469 (which may be the storage key 467 that has been encrypted and tokenized using the device key 465). Further details regarding the multi-part key are discussed above.

System 700 further includes controller system 763. Controller system 763 may be any system that may communicate with preloaded device 766 in order to control preloaded device 766. For example, communications system 763 may be a computer, a server, a smartphone, a telephone, a joystick, a game controller, any other device that may communicate with preloaded device 766 in order to control preloaded device 766, or any combination of the preceding. Additional examples (and example functions) of the controller system 763 are discussed above with regard to communication device 463 of FIGS. 4A-6C. As illustrated in FIG. 7A, controller system 763 may be a joystick. In such an example, an operator may use the joystick in order to control the preloaded device 766 (such as an unmanned truck). The operator may push the joystick to the left, for example, causing the unmanned truck to "turn left". To control the preloaded device 766, the controller system 763 may transmit one or more identifying transmissions 744 to the preloaded device 766. As is discussed below, the identifying transmission 744 may include a token 719 that may be used by the preloaded device 766 to determine a preloaded instruction to perform.

The controller system 763 may include a computer/data processor and data storage medium comprising instructions executable by a processor to transmit one or more identifying transmissions 744 to the preloaded device 766, so as to control the preloaded device 766. Additionally, the controller system 763 may include a communication port, e.g., receiver or transceiver, configured to transmit wireless transmissions, such as to the preloaded device 766.

Figure 7D:
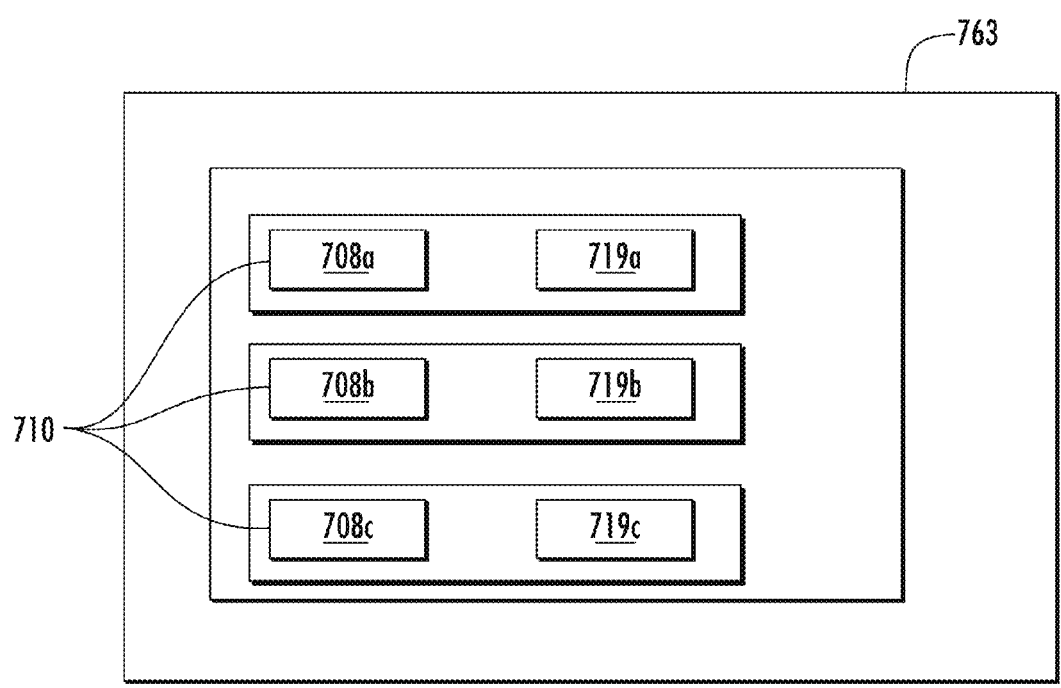
FIG. 7D schematically illustrates various features of a system for controlling a device according to various embodiments described herein.

The controller system 763 may be loaded (or may otherwise include) instructions 708 and tokens 719, as is illustrated in FIG. 7D. Similar to a preloaded instruction, instruction 708 may refer to any instruction or operation that may be performed by a device. Examples of such instructions 708 include "turn on", "turn off", "turn left", "turn right", "go up", "go down", "release package", "take picture", "open", "close", "speed up", "slow down", "adjust heading" to a particular heading, any other instruction or operation that may be performed by a device, or any combination of the preceding. An instruction 708 may match a preloaded instruction loaded on preloaded device 766. For example, an instruction 708 may be "turn left" and the matching preloaded instruction (e.g., instruction 711) may also be "turn left". In particular embodiments, an instruction 708 may match a preloaded instruction when both the instruction 708 and the preloaded instruction are identical (e.g., "turn left" and "turn left").

A token 719 may be associated with an instruction 708, as is illustrated by association 710 in FIG. 7D. For example, the token 719 may be uniquely identified by the instruction 708. In such an example, the controller system 763 may determine which instruction 708 should be performed by the preloaded device 766 (e.g., "turn left"), and based on that (and association 710), the controller system 763 may further determine which token 719 may be transmitted to the preloaded device 766 to cause the preloaded device 766 to perform that instruction (e.g., "turn left"). An instruction 708 may uniquely identify only a single token 719. In such an example, if a first instruction 708 (e.g., "turn left") is loaded in the controller system 763, and a second instruction 708 (e.g., "turn right") is loaded in the controller system 763, each instruction 708 will have a different token 719 that is uniquely identified by the particular instruction. Although the token 719 may be associated with a particular instruction 708, in particular embodiments, the token 719 may not include any information about the instruction 708 (e.g., the token 719 may not include the "turn left" instruction in the token 719). As such, even if an unauthorized user was able to gain access (or steal) a token 719, the unauthorized user would be unable to determine the instruction 708 associated with the token 719 (e.g., the unauthorized user would be unable to determine that the token 719 will cause the preloaded device 766 to "turn left").

The token 719 may be any type of data that may be associated with the instruction 708. For example, the token 719 may be a set of numbers, a set of letters (e.g., A, B, C, etc.), a set of numbers and letters, a set of symbols (e.g., %, !, ?, etc.), a code, any other grouping of characters, or any combination of the preceding. The token 719 may have any length. For example, the token 719 may be an eight character identifier, a sixteen character identifier, a 32 character identifier, an identifier with a length between eight characters and 32 characters, or a token with any other length. A token 719 may match a preloaded token (e.g., preloaded token 711') loaded on preloaded device 766. For example, a token 719 may be "58U48" and the matching preloaded token (e.g., preloaded token 711') may also be "58U48".

In an exemplary embodiment of operation, one or more operations of a preloaded device 766 (such as a remote unmanned vehicle) may be controlled by a controller system 763 (such as a joystick). For example, an operator (such as a human driver) may utilize controller system 763 in order to control the preloaded device 766, thereby causing the preloaded device 766 to "turn left" when the operator desires the preloaded device 766 to turn left, for example.

In order to be controlled, the preloaded device 766 may be loaded with preloaded data 707 that may allow the user to control the preloaded device 766. As illustrated in FIG. 7C, the preloaded data 707 may include preloaded instructions 711, 713, and 715 that are respectively associated with preloaded tokens 711', 713', and 715'. These preloaded instructions, such as preloaded instruction 711, may be an instruction or operation that may be performed by the preloaded device 766. For example, the preloaded instruction may be an instruction to "turn left", which may be performed by the preloaded device 766. Although the preloaded device 766 may be loaded with preloaded instructions (via preloaded data 707), preloaded device 766 may be unable to perform (or even access) the preloaded instructions unless told to do so (such as by controller system 763). As such, the preloaded device 766 may not operate on its own, unless told to do so, in particular embodiments.

The preloaded tokens, such as preloaded tokens 711', 713', and 715' may be respectively associated with the preloaded instructions 711, 713, and 715, as is illustrated by associations 709 in FIG. 7C. For example, the preloaded tokens 711', 713', and 715' may respectively uniquely identify the preloaded instructions 711, 713, and 715 (e.g., preloaded token 711' may uniquely identify the preloaded instruction 711). This unique identification may allow the preloaded device 766 to find and perform a preloaded instruction when told to do so (such as by controller system 763).

As is discussed above, the preloaded data 707 may be loaded onto the preloaded device 766 by, for example, loading device 715. This loading of preloaded data 707 may be performed in any manner and over any communications network. For example, the loading device 715 may transmit the preloaded data 707 over the Internet (e.g., using a Transmission Control Protocol (TCP) communications protocol), a Wi-Fi network, a cellular network, a radio telecommunication network, a Bluetooth network, a near-field communication (NFC) network, any other wireless network, any other manner of transmission, or any combination of the preceding. In particular embodiments, this loading of preloaded data 707 may occur over a wired network or a secure network that may prevent an unauthorized entity from accessing the communication or the preloaded data 707. The loading of preloaded data 707 may occur at any time. For example, it may occur when the preloaded device 766 is manufactured, shipped, registered with the loading device 715, registered with the controller system 763, at any other time, or any combination of the preceding.

Following the loading of preloaded data 707 on the preloaded device 766, the preloaded device 766 may be controlled by the controller system 763. In order to control the preloaded device 766, the controller system 763 may determine an instruction 708 to be performed by the preloaded device 766. The controller system 763 may determine the instruction 708 in any manner. For example, the controller system 763 may determine the instruction 708 when an operator of the controller system 763 inputs the instruction 708 into the controller system 763. In such an example, an operator of a joystick (e.g., the controller system 763) may tilt the joystick to the left, causing the joystick to determine that the instruction 708 is "turn left". As another example, the controller system 763 may automatically determine the instruction on its own. In such an example, a computer system (e.g., the controller system 763) may be tracking the progress of the preloaded device 766, and may determine, using its own programming (e.g., autopilot), that the preloaded device 766 should "turn left". As such, the computer system may determine that the instruction 708 is "turn left".

Following the determination of the instruction 708 to be performed by the preloaded device 766, the controller system 763 may determine a token 719 associated with the instruction 708. The controller system 763 may determine the token 719 in any manner. For example, as is discussed above, a token 719 may be uniquely identified by an instruction 708. In such an example, the controller system 763 may access, search for, or otherwise look-up the instruction 708A (e.g., turn left), and based on that instruction 708A (and association 710) may determine the token 719a (e.g. "58U48"). As another example, the controller system 763 may generate a token 719 that is associated with the determined instruction 708 in order to determine the token 719. In such an example, the controller system 763 may include (or have access to) one or more token generation methods (such as token generation methods 42, discussed above) that may allow the controller system 763 to generate the token 719 based on the determined instruction 708. Furthermore, in such an example, the generation of the token 719 may occur in real-time.

Following the determination of the token 719, the controller system 763 may prepare a packet for transmission to the preloaded device 766. The packet may be prepared in any manner. Furthermore, the packet may include any data for transmission to the preloaded device 766. For example, the packet may include the token 719. As another example, the packet may include a header. The header of the packet may include an identification code (which may identify the packet as having been sent by the controller system 763), a timestamp (which may identify the time and/or date the packet was created and/or transmitted by the controller system 763, such as in a yyyy.dd.HH.mm.sss format), a parsing format identifier (which may identify how the packet was formed and how the data can be de-parsed), any other data, or any combination of the preceding.

As a further example, the packet may include one or more chaff tokens. A chaff token may refer to data that may imitate a token 719, but may not be an actual token 719. Instead, a chaff token may be a fake token that is meant to hide (or obfuscate) the real token 719. For example, as is discussed above, a token 719 may be "58U48", which matches a preloaded token of "58U48". In such an example, a chaff token may be any other combination of characters (e.g., "97U3M", but which does not match any preloaded token loaded on preloaded device 766. In particular embodiments, the chaff token(s) included in the packet may hide (or obfuscate) the real token 719. As an example, instead of a packet including only the character string "58U48" (i.e., the token 719 only), the packet may include, for example, the character string "97U3M58U48P07HI" (i.e., the token 719 and chaff tokens), which further hides the token 719. As such, in particular embodiments, an unauthorized entity intercepting the packet may be unable to separate the token 719 from the chaff tokens. Furthermore, the chaff tokens may also increase the size of the packet, which may cause an unauthorized entity to spend more time attempting to decipher the packet (if it is even possible). Therefore, even if the unauthorized entity may decipher the token 719 from the intercepted packet, it may already be too late for the unauthorized entity to use the token 719, as the system 700 may have already detected the unauthorized entity, or the preloaded device 766 may have already received and/or utilized the token 719 to perform the instruction (making the token 719 obsolete, for example).

The chaff token may by any data. For example, the chaff may be a set of numbers, a set of letters (e.g., A, B, C, etc.), a set of numbers and letters, a set of symbols (e.g., %, !, ?, etc.), a code, any other grouping of characters, or any combination of the preceding. In particular embodiments, the chaff token may have a similar format as a token 719. The chaff token may have any length. For example, the chaff token may be an eight character identifier, a sixteen character identifier, a 32 character identifier, an identifier with a length between eight characters and 32 characters, or a preloaded token with any other length. In particular embodiments, the chaff token may have the same length as a token 719. Furthermore, one or more (or all) of the chaff tokens in a particular packet may have a different format and/or length than other chaff tokens in the particular packet. Additional examples (and example functions) of the chaff token are discussed above with regard to obfuscation elements and chaff tokens of FIGS. 4A-6C.

The packet may include any number of chaff tokens. For example, the packet may include no chaff tokens, one chaff token, two chaff tokens, ten chaff tokens, 100 chaff tokens, 1,000 chaff tokens, 1 million chaff tokens, 10 million chaff tokens, or any other number of chaff tokens. Furthermore, each packet may include the same number of chaff tokens, or a different number of chaff tokens. The real token 719 may be included in any location (in the character string of the packet) in relation to the chaff tokens. For example, the real token may be surrounded by a chaff token on each side. Furthermore, the location of the real token 719 in relation to the chaff tokens may be random. For example, in one packet the real token 719 may be first in the character string, in another packet the real token 719 may be in the middle of the character string, and in another packet the real token may be last in the character string. As such, an unauthorized entity may be unable to determine which token is the real token 719 based on its location.

In particular embodiments, preparing a packet may further include encrypting one or more elements of the packet, such as the entire packet, the token 719, the chaff tokens, the header, any other portion of the packet, or any combination of the preceding. To encrypt one or more elements of the packet, the controller system 763 may have a controller key (e.g., a key unique to the particular controller system 763), a device key (e.g., a key unique to the particular preloaded device 766 to which the packet is being sent), any other encryption key, or any combination of the preceding. Using one or more of these keys (such as all of the keys, or just the controller key and the device key) and one or more encryption methods, such as encryption methods 34, the controller system 763 may encrypt one or more elements of the packet. The controller system 763 may use the same encryption method to encrypt all of the portions of the packet. On the other hand, the controller system 763 may use different encryption methods to encrypt different portions of the packet. For example, the controller system 763 may use a first encryption method to encrypt the token 719 and the chaff tokens, and may use a second encryption method to encrypt the header. Furthermore, the controller system 763 may use different encryption keys for different encryptions.

Following preparation of the packet, the controller system 763 may transmit the packet to the preloaded device 766 as identifying transmission 744. The controller system 763 may transmit the packet in any manner and over any communications network. For example, the controller system 763 may transmit the packet over the Internet (e.g., using a TCP communications protocol), a Wi-Fi network, a cellular network, a radio telecommunication network, a Bluetooth network, a NFC network, any other wireless network, any wired network, any other manner of transmission, or any combination of the preceding.

Following transmittal of the packet to the preloaded device 766 as identifying transmission 744, the preloaded device 766 may receive the packet. Following reception of the packet, the preloaded device 766 may determine whether the packet is legitimate. The preloaded device 766 may determine whether the packet is legitimate in any manner.

As an example, the preloaded device 766 may analyze the header of the packet to determine whether or not the header of the packet includes a proper identification code. The identification code may identify whether or not the packet was sent by the controller system 763. The identification code may provide such an identification in any manner. For example, the identification code may be one or more characters (e.g., a particular pattern of symbols, an identification number, a password) that may identify the packet as having been sent by the controller device 763. If the header does not include an identification code, does not include a correct identification code, does not include the correct identification code in the correct location in the header, and/or if the header or identification code includes any abnormality, the preloaded device 766 may determine that the packet is not legitimate, and may not act on any token 719 included in the packet.

As another example, the preloaded device 766 may analyze the header of the packet to determine whether or not the header of the packet includes a timestamp that is within a predetermined timestamp threshold. As is discussed above, the timestamp may identify the time and/or date the packet was created and/or transmitted by the controller system 763. As such, the preloaded device 766 may include a predetermined timestamp threshold that may allow the preloaded device 766 to determine whether the packet is too late or too early. The predetermined timestamp threshold may be any amount of time. For example, the predetermined timestamp threshold may by 1 millisecond, 2 milliseconds, 3 milliseconds, 5 milliseconds, 10 milliseconds, 1 second, any negative amount of time (e.g., −1 millisecond), or any other amount of time. In particular embodiments, the preloaded device 766 may compare the time on the timestamp to the time at which the preloaded device 766 received the packet. If the lapse in time is greater than the predetermined timestamp threshold, the preloaded device 766 may determine that the packet is not legitimate, and may not act on any token 719 included in the packet. In particular embodiments, this may prevent the preloaded device 766 from acting on a packet that has taken too long to reach the preloaded device 766 (or that reached the preloaded device too early). In such an embodiments, the delay may indicate that the packet was intercepted and/or delayed by an unauthorized entity. As such, the preloaded device 766 may not act on the token included in the packet.

In particular embodiments, determining whether the packet is legitimate may further include decrypting one or more elements of the packet, such as the entire packet, the token 719, the chaff tokens, the header, any other portion of the packet, or any combination of the preceding. To decrypt one or more elements of the packet, the preloaded device 766 have the same encryption keys used by the controller system 763 to encrypt the packet (e.g., the controller key, the device key, any other encryption key, or any combination of the preceding). Using one or more of these keys (such as all of the keys, or just the controller key and the device key) and the same encryption methods used by the controller system 763, the preloaded device 766 may decrypt one or more elements of the packet. In particular embodiments, if the controller system 763 used different encryption methods for different elements of the packet, the preloaded device 766 may include data that identifies which encryption methods to use for each element of the packet. Additionally, the packet may include identifiers that allow the preloaded device 766 to determine which encryption methods to use on a particular element of the packet.

Following a determination that the packet is legitimate, the preloaded device 766 may determine the token 719 included in the packet. The preloaded device 766 may determine the token 719 in any manner. For example, if the packet does not include any chaff tokens, the preloaded device 766 may parse the packet to determine the token 719.

As another example, if the packet does include chaff tokens, the preloaded device 766 may de-parse the packet and filter out the chaff tokens in order to determine the token 719. De-parsing the packet may refer to breaking up the data in the packet into potential tokens, or otherwise identifying potential tokens. For example, the data in the packet (other than the header, for example) may include the following string of characters: "97U3M58U48P07H10985IPLQ32G78B&". In such an example, de-parsing this header may identify six potential tokens: (1) "97U3M"; (2) "58U48"; (3) "PO7HI"; (4) "09851"; (5) "PLQ32"; and (6) "G78B&". The preloaded device 766 may de-parse the packet in any manner. In particular embodiments, the preloaded device 766 may include one or more parsing methods that may allow the preloaded device 766 to de-parse the packet into potential tokens. For example, a parsing method may provide a format and/or length of each token (e.g., one token is 5 characters of the data, one token is 32 characters of the data, one token has the format xxxx-xxx-xxxx-xxxxxxxxx, one token has the characters "A" and "X" as the first and fourth characters), allowing the preloaded device 766 to de-parse the packet based on the format and/or length of the tokens. As another example, a parsing method may provide a character pattern in-between tokens (e.g., fake characters that indicate a token, such as the first 2 characters are fake and the last 3 characters are fake). In an example where the parsing method indicates that the first 2 characters before a token are fake and the last 3 characters after a token are fake, the following string of characters "97U3M58U48P07H10985IPLQ32G78B&", may be de-parsed into 3 different potential tokens (1) "U3M58"; (2) "7HI09"; and (3) Q32G7, with the remainder of the characters being fake characters that identify the potential tokens.

The parsing method used to de-parse the packet may always be the same. On the other hand, the parsing method used to de-parse the packet may differ based on the particular parsing method used to create the packet. For example, the both the controller system 763 and the preloaded device 766 may include more than one parsing method (e.g., 3 parsing methods, 5 parsing methods) to choose from in forming the packet and de-parsing the packet. In such an example, the preloaded device 766 may use the same parsing method to de-parse the packet as the controller system 763 used to form the packet. Furthermore, in such an embodiment, the controller system 763 may form the packet using a particular parsing method, and may further add an identifier of that parsing method into the header of the packet (e.g., the parsing format identifier discussed above). The preloaded device 766 may use this parsing format identifier to determine which parsing method to use, and may then use that parsing method to de-parse the packet.

Following the de-parsement of the packet, the preloaded device 766 may filter out the chaff tokens in order to determine the token 719. The preloaded device 766 may filter out the chaff tokens in any manner. For example, the preloaded device 766 may compare each potential token (determined above) to each of the preloaded tokens (such as preloaded tokens 711', 713', and 715') in order to determine if there are any matches. If a potential token does not match any of the preloaded tokens, the potential token may be determined to be a chaff token, and may be filtered out. On the other hand, if a potential token does match a preloaded token, the potential token may be determined to be the token 719.

Additionally, if none of the potential tokens match any of the preloaded tokens, the entire packet may be determined to not be legitimate, and the packet may not be used to control the preloaded device 766. In particular embodiments, this may allow the controller system 763 to transmit false packets to the preloaded device 766 (thereby further confusing an unauthorized entity that may intercept the false packet) without affecting the preloaded device 766. Furthermore, if more than one potential token matches any of the preloaded tokens, the entire packet may be determined to not be legitimate, and the packet may not be used to control the preloaded device 766.

Following the determination of the token 719, the preloaded device 766 may match the token 719 to a preloaded token. The preloaded device 766 may match the token 719 to a preloaded token in any manner. For example, the preloaded device 766 may compare the token 719 to each of the preloaded tokens (such as preloaded tokens 711', 713', and 715') in order to determine if there are any matches. The token 719 may match a preloaded token if the two tokens are identical (e.g., "58U48" and "58U48"). As another example, the token 719 may match a preloaded token if the preloaded token includes at least all of the characters of the token 719 (or vice versa) (e.g., "58U48" and "58U4878910"). As further examples, the token 719 may match a preloaded token if the two tokens are opposite (e.g., "up" and "down"), if the two tokens complement or complete each other (e.g., "12345" and "6789"), if one token asks a question and the other token correctly answers it, any other manner of matching, or any combination of the preceding. In particular embodiments, the step of matching the token 719 to a preloaded token may already be a part of the step of determining a token 719 (as is discussed above with regard to matching potential tokens to the preloaded tokens). In such embodiments, the step of matching the token 719 to a preloaded token may not be repeated. Instead, the initial match may be used.

Following the matching of the token 719 to a preloaded token, the preloaded device 766 may determine a preloaded instruction. The preloaded device 766 may make this determination in any manner. For example, as is discussed above, a preloaded token may be associated with a preloaded instruction (e.g., it may uniquely identify the preloaded instruction). In such an example, the preloaded device 766 may access, look up, or search for the preloaded token, and based on the preloaded token (and the association 709), the preloaded device 766 may determine the preloaded instruction. As an example, the preloaded device 766 may access preloaded token 711' (e.g., "58U48") and utilize association 709 to determine the associated preloaded instruction 711 (e.g., "turn left").

In some examples, determination of the preloaded instruction may also include decrypting the preloaded instruction. For example, the preloaded instruction may have been encrypted using, for example, the multi-part key 431. In such an example, the preloaded device 766 may locate the device key 465 and the loader key 469. The loader key 469 may, in some examples, be uniquely associated with the preloaded instruction and the preloaded token. As such, the loader key 469 may only be accessed by the preloaded device 766 when the preloaded device 466 receives a token 419 that matches the preloaded token. When the preloaded device 766 locates the device key 465 and the loader key 469, the loader key 496 may be decrypted using the device key 465. This decryption may result in the storage key 467. The preloaded device 766 may then assemble the multi-part key 431 using the device key 465 and the storage key 467, and use the multi-part key 431 to decrypt the preloaded instruction.

Although the determination of a preloaded instruction has been discussed above as being based on a single packet, a single token 719, and a single preloaded token, in particular embodiments, the determination of a preloaded instruction may be based on more than one packet, more than one token 719, and more than one preloaded token. For example, after a controller system 763 determines the "turn left" instruction, the controller system 763 may determine multiple tokens 719 associated with the instruction. Each of these tokens 719 may be transmitted to the preloaded device 766 in a different packet. Furthermore, before the preloaded device 766 may "turn left", the preloaded device 766 may determine whether each of these packets was received within a particular threshold of time (e.g., within 1 millisecond of each other), determine whether each of these packets was received in a particular order, determine whether each of these packets included a token 719 that matches a preloaded token, determine that all of the matched preloaded tokens are associated with the same preloaded instruction, determine that all of the preloaded tokens associated with a particular preloaded instruction were determined, determine whether any other criteria for performing the instruction has been met, or any combination of the preceding. In particular embodiments, this may further increase the security for controlling the device, such as, for example, increasing the security for more important instructions (e.g., release a package).

Following the determination of the preloaded instruction, the preloaded device 766 may perform the preloaded instruction. For example, if the preloaded instruction is "turn left", the preloaded device 766 may turn left. In particular embodiments, the performance of the preloaded instruction may occur in real-time with the determination of the instruction (by the communications system 763). For example, following the determination of the instruction by the controller system 763 (e.g., the operator tilting the joystick left), the matching preloaded instruction may be determined and performed (e.g., the preloaded device 766 may turn left) within, for example, 1 millisecond, 2 milliseconds, 3 milliseconds, 5 milliseconds, 10 milliseconds, 100 milliseconds, or any other amount of time that allows the performance to be substantially instantaneous. As such, the preloaded device 766 may, in particular embodiments, be securely controlled in real-time.

In addition to providing the ability to control the preloaded device 716, system 700 may further provide for generation of new tokens to allow for additional security, in particular embodiments. In particular embodiments, the generation of new tokens for a particular instruction (e.g., a new token 719 and a new preloaded token for the instruction "turn left") may cause the previous tokens for that instruction to be obsolete. As such, even if an unauthorized entity were to attempt to transmit the previous token for "turn left" to the preloaded device 766, this previous token would no longer work. Instead, the packet with the old token may be discarded as not being legitimate, in particular embodiments. In order to provide for generation of new tokens to allow for additional security, system 700 may implement the following steps, for example.

Following the transmission of a token by the controller system 763, the communications system 763 may generate a new token 719 for association with the instruction 708. For example, following the transmission of a token 719 (e.g., "58U48" associated with the instruction 708 to "turn left") by the controller system 763, the communications system 763 may generate a new token 719 (e.g., "98Y3B") for association with the same instruction 708 (e.g., "turn left"). The generation of a new token 719 may occur any time following the transmission of a token, such as immediately after the transmission. The controller system 763 may generate the new token 719 in any manner. Furthermore, the new token 719 may have any format and/or length. The new token 719 may be associated with the instruction 708 in any manner. As an example, the new token 719 may be uniquely identified by the instruction 708 (e.g., via association 710), so that when that particular instruction 708 is determined by the controller system 763 (e.g., the operator tilting the joystick to the left), the new token 719 may be determined by the controller system 763.

Additionally, following the receipt of the token 719 by the preloaded device 766, the preloaded device 766 may generate a new preloaded token for association with the preloaded instruction. For example, following the receipt of the token 719 (e.g., "58U48" associated with the instruction 708 to "turn left") by the preloaded device 766, the preloaded device 766 may generate a new preloaded token (e.g., "98Y3B") for association with the preloaded instruction (e.g., "turn left"). In such an example, both the controller system 763 and the preloaded device 766 may now have new tokens associated with the "turn left" instructions. As such, if the preloaded device 766 were to subsequently receive the old token 719 (e.g., "58U48"), that old token 719 would no longer be associated with the "turn left" instruction, and that old token 719 would not cause the preloaded device 719 to turn left. The generation of a new preloaded token may occur any time following the receipt of the token, such as immediately after the utilization of the token 719 to determine a preloaded token. The preloaded device 766 may generate the new preloaded token in any manner. Furthermore, the new preloaded token may have any format and/or length. The new preloaded token may be associated with the preloaded instruction in any manner. As an example, the new preloaded token may uniquely identify the preloaded instruction (e.g., via association 709), so that when that new preloaded token is determined by the preloaded device 766 (e.g., the preloaded device 766 matching the new token 719 to the new preloaded token), the preloaded instruction may be determined, and performed by the preloaded device 766.

In particular embodiments, both the new token 719 and the new preloaded token may be generated using a generation method (e.g., generation method 34 discussed above) that may result in the new token 719 matching the new preloaded token. For example, the new token 719 and the new preloaded token may be identical (e.g., "98Y3B" and "98Y3B"), or may match each other in any other manner discussed above. In particular embodiments, both the controller system 763 and the preloaded device 766 may utilize the same generation method to generate the tokens. In such embodiments, a first copy of the generation method may be stored on the controller system 763 and a second copy of the generation method may be stored on the preloaded device 766. Furthermore, both the controller system 763 and the preloaded device 766 may utilize the same data inputs (for entry into the generation method) to cause the generation method to generate the new tokens. As such, a new token 719 and matching new preloaded token may be generated.

As is discussed above, the generation of new tokens may occur in any manner and using any data input. As a first example, the generation of new tokens may be based on one or more portions of data included in a header of a packet transmitted from the controller system 763 to the preloaded device 766. In such an example, the generation of new tokens may be based on the identification code included in the packet, the timestamp included in the packet, the parsing format identifier included in the packet, any other data in the heading of the packet, or any combination of the preceding. In particular embodiments, both the controller system 763 and the preloaded device 766 may input, for example, data from the timestamp of the packet into the generation method, causing both copies of the method to generate matching tokens (e.g., a new token 719 and a matching new preloaded token).

As another example, the generation of new tokens may be based on one or more portions of data included in any other portion of the packet transmitted from the controller system 763 to the preloaded device 766. In such an example, the generation of new tokens may be based on one or more of the chaff tokens included in the packet, the token 719 included in the packet, any other data in the packet, or any combination of the preceding. In particular embodiments, both the controller system 763 and the preloaded device 766 may input, for example, portions of one or more chaff tokens of the packet into the generation method, causing both copies of the method to generate matching tokens (e.g., a new token 719 and a matching new preloaded token).

Figure 8A:
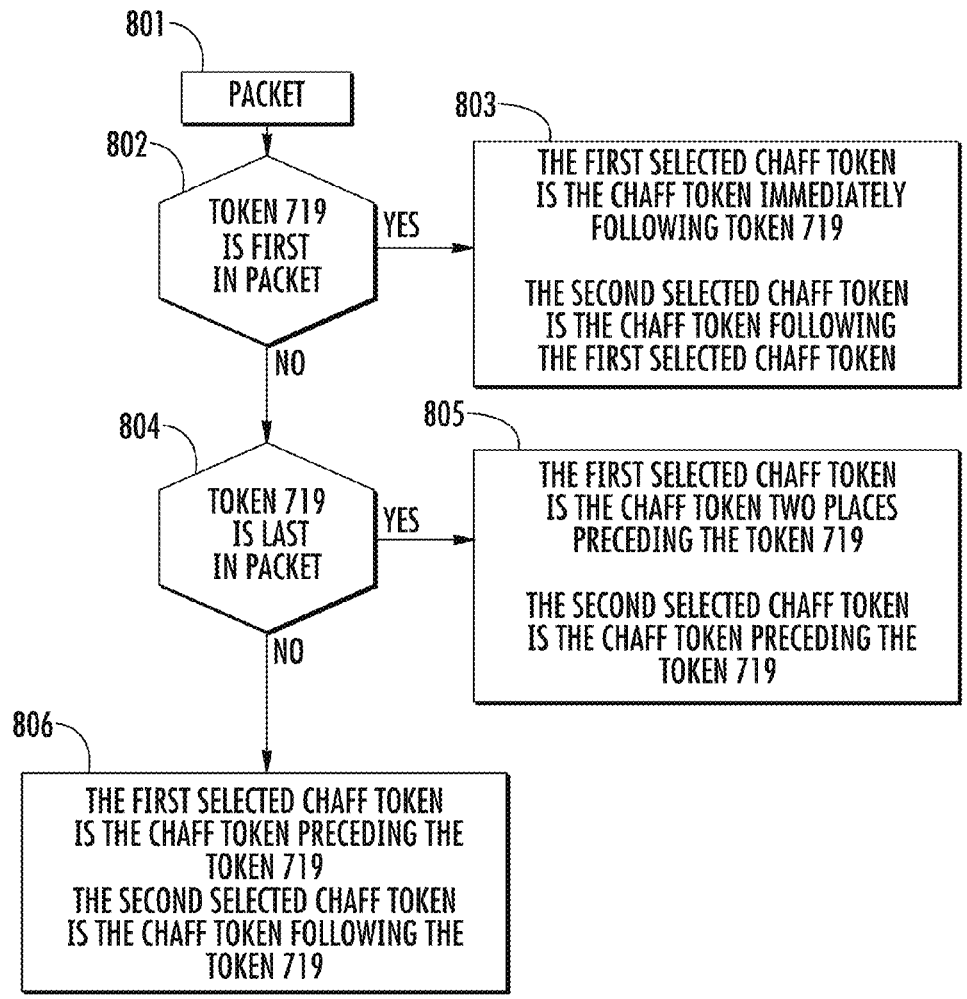
FIGS. 8A-8K are flow diagrams illustrating a method of generating new tokens according to various embodiments described herein.
Figure 8B:
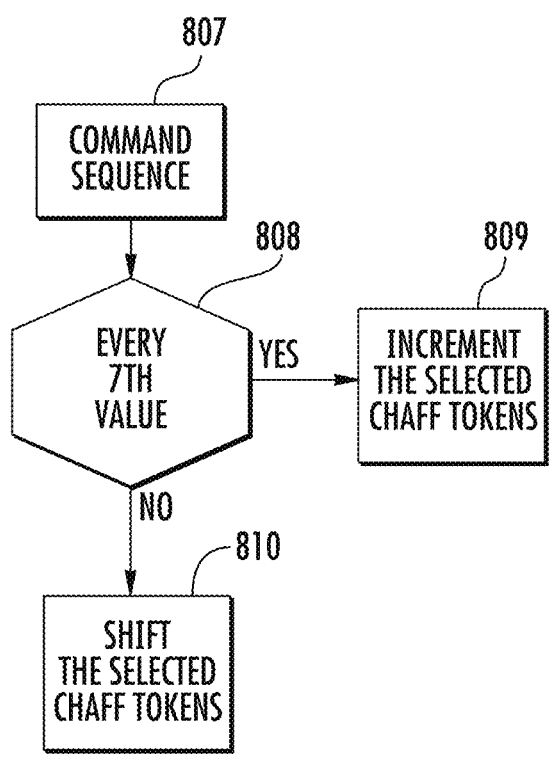
Figure 8C:
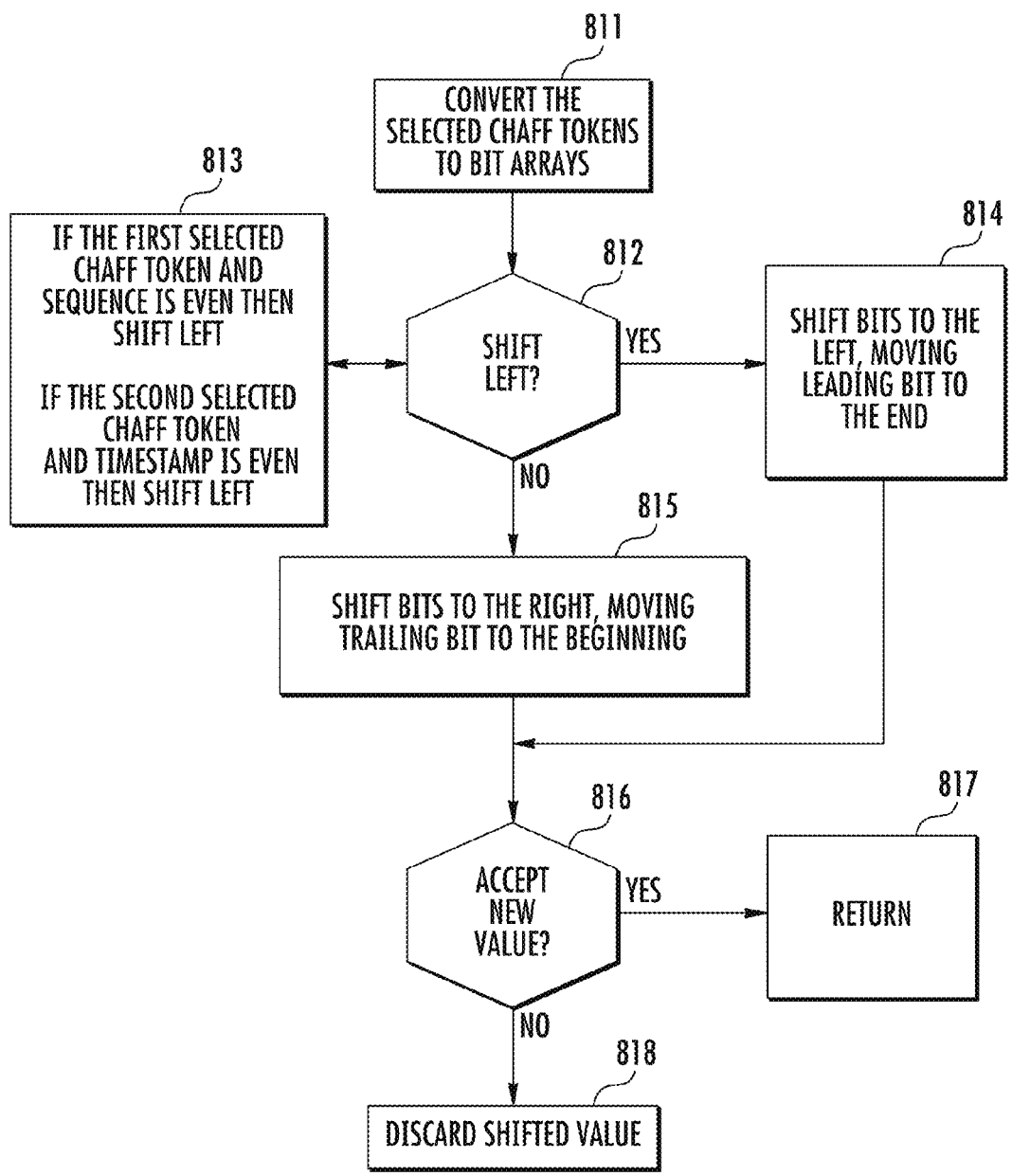

An example of the generation of new tokens based on portions of one or more chaff tokens of a packet is illustrated in FIGS. 8A-8K. First, one or more chaff tokens may be selected for the generation of a new token. Any number of chaff tokens may be selected for the generation of the new token, such as two chaff tokens. Furthermore, any of the chaff tokens in a packet may be selected for use in generation of the new token. As illustrated in FIG. 8A, two chaff tokens are selected for the generation of the new token. Furthermore, as is seen in steps 801-806 of FIG. 8A, the selected chaff tokens may be the chaff token immediately following (sequentially) token 719 and the chaff token immediately following the first selected chaff token; the chaff token two places preceding token 719 and the chaff token immediately preceding token 719; or the chaff token preceding token 719 and the chaff token following token 719.

Second, the selected chaff tokens are then either incremented or bit shifted. The decision to increment or bit shift may be based on the modulus remainder of the command sequence, such as every seventh value, as is seen at steps 807-810 of FIG. 8B. Alternatively, the decision may be based on a date timestamp of the packet.

Third, if the selected chaff tokens are to be bit shifted (as opposed to incremented), the selected chaff tokens may be broken up into individual hexadecimal bytes. Furthermore, as is seen in steps 811-818 of FIG. 8C, the first selected chaff token may be shifted left or right depending on the even/odd value of the command sequence value. Also, the second selected chaff token may be shifted left or right depending on the even/odd value of the transmission date/time (in milliseconds).

Figure 8D:
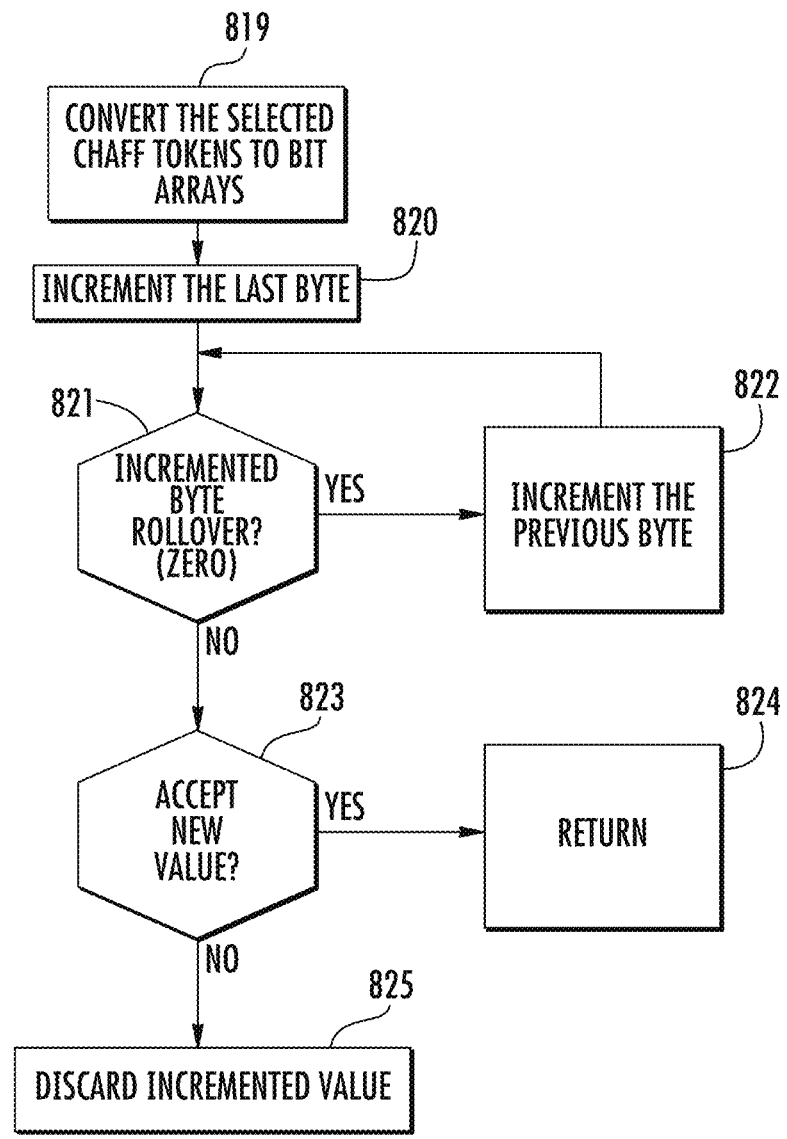
Figure 8E:
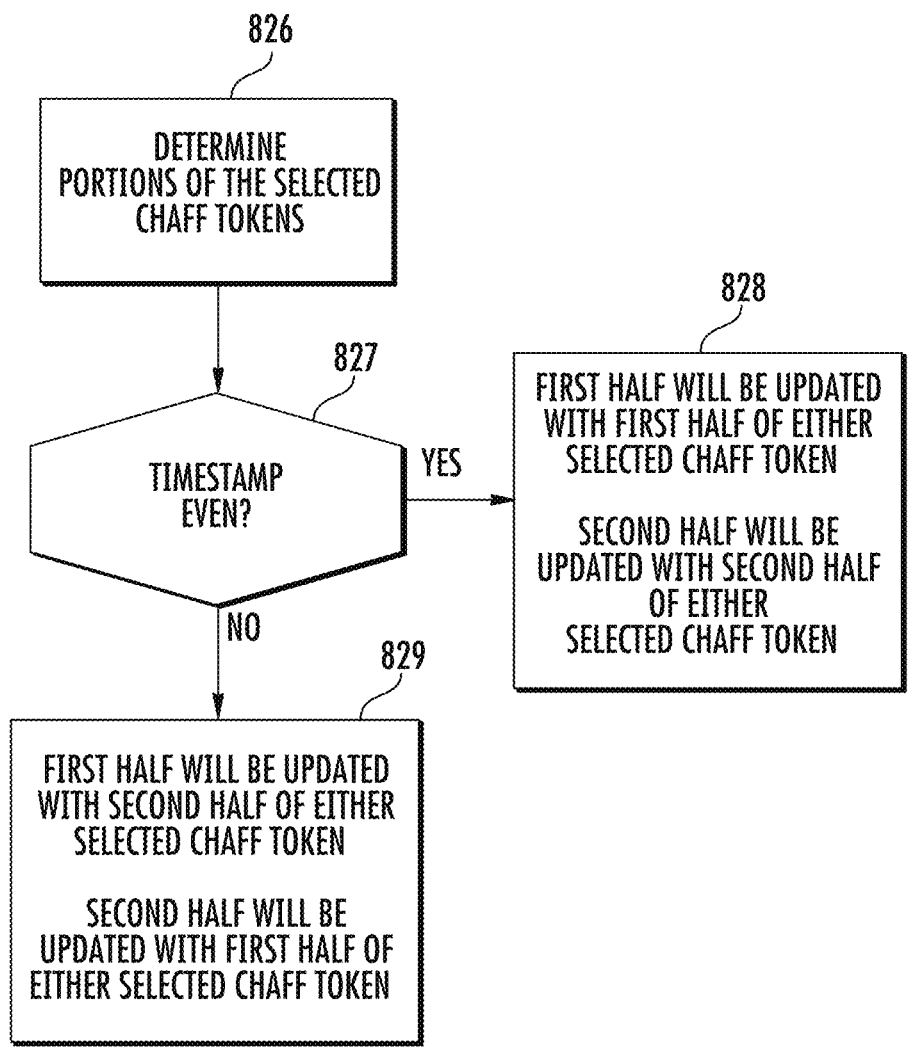

Fourth, if the selected chaff tokens are to be incremented (as opposed to bit shifted), the selected chaff tokens may be broken up into individual hexadecimal bytes and then the last byte in each selected chaff token may be incremented, as is seen in steps 819-825 of FIG. 8D. If the incremented byte results in a rollover (0 to f) of that particular byte, then the preceding byte may be incremented instead. If all of the incremented bytes would result in a rollover (0 to f), then the selected chaff token may become an empty token (or an empty byte).

Fifth, the timestamp of the packet may be used to determine which portions of each selected chaff token may be used to generate the new token. In such an example, the new token may receive half of its characters from the first selected chaff token and the other half of its characters from the second selected chaff token. The portion (of a selected chaff token) that is used to generate (or update) the new token may be determined based on whether the timestamp milliseconds are even or odd, as is seen in steps 826-829 of FIG. 8E. If the timestamp is even, the first half of the new token may be generated (or updated) using the first half of either selected chaff token, and the second half of the new token may be generated (or updated) using the second half of either selected chaff token. If the timestamp is odd, the first half of the new token may be generated (or updated) using the second half of either selected chaff token, and the second half of the new token may be generated (or updated) using the first half of either selected chaff token.

Figure 8F:
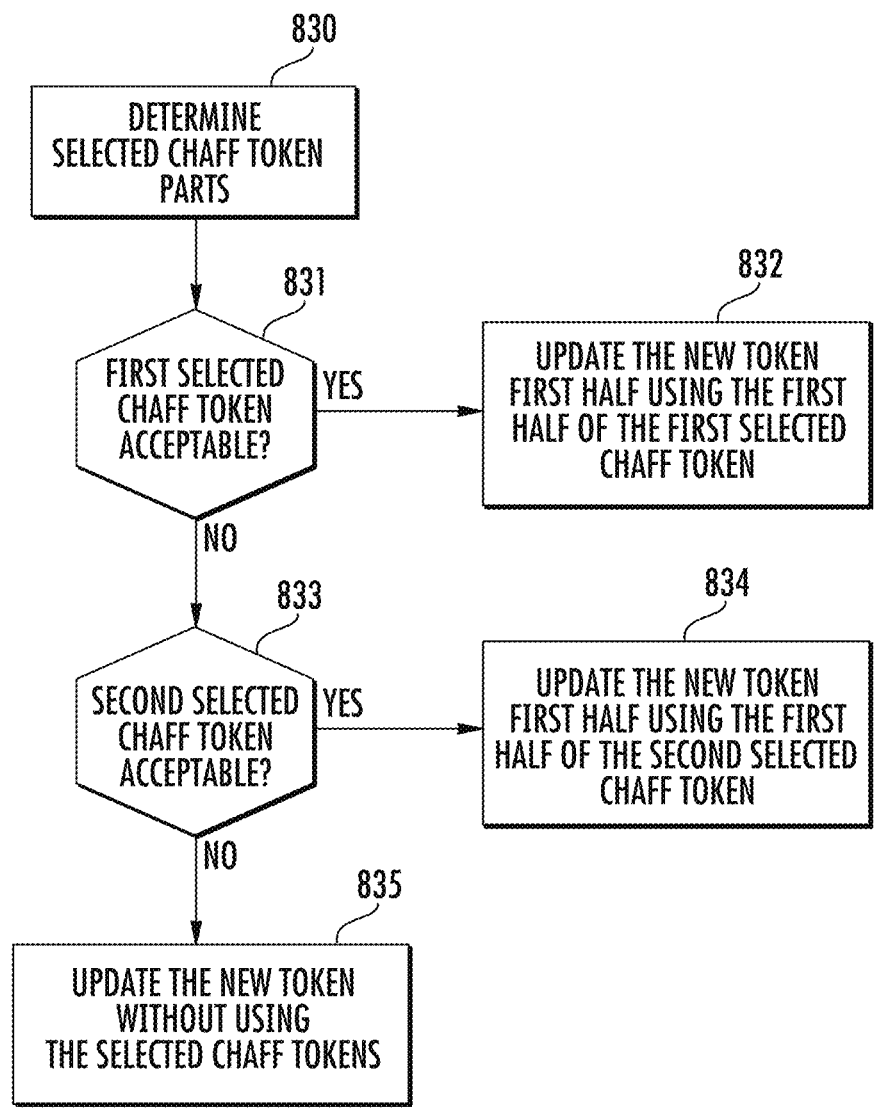

FIG. 8F provides one example of the generation of the first half of the new token when the timestamp is even. For example, as is seen in steps 830-835, when the timestamp is even, the new token may have its first half updated with the first half of the first selected chaff token, provided that the first selected chaff token is acceptable. Otherwise, it may have its first half updated with the first half of the second selected chaff token, provided that the second selected chaff token is acceptable. If neither, the first half of the new token may be updated without using either of the selected chaff tokens.

Figure 8G:
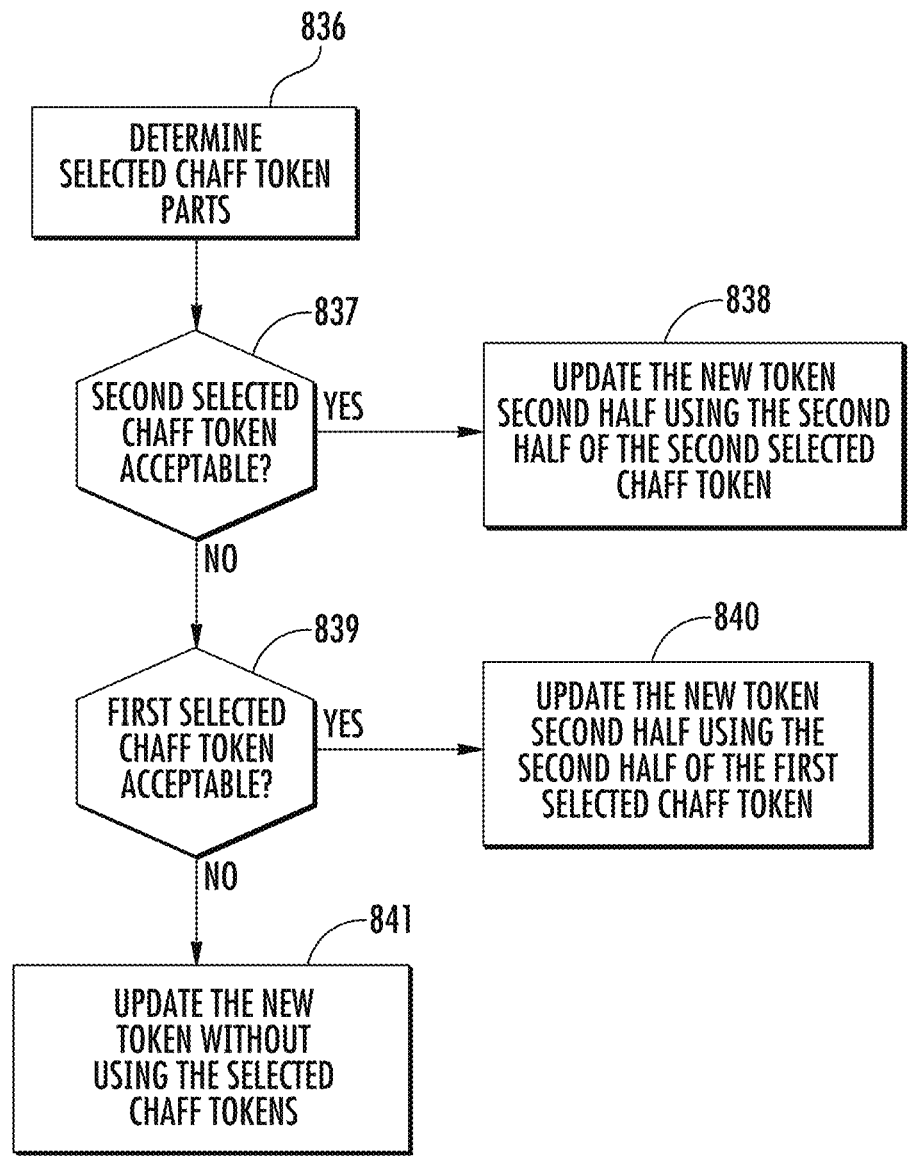

FIG. 8G provides one example of the generation of the second half of the new token when the timestamp is even. For example, as is seen in steps 836-841, when the timestamp is even, the new token may have its second half updated with the second half of the second selected chaff token, provided that the second selected chaff token is acceptable. Otherwise, it may have its second half updated with the second half of the first selected chaff token, provided it is acceptable. If neither, the second half of the new token may be updated without using either of the selected chaff tokens.

Figure 8H:
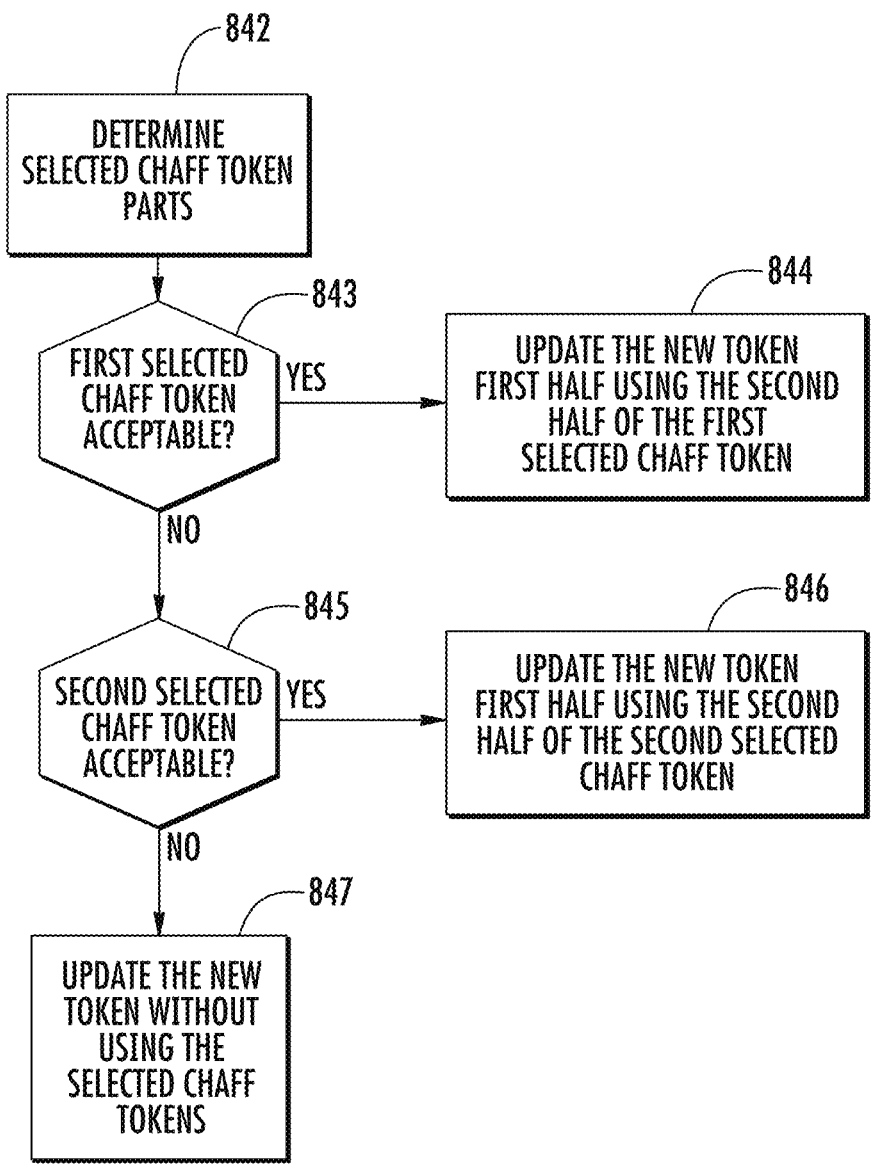

FIG. 8H provides one example of the generation of the first half of the new token when the timestamp is odd. For example, as is seen in steps 842-847, when the timestamp is odd, the new token may have its first half updated with the second half of the first selected chaff token, provided that the first selected chaff token is acceptable. Otherwise, it may have its first half updated with the second half of the second selected chaff token, provided it is acceptable. If neither, the first half of the new token may be updated without using either of the selected chaff tokens.

Figure 8I:
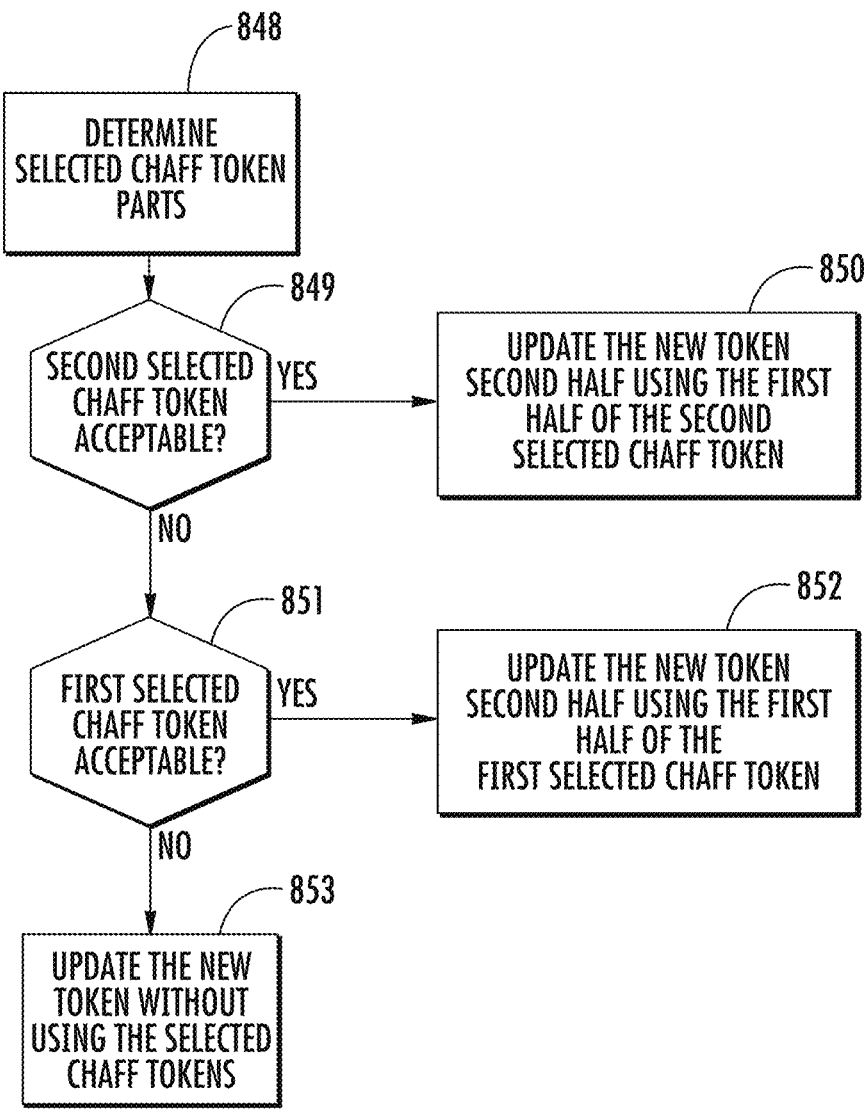

FIG. 8I provides one example of the generation of the second half of the new token when the timestamp is odd. For example, as is seen in steps 848-853, when the timestamp is odd, the new token may have its second half updated with the first half of the second selected chaff token, provided that the second selected chaff token is acceptable. Otherwise, it may have its second half updated with the first half of the first selected chaff token, provided it is acceptable. If neither, the second half of the new token may be updated without using either of the selected chaff tokens.

Figure 8J:
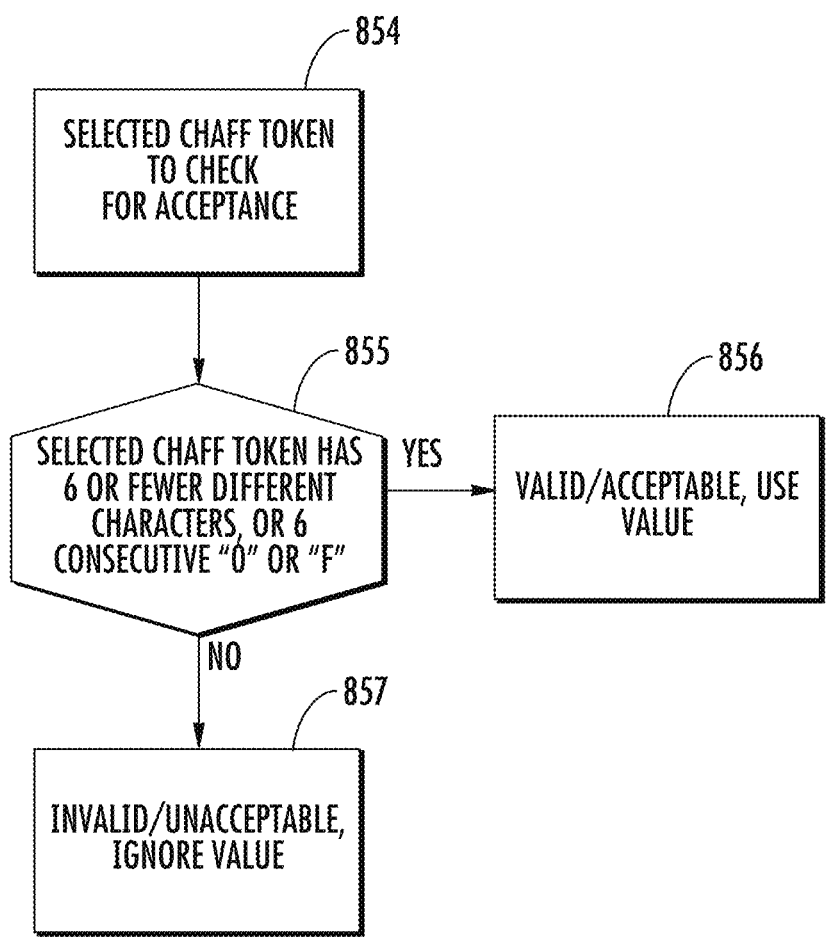

FIG. 8J provides one example for determining whether a selected chaff token is acceptable (e.g., acceptable for use in FIGS. 8G-8I, for example). For example, when a selected chaff token is modified (using either increment or bit shifting), the resulting value may be inappropriate to use to update the new token. In such an example, if the selected chaff token (as modified) does not contain at least six different characters, or has six consecutive zeros or "f" characters, the selected chaff token may be unacceptable for use, as is seen in steps 854-857, for example.

Figure 8K:
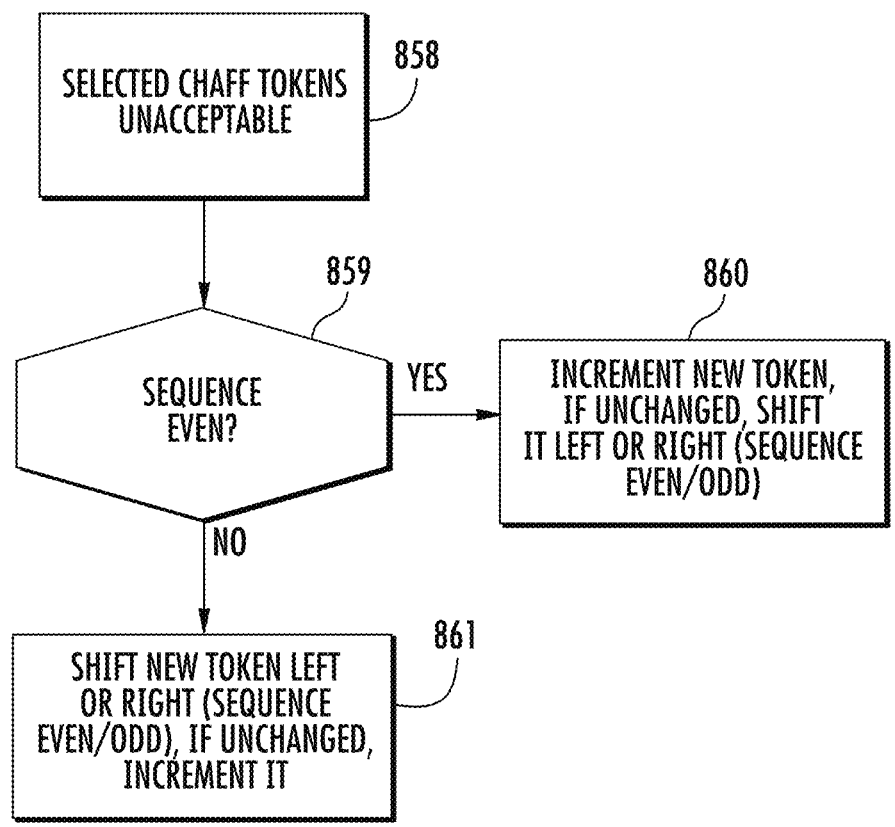

FIG. 8K provides one example for generating the new token when the selected chaff tokens are unacceptable (e.g., unacceptable for use in FIGS. 8G-8I, for example), or for regenerating the new token when the new token (as previously generated) is the same as the old token. For example, as is seen in steps 858-861, when this occurs, and the sequence is even, the new token may be incremented and (if this does not change the token) the new token may shift left or right depending on whether the sequence is even or odd. Alternatively, when this occurs, and the sequence is odd, the new token may be shifted left or right depending on whether the sequence is even or odd and (if this does not change the token) that new token may be incremented.

Seventh, once the new token is generated (using, for example, portions of the selected chaff tokens, which are put together to form the new token), the new token may then be passed into another bit-shift process to form a new unique token, for example. The new token may now be used to control the preloaded device 766. For example, the new token may be used as a token 719 and also used as a preloaded token to control the preloaded device 766.

In particular embodiments, system 700 may provide one or more advantages. For example, system 700 may allow a controller system 763 to control a device (such as an unmanned vehicle) without transmitting the actual instructions to the device to be performed. Instead, in particular embodiments, controller system 763 may transmit a token, which may cause the device to find a preloaded instruction loaded on the device, and may further cause the device to perform that preloaded instruction. As such, the communications system 763 may not transmit an instruction at all, thereby preventing an unauthorized entity from listening, capturing, or otherwise accessing the instruction. As another example, system 700 may allow a controller system 763 to control a device (such as an unmanned vehicle) using tokens that may become obsolete after one or more uses. For example, the system 700 may generate new tokens for a particular instruction. As such, the controller system 763 may cause the preloaded device 766 to perform a particular instruction more than once, without using the same token (which may now be obsolete). Instead, a new token may be used to cause the device to perform the instruction each additional time. As such, even if an unauthorized entity were to listen to, capture, or otherwise access the original token, the unauthorized entity may be unable to use that original token to control the device, because that original token may now be obsolete.

Modifications, additions, or omissions may be made to system 700 without departing from the scope of the disclosure. For example, system 700 may include any number of preloaded devices 766, controller systems 763, and/or loading devices 715 (and/or any number of components, such as processors or memory units illustrated or described in the above devices).

Additionally, any amount of identifying transmissions 744, packets, and/or tokens 719 may be sent to a particular preloaded device 766 within any amount of time. In such an example, the controller system 763 may be capable of transmitting multiple identifying transmissions 744, packets, and/or tokens 719 to a particular preloaded device 766 per second. Furthermore, the preloaded device 766 may be capable of acting on each of these multiple identifying transmissions 744, packets, and/or tokens 719 per second, thereby enabling real-time control of the operations of the preloaded device 766.

Also, any suitable logic may perform the functions of system 700 and the components and/or devices within system 700. Furthermore, one or more components of system 700 may be separated, combined, and/or eliminated. For example, although controller system 763 and loading device 715 are illustrated as being separate devices, controller system 763 and loading device 715 may be the same device.

Additionally, in particular embodiments, the instructions 708, tokens 719, preloaded tokens, preloaded instructions, and/or any other data may be encrypted. In such embodiments, the controller system 763 and/or the preloaded device 766 may encrypt/decrypt the instructions 708, tokens 719, preloaded tokens, preloaded instructions, and/or any other data using any of the encryption methods discussed above.

Furthermore, although system 700 has been described above as including tokens 719 and preloaded tokens that do not change unless the instruction (e.g., "turn left") associated with those tokens has been performed (or the token 719 has been transmitted by the controller system 769 or received or utilized by the preloaded device 766), in particular embodiments, the tokens 719 and preloaded tokens may change independent of these events. For example, controller system 763 and preloaded device 766 may generate new tokens periodically (e.g., every second, every minute, every hour, every day) or when instructed to do so. The controller system 763 and preloaded device 766 may generate new tokens (and associate those new tokens with the instruction) in any of the manners discussed above.

Additionally, any of the elements and/or functions described above with regard to FIGS. 7A-8K may be combined with, modified by, and/or substituted with any of the elements and/or functions described above with regard to FIGS. 1-6C.

As just one example of this, the preloaded device 766 may be controlled (or further controlled) using data elements and tokens of FIG. 1-3. For example, the data element stored by the data management device 14 may be data that is associated with an action to be performed by the preloaded device 766 (such as a GPS coordinate that the device may adjust its heading to, a degree by which the device may "turn left" to, an amount of distance that the device should "go forward" to, etc.), data that defines an action to be performed by the preloaded device 766 (such as "turn left", "go forward", etc.), or any combination of the preceding. This data element may have been transmitted by a data user device 62 to the data management device 14 for storage. In response to this transmission of the data element, the data management device 14 may generate a token that uniquely identifies the data element, and the data management device 14 may transmit this token to the data user device 62 (or directly to the controller system 763). The data user device 62 may then transmit this token to the controller system 763 (or the data user device 62 may be the controller system 763) for use in controlling the preloaded device 766.

To control the preloaded device 766, the controller system 763 may determine an instruction 708 (that utilizes the stored token of FIGS. 1-3) and the token 719 associated with the instruction 708. As is discussed above, such determinations may be made in any manner. As just one example of this, to determine the instruction 708, an operator of the controller system 763 may input into the controller system 763 that the preloaded device 766 is to "adjust its heading" and that it is to adjust its heading to the GPS location of the data element uniquely identified by a particular token (e.g., the GPS location for Mount Rushmore). Furthermore, to determine the token 719 associated with the instruction 708, the controller system 763 may access, search for, or otherwise look-up the instruction 708, and based on the instruction 708 (and association 710) may determine the token 719.

The controller system 763 may then prepare a packet for transmission to the preloaded device, and transmit the packet to the controller system 763. The packet may be prepared in any manner, as is discussed above, and may be transmitted in any manner, as is also discussed above. The packet may include the token 719. Furthermore, the packet may also include the token from FIGS. 1-3 that uniquely identifies the data element for the GPS location that the preloaded device 766 is to "adjust its heading" to. Additionally, the packet may include any of the other information or data that is discussed above (such as chaff tokens, etc.). When the preloaded device 766 receives the packet, the preloaded device 766 may determine whether the packet is legitimate, determine the token 719 included in the packet, match the token 719 to the preloaded token, and determine the preloaded instruction (e.g., "adjust heading"), as is discussed above.

Furthermore, the preloaded device 766 may also determine the token from FIGS. 1-3 that uniquely identifies the GPS location that the preloaded device 766 is to "adjust its heading" to. Based on this determination (and/or based on additional instructions included in instruction 708, and/or based on an additional instruction 708, and/or based on the absence of a location to "adjust its heading" to), the preloaded device 766 may transmit the token to the data management device 14 of FIG. 1. As is discussed above, this may cause the data management device 14 to retrieve the data element (which includes the GPS location for Mount Rushmore), and transmit the data element to the preloaded device 766. Therefore, based on the preloaded instruction ("adjust heading") and the data element retrieved using the token (the GPS location for Mount Rushmore), the preloaded device 766 may adjust its heading to the GPS location for Mount Rushmore.

In some examples, the ability to control (or further control) the preloaded device 766 using data elements and tokens of FIGS. 1-3 may provide additional flexibility to the control of the preloaded device 766. For example, by providing the preloaded device 766 with tokens and data elements, the preloaded device 766 may be able to perform actions (and/or further control those actions, such as "adjust heading" to a particular GPS location) without requiring all of the information to be preloaded into the preloaded device 766. Therefore, the preloaded device 766 may be instructed to "turn left" even if the "turn left" instruction was not preloaded into the preloaded device 766. Additionally, the preloaded device 766 may be instructed to "adjust its heading" to any GPS location, even if that GPS location was not preloaded into the preloaded device 766.

In various embodiments, the herein described systems and methods may be implemented in software, firmware, or executable instructions stored in a data storage medium such as or including machine-readable medium. The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. Some embodiments may be implemented using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. Computers and computer systems described herein may include operatively associated computer-readable memory media such as memory for storing software applications and instructions used in obtaining, processing, storing or communicating data. It can be appreciated that such memory can be internal, external, remote or local with respect to its operatively associated computer or computer system. Memory may also include any means for storing software or other instructions including, for example and without limitation, a hard disk, an optical disk, floppy disk, DVD, compact disc, memory stick, ROM (read only memory), RAM (random access memory), PROM (programmable ROM), EEPROM (extended erasable PROM), or other like computer-readable media. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disk (DVD), a tape, a cassette, or the like.

It will be further apparent to one of ordinary skill in the art that some of the embodiments as described hereinabove may be implemented in many different embodiments of instruction (e.g., software or firmware) and hardware. The instructions may include any suitable type of code, such as source code, compiled code, interpreted code, executable code, static code, dynamic code, and the like. The actual software code or specialized control hardware used to implement some of the illustrated embodiments do not limit the present disclosure. The instructions may be implemented, for example, using any suitable programing language, which may include high-level, low-level, object-oriented, visual, compiled or interpreted programming languages, such as, but not limited to, C, C++, C#, Java, BASIC, SQL, Perl, Matlab, Pascal, Visual BASIC, assembly language, machine code, and so forth. The embodiments are not limited in this context.

The methods and systems have been illustrated and described herein as comprising several separate functional elements, such as modules or units. Although certain of such modules or units may be described by way of example, it can be appreciated that a greater or lesser number of modules or units may be used and still fall within the scope of the embodiments. Further, although various embodiments may be described in terms of modules or units to facilitate description, such modules or units may be implemented by one or more hardware components (e.g., embedded systems/peripherals, processors, chips, FPGAs, DSPs, PLDs, ASICs, circuits, registers, servers, clients, network switches and routers), software components (e.g., programs, subroutines, logic) and/or combination thereof. It can be appreciated that, in certain aspects, a single component may be replaced by multiple components, and multiple components may be replaced by a single component, to provide an element or structure or to perform a given function or functions. Except where such substitution would not be operative to practice certain embodiments of the present disclosure, such substitution is considered within the scope of the present disclosure. In one example, the all or a portion of the system, its features or functional elements, modules, units, etc. or one or more steps of the method may be associated with, implemented by, executed on, or embedded in (e.g., as embedded software/firmware) one or more hardware components, (e.g., as described above). Further, such one or more components so configured may be installed or associated with one or more devices and therein configured to perform the herein described system functionalities or methods. The modules or units may comprise, or be implemented as, one or more systems, sub-systems, devices, components, circuits, logic, programs, or any combination thereof, as desired for a given set of design or performance constraints. For example, the modules may comprise electronic elements fabricated on a substrate. In various implementations, the electronic elements may be fabricated using silicon-based IC processes such as complementary metal oxide semiconductor (CMOS), bipolar, and bipolar CMOS (BiCMOS) processes, for example. The embodiments are not limited in this context It may be appreciated that terms such as "processing", "generating", "determining", or the like, unless stated otherwise, refer to the action or processes of a computer or computing system, or similar electronic computing device, that manipulates or transforms data represented as physical quantities (e.g., electronic) within the computing system's registers or memories into other data similarly represented as physical quantities within the computing system's memories, registers or other such information storage, transmission or display devices. The embodiments are not limited in this context. An action such as "identifying" or "matching" when performed by a computer or computer system may include identification by determining, accessing system data, comparisons with system data, instructions, or the like. An action such as initiating may include causing an event or thing initiated either directly or indirectly. For example, initiating may include signaling, providing power or instructions, physical manipulation, transmission of data, calculation of conditions, or other step resulting in the event sought to be initiated. Furthermore, an action such as "storing", when used in reference to a computer or computer system, refers to any suitable type of storing operation including, for example, storing a value to memory, storing a value to cache memory, storing a value to a processor register, and/or storing a value to a non-volatile data storage device.

This specification has been written with reference to various non-limiting and non-exhaustive embodiments. However, it will be recognized by persons having ordinary skill in the art that various substitutions, modifications, or combinations of any of the disclosed embodiments (or portions thereof) may be made within the scope of this specification. Thus, it is contemplated and understood that this specification supports additional embodiments not expressly set forth in this specification. Such embodiments may be obtained, for example, by combining, modifying, or reorganizing any of the disclosed steps, components, elements, features, aspects, characteristics, limitations, and the like, of the various non-limiting and non-exhaustive embodiments described in this specification. In this manner, Applicant reserves the right to amend the claims during prosecution to add features as variously described in this specification.

What is claimed is:

1. A system, comprising:
a controller comprising:
one or more first memory units configured to store one or more first instructions; and
one or more first processors coupled to the first memory units and configured, upon executing the one or more first instructions, to:
determine an instruction to be performed by a remote device;
determine a token associated with the instruction; and
transmit the token to the remote device; and
a remote device comprising:
one or more second memory units configured to store one or more second instructions, a plurality of preloaded instructions, and a plurality of preloaded tokens associated with the plurality of preloaded instructions; and
one or more second processors coupled to the second memory units and configured, upon executing the one or more second instructions, to:
receive the token;
match the token to a preloaded token of the plurality of preloaded tokens, wherein the preloaded token is associated with a preloaded instruction of the plurality of preloaded instructions that matches the instruction;
determine, based on the match, the preloaded instruction; and
perform the preloaded instruction, wherein the token is devoid of the instruction and the preloaded instruction;
wherein the one or more first processors of the controller are further configured to:
following transmission of the token, generate a new token for association with the instruction, wherein generation of the new token causes the token to be obsolete;
determine the instruction to be performed again by the remote device;
determine the new token associated with the instruction; and
transmit the new token to the remote device,
wherein the one or more second processors of the remote device are further configured to:
following receipt of the token, generate a new preloaded token for association with the preloaded instruction, wherein generation of the new preloaded token causes the preloaded token to be obsolete;
receive the new token;
match the new token to the new preloaded token;
determine, based on the match, the preloaded instruction again; and
perform the preloaded instruction again.

2. A system, comprising:
one or more memory units configured to store one or more instructions;
one or more processors coupled to the memory units and configured, upon executing the one or more instructions, to:
determine an instruction to be performed by a remote device, wherein the remote device includes a plurality of preloaded instructions, wherein the plurality of preloaded instructions includes a preloaded instruction that matches the instruction;
determine a token associated with the instruction, wherein the remote device further includes a plurality of preloaded tokens associated with the plurality of preloaded instructions, wherein the plurality of preloaded tokens includes a preloaded token that matches the token, wherein the preloaded token is associated with the preloaded instruction, wherein the token is devoid of the instruction and the preloaded instruction;
transmit the token to the remote device, wherein the remote device is configured to match the token to the preloaded token, wherein, based on the match, the remote device is further configured to determine the preloaded instruction and perform the preloaded instruction;
following transmission of the token, generate a new token for association with the instruction, wherein the remote device is further configured to, following receipt of the token, generate a new preloaded token for association with the preloaded instruction, wherein generation of the new token causes the token to be obsolete, and wherein generation of the new preloaded token causes the preloaded token to be obsolete;
determine the instruction to be performed again by the remote device;
determine the new token associated with the instruction; and
transmit the new token to the remote device, wherein the remote device is configured to match the new token to the new preloaded token, wherein, based on the match, the remote device is further configured to determine the preloaded instruction again and perform the preloaded instruction again.

3. The system of claim 2, wherein the one or more processors are further configured, upon executing the one or more instructions, to:
prior to transmitting the token, add the token to a packet that further includes one or more chaff tokens; and
transmit the packet to the remote device in order to transmit the token to the remote device, wherein the remote device is further configured to identify the token among the one or more chaff tokens.

4. The system of claim 2, wherein the instruction to be performed by the remote device is determined based on a user input.

5. The system of claim 2, wherein the instruction to be performed by the remote device is determined automatically.

6. The system of claim 2, wherein the remote device is an unmanned vehicle, an unmanned aircraft, ordnance, a probe, or a satellite.

7. A method, comprising:
determining, by one or more processors, an instruction to be performed by a remote device, wherein the remote device includes a plurality of preloaded instructions, wherein the plurality of preloaded instructions includes a preloaded instruction that matches the instruction;
determining, by the one or more processors, a token associated with the instruction, wherein the remote device further includes a plurality of preloaded tokens associated with the plurality of preloaded instructions, wherein the plurality of preloaded tokens includes a preloaded token that matches the token, wherein the preloaded token is associated with the preloaded instruction, wherein the token is devoid of the instruction and the preloaded instruction;

transmitting, by the one or more processors, the token to the remote device, wherein the remote device is configured to match the token to the preloaded token, wherein, based on the match, the remote device is further configured to determine the preloaded instruction and perform the preloaded instruction;

following transmission of the token, generating, by the one or more processors, a new token for association with the instruction, wherein the remote device is further configured to, following receipt of the token, generate a new preloaded token for association with the preloaded instruction, wherein generation of the new token causes the token to be obsolete, and wherein generation of the new preloaded token causes the preloaded token to be obsolete;

determining, by the one or more processors, the instruction to be performed again by the remote device;

determining, by the one or more processors, the new token associated with the instruction; and transmitting, by the one or more processors, the new token to the remote device, wherein the remote device is configured to match the new token to the new preloaded token, wherein, based on the match, the remote device is further configured to determine the preloaded instruction again and perform the preloaded instruction again.

8. The method of claim 7, further comprising:

prior to transmitting the token, adding, by the one or more processors, the token to a packet that further includes one or more chaff tokens; and transmitting, by the one or more processors, the packet to the remote device in order to transmit the token to the remote device, wherein the remote device is further configured to identify the token among the one or more chaff tokens.

9. The system of claim 7, wherein the remote device is an unmanned vehicle, an unmanned aircraft, ordnance, a probe, or a satellite.

10. A non-transitory computer readable medium comprising logic configured, when executed by one or more processors, to:

determine an instruction to be performed by a remote device, wherein the remote device includes a plurality of preloaded instructions, wherein the plurality of preloaded instructions includes a preloaded instruction that matches the instruction;

determine a token associated with the instruction, wherein the remote device further includes a plurality of preloaded tokens associated with the plurality of preloaded instructions, wherein the plurality of preloaded tokens includes a preloaded token that matches the token, wherein the preloaded token is associated with the preloaded instruction, wherein the token is devoid of the instruction and the preloaded instruction;

transmit the token to the remote device, wherein the remote device is configured to match the token to the preloaded token, wherein, based on the match, the remote device is further configured to determine the preloaded instruction and perform the preloaded instruction;

following transmission of the token, generate a new token for association with the instruction, wherein the remote device is further configured to, following receipt of the token, generate a new preloaded token for association with the preloaded instruction, wherein generation of the new token causes the token to be obsolete, and wherein generation of the new preloaded token causes the preloaded token to be obsolete;

determine the instruction to be performed again by the remote device;

determine the new token associated with the instruction; and transmit the new token to the remote device, wherein the remote device is configured to match the new token to the new preloaded token, wherein, based on the match, the remote device is further configured to determine the preloaded instruction again and perform the preloaded instruction again.

11. The non-transitory computer readable medium of claim 10, wherein the logic is further configured, when executed by the one or more processors, to:

prior to transmitting the token, add the token to a packet that further includes one or more chaff tokens; and transmit the packet to the remote device in order to transmit the token to the remote device, wherein the remote device is further configured to identify the token among the one or more chaff tokens.

12. The non-transitory computer readable medium of claim 10, wherein the remote device is an unmanned vehicle, an unmanned aircraft, ordnance, a probe, or a satellite.

13. A remote device, comprising one or more memory units configured to store one or more first instructions, a plurality of preloaded instructions, and a plurality of preloaded tokens associated with the plurality of preloaded instructions; and one or more processors coupled to the memory units and configured, upon executing the one or more first instructions, to:

receive a token from a controller, wherein the token was determined by the controller based on a determination of an instruction to be performed by the remote device;

match the token to a preloaded token of the plurality of preloaded tokens, wherein the preloaded token is associated with a preloaded instruction of the plurality of preloaded instructions that matches the instruction;

determine, based on the match, the preloaded instruction;

perform the preloaded instruction, wherein the token is devoid of the instruction and the preloaded instruction;

following receipt of the token, generate a new preloaded token for association with the preloaded instruction, receive a new token from the controller, wherein the new token was generated by the controller for association with the instruction, wherein generation of the new token causes the token to be obsolete, and wherein generation of the new preloaded token causes the preloaded token to be obsolete, wherein the new token was determined by the controller based on a determination of the instruction to be performed again by the remote device;

match the new token to the new preloaded token;

determine, based on the match, the preloaded instruction again; and perform the preloaded instruction again.

* * * * *